US012309062B2

(12) United States Patent
Golikov et al.

(10) Patent No.: US 12,309,062 B2
(45) Date of Patent: May 20, 2025

(54) ADVANCED STORAGE OPERATIONS FOR WAN OPTIMIZATION

(71) Applicant: VMware LLC, Palo Alto, CA (US)

(72) Inventors: Igor Golikov, Kfar Saba (IL); Aran Bergman, Givatayim (IL); Lior Gal, Yoqneam Illit (IL); Avishay Yanai, Petach-Tikva (IL); Israel Cidon, San Francisco, CA (US); Alex Markuze, Rosh HaAyin (IL); Eyal Zohar, Shimshit (IL)

(73) Assignee: VMWare LLC, Palo Alto, CA (US)

( * ) Notice: Subject to any disclaimer, the term of this patent is extended or adjusted under 35 U.S.C. 154(b) by 1 day.

(21) Appl. No.: 18/371,859

(22) Filed: Sep. 22, 2023

(65) Prior Publication Data

US 2025/0106147 A1    Mar. 27, 2025

(51) Int. Cl.
| | | |
|---|---|---|
| G06F 15/16 | (2006.01) | |
| H04L 45/00 | (2022.01) | |
| H04L 45/76 | (2022.01) | |
| H04L 67/1097 | (2022.01) | |

(52) U.S. Cl.
CPC .............. *H04L 45/38* (2013.01); *H04L 45/76* (2022.05); *H04L 67/1097* (2013.01)

(58) Field of Classification Search
CPC ...... H04L 45/38; H04L 45/76; H04L 67/1097
See application file for complete search history.

(56) References Cited

PUBLICATIONS

Jang, S. et al., Traffic Redundancy Elimination Over a Programmable Data Plane: Design and Implementation, IEEE Network, 2021, 35(6):292-298.
Sanadhya, S. et al., Asymmetric Caching: Improved Network Deduplication for Mobile Devices, In Proceedings of the 18th Annual International Conference on Mobile Computing and Networking, 2012, pp. 161-172.
Xu, Y. et al., Algorithm for Redundancy Elimination in Network Traffic, In 2012 2nd International Conference on Consumer Electronics, Communications and Networks (CECNet), IEEE, 2012, pp. 1613-1617.
European Patent Office, Extended Search Report, Application No. 24201399.3, Feb. 5, 2025, 9 pages.

*Primary Examiner* — Joseph R Maniwang
(74) *Attorney, Agent, or Firm* — Quarles & Brady LLP

(57) ABSTRACT

Some embodiments of the invention provide a WAN optimization method for optimizing traffic flows through a WAN connecting multiple sites each having at least one router. The method is performed in a kernel space of a first router at a first site. From a second router at a second site, the method receives, in an optimized data stream originating from a source device at the second site and destined to a destination device at the first site, a file including compressed segments not yet stored in a database of the first router. The method copies the compressed segments to a shared memory used with a decompression program operating in the first router's user space. For each compressed segment, the method receives, from the decompression program, a decompressed segment obtained by decompressing the compressed segment, and stores the decompressed segment in a kernel space memory for use in processing the file.

20 Claims, 33 Drawing Sheets

Probabilistic Data Filter

Updated Probabilistic Data Filter

… (US 12,309,062 B2)

ADVANCED STORAGE OPERATIONS FOR WAN OPTIMIZATION

BACKGROUND

Today, third-party WAN optimization solutions tend to be expensive while not meeting all of the needs of the customers utilizing these solutions. Additionally, as storage devices become faster, the kernel storage stack becomes a major source of overhead that impedes both application-observed latency and IOPS (input/output operations per second), and this relative overhead of the kernel space is likely to worsen. In some instances, the I/O latency is doubled by the kernel's storage stack. Existing approaches to tackle this problem tend to be radical, requiring intrusive application-level changes or new hardware. Complete kernel bypass through libraries (e.g., SPDK) allows applications to access underlying devices directly. However, such libraries also force applications to implement their own file systems and to poll for I/O completion, which leads to wasted CPU cycles and high energy consumption. Additionally, applications using SPDK may suffer from high average and tail latencies and severely reduced throughput unless a dedicated CPU core is allocated per SPDK thread.

BRIEF SUMMARY

Some embodiments of the invention provide a WAN (wide area network) optimization method for optimizing traffic flows through a WAN that connects multiple sites, each of which has at least one router. The method is performed at a first router located at a first site. Specifically, the method of some embodiments is performed in a kernel space of the first router that includes an in-kernel end-to-end datapath. The first router is a standalone appliance, in some embodiments, while in other embodiments, the first router is a software router executing on a host computer. In some other embodiments, the software router executes on the host computer along with at least one source or one destination of the WAN traffic flows.

From a second router located at a second site, the method receives a file in an optimized first data stream originating from a source device at the second site and destined to a destination device at the first site. The file includes a set of segment identifiers corresponding to a set of segments stored by the first router. For each particular segment identifier in the set of segment identifiers of the file, the method attempts to retrieve a particular segment corresponding to the particular segment identifier from a kernel memory of the first router.

When the particular segment is not stored in the kernel memory of the first router, the method performs an operation to DMA (direct memory access) the particular segment into the kernel memory from a disk storage of the first router (e.g., a disk storage of the standalone appliance or a disk storage of the host computer executing the software router). Alternatively, when the segment is in the kernel memory, the method retrieves the segment from the kernel memory. Once the segment has been retrieved from the kernel memory, in some embodiments, the method sends the retrieved segment to the destination device.

In some embodiments, the first router includes a cache that includes entries for each segment stored by the first router. Each entry, in some embodiments, includes the segment identifier (e.g., a signature associated with the segment), a block address corresponding to a storage location of the segment, and an indicator value that indicates whether the segment is stored in the kernel memory. As such, in some embodiments, the first router attempts to retrieve the particular segment from the kernel memory by using the particular segment identifier to perform a lookup in the cache to identify an entry for the particular segment, and determines whether the segment is stored in the kernel memory based on the indicator value for the entry.

When the segment is not in the kernel memory, the first router of some embodiments performs the DMA operation by using the block address corresponding to the storage location of the segment (i.e., the storage location in the disk storage) to locate the segment, and DMAs the segment from the disk storage to the kernel memory. In some embodiments, the DMA operation is performed by an NVMe (non-volatile memory express) device operating on the first router that has access to both the disk storage and the kernel memory.

In some embodiments, before sending each segment to the destination device, the first router reconstructs the file using the segments retrieved from the kernel memory (e.g., segments that were already in the kernel memory and segments added to the kernel memory via the DMA operation). The first router reconstructs the file, in some embodiments by replacing each segment identifier in the set of segment identifiers included in the file with the retrieved segment that corresponds to the segment identifier. In some embodiments, the file includes duplicate segment identifiers, and as such, the same segment is used to replace each duplicate segment identifier in the file. Once the file is reconstructed, the first router forwards the reconstructed file to the destination device, according to some embodiments.

Some embodiments of the invention also provide a WAN optimization method for when new segments are received by the first router. In these embodiments, the first router is configured with an end-to-end in-kernel datapath and user control. The method is performed in the kernel space of the first router. From the second router located at the second site, the method receives a file in an optimized first data stream originating from a source device at the second site and destined to a destination device at the first site. The file includes a set of one or more compressed segments that are not yet stored in a database of the first router.

The method copies the set of one or more compressed segments with zero copy to a shared memory that is used with a decompression program operating in a user space of the first router. For each particular compressed segment in the set of one or more compressed segments, the method (1) receives (e.g., via the shared memory), from the user space decompression program, a particular decompressed segment that the user space decompression program obtains by decompressing the particular compressed segment, and (2) stores the particular decompressed segment in a kernel space memory for use in processing the file and subsequent files received by the first router.

In some embodiments, the first router (i.e., kernel space of the first router) processes the file and subsequent files received by the first router by using the set of decompressed segments to reconstruct the file by replacing the set of compressed segment in the file with the set of decompressed segments. The first router then sends the reconstructed file to the destination device, in some embodiments.

The decompression program of some embodiments retrieves (i.e., reads) the set of compressed segments from the shared memory in order to decompress the set of compressed segments. Once the segments are decompressed, the decompression program provides the set of decompressed segments to the kernel space of the first router, and stores the set of decompressed segments in a database in the user space of the first router that is used to store multiple segments for the first router. In some embodiments, a database agent of the database writes each decompressed segment in the set of decompressed segments to a disk storage of the first router.

For each decompressed segment in the set, the kernel space of the first router receives a notification from the user space of the first router that the decompressed segment has been written to the disk storage of the first router (e.g., via a hook added to the disk storage), and based on the notification, deletes the decompressed segment from the kernel space memory. In some embodiments, after the particular decompressed segment has been deleted from the kernel space memory, the kernel space of the first router processes the file and subsequent files received by the first router by performing the DMA operation described above.

In some embodiments, when the kernel space stores a decompressed segment in the kernel memory, the kernel space also updates the cache to include an entry for the decompressed segment. Initially, the entry includes an identifier of the decompressed segment, an address corresponding to a location of the decompressed segment in the kernel space memory, and an indicator value that indicates the decompressed segment is stored in the kernel space memory. After receiving the notification that the decompressed segment has been written to the disk storage, the kernel space updates the entry to replace the kernel memory address with a block address (e.g., a logical block address (LBA)) included in the notification and corresponding to a location of the particular decompressed segment in the disk storage, as well as to update the indicator value to specify that the segment is not stored in the kernel memory after it has been deleted.

Each compressed segment in the set of one or more compressed segments of the received file is a key-value pair, according to some embodiments. The key in each key value pair, in some embodiments, is a signature that corresponds to a particular segment, while each value is the particular segment. The signatures, in some embodiments, are identical to the segment identifiers. As such, the segment identifiers used for each cache entry are the signatures received as part of the key-value pairs. Additionally, when the decompressed segments are written to the disk storage, and/or stored in the kernel memory, the decompressed segments are written and stored as key-value pairs (i.e., the signatures are stored alongside their corresponding segments).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
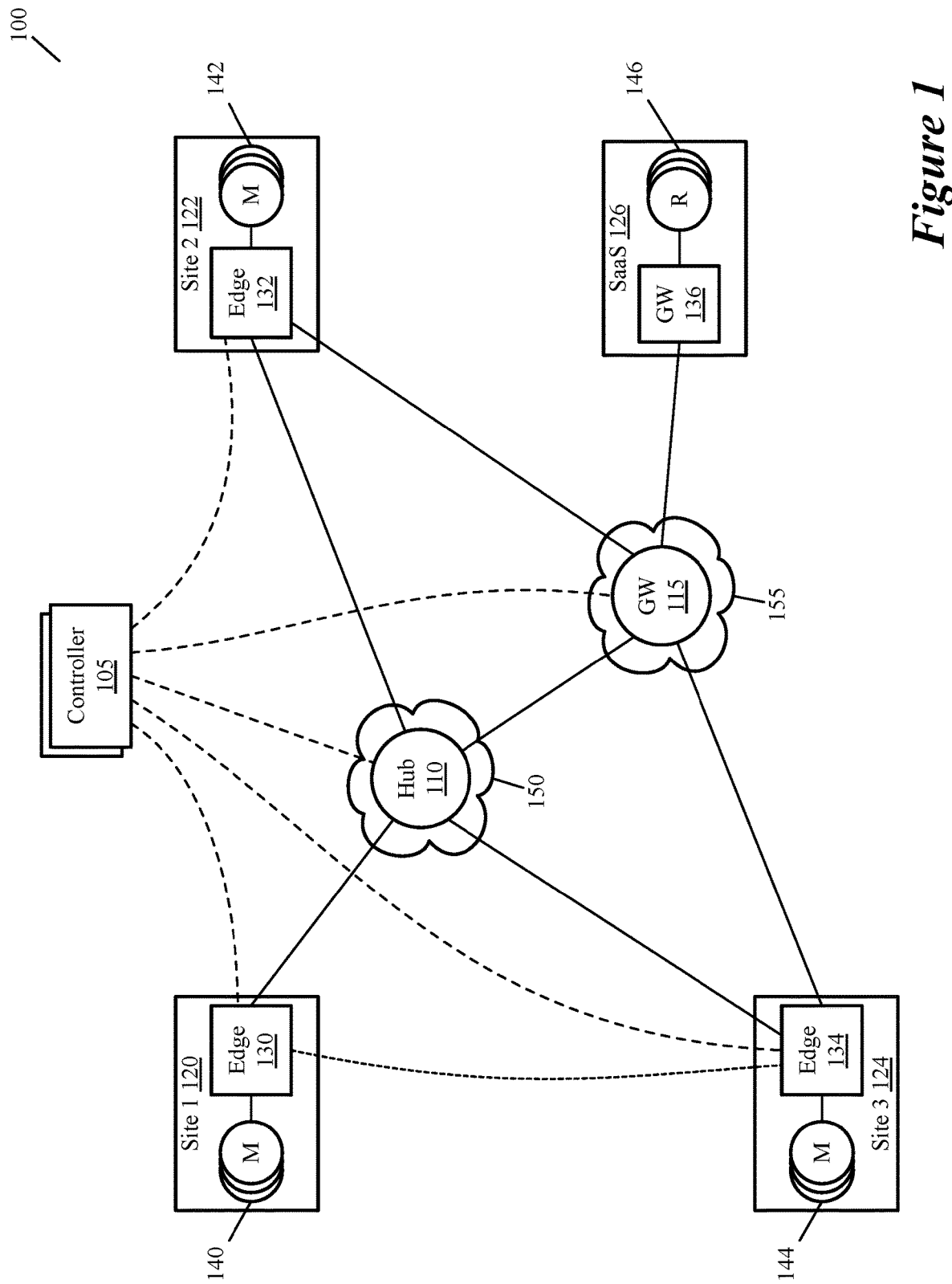
FIG. 1 illustrates an SD-WAN of some embodiments that connects various branch sites (also referred to herein as branch networks) to each other and to at least one third-party datacenter.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide methods for optimizing storage on Distributed Remote Applications Global Optimization Network (DRAGON) receiver components. DRAGON is a modular WAN (wide area network) optimization appliance designed to bridge geo-distributed enterprise infrastructures, applications, and services. These applications and services rely on data that is traditionally placed in central datacenters that are interconnected with high-speed (i.e., above 10 Gb/s) LANs (local area networks). DRAGON leverages traffic redundancy elimination (TRE) techniques to significantly reduce the size of the data transferred over WAN, thus improving both throughput and data delivery latency. Some embodiments utilize a kernel-only data path, and leverage direct NVMe (non-volatile memory express) access and zero-copy operations to accelerate operations performed by DRAGON.

DRAGON is a SaaS platform designed to be used as a standalone appliance, in some embodiments. In other embodiments, DRAGON is slotted above VMware VeloCloud SASE, or, in still other embodiments, used on top of a Pathway network. DRAGON facilitates east-west traffic for distributed applications deployed across geographically scattered datacenters, clouds, and edge nodes. DRAGON reduces the cost and latency of machine-to-machine transactions, traditionally operating over a LAN when deployed over geo-distributed WAN. In some embodiments, DRAGON facilitates TRE and compression at high network speeds to handle up to 100 Gb/s LAN traffic on a single machine. DRAGON, in some embodiments, achieves an in-kernel TCP-optimized WAN network through optimization of the storage stack based on the needs of the DRAGON appliance.

DRAGON includes two independent components—a DRAGON sender component and a DRAGON receiver component. The DRAGON sender component is a stateless component that performs computations and operations to decrease the size of data sent over WAN as much as possible. Examples of these computations and operations, in some embodiments, include variable-size segmenting, hashing, and compression. Ideally, the DRAGON receiver component has all of the segments in its segment cache, and the sender component needs only to send the hashes of data segments in a data stream (e.g., a TCP stream), as opposed to sending a data stream that includes the full segments (e.g., a full TCP stream). The DRAGON receiver component reconstructs the original data stream (e.g., original TCP stream) from the condensed data received from the sender component. The DRAGON receiver component stores the data chanks in a database, such as RocksDB, which is a fast key-value store compiled with IO_URING support.

The optimizations performed by DRAGON include transport optimization and traffic reduction. Examples of transport optimization, in some embodiments, include forward error correction, intelligent routing, multiple paths, TCP optimization, etc., while examples traffic reduction include TRE and compression, according to some embodiments. Due to potential bottlenecks caused by storage on the DRAGON receiver component, some embodiments provide storage access optimizations, as will be further described below.

TRE, also known as data de-duplication, is performed to avoid sending duplicate segments of information. For instance, during multiple VM (virtual machine) migrations, VMs of some embodiments share identical kernel binaries and software libraries, and thus TRE is used in some embodiments to avoid having to send the full kernel binaries and software libraries for each VM being migrated.

When performing TRE, the DRAGON sender component performs two fundamental operations, variable-size segmenting and hashing, which are needed to identify the segments. Both operations are computationally expensive as each computes a hash function. A single addition or removal of bytes from a single segment makes all subsequent unmodified segments unidentifiable. By shifting the begging of all the subsequent segments, the single-byte addition operation changes the hashes of the following segments in the stream. At the DRAGON receiver component, new segments are stored and existing segments corresponding to signatures (e.g., hash functions) in the stream are retrieved from storage and reinserted into the network flow. The segment size in compression, in some embodiments, is typically between 5 KB and 16 KB.

Compression involves a lossless compression algorithm that eliminates redundancies on a smaller scale, using a dictionary to replace repeated series of bytes with shorter ones. Most compression algorithms are based on the Ziv-Lempel compression algorithms. For example, the LZ4 algorithm can provide a compression ratio of 2 and above at speeds of 1 GB/s and above on a single CPU core.

Some embodiments of the invention provide a WAN (wide area network) optimization method for optimizing traffic flows through a WAN that connects multiple sites, each of which has at least one router. The WAN is an SD-WAN (software-defined WAN), in some embodiments. The method is performed at a first router located at a first site. Specifically, the method of some embodiments is performed in a kernel space of the first router that includes an in-kernel end-to-end datapath. The first router is a DRAGON receiver that processes the optimized traffic flows before providing them to their destination devices.

From a second router (e.g., a DRAGON sender) located at a second site, the method receives a file in an optimized first data stream originating from a source device at the second site and destined to a destination device at the first site. The file includes a set of segment identifiers corresponding to a set of segments stored by the first router. For each particular segment identifier in the set of segment identifiers of the file, the method attempts to retrieve a particular segment corresponding to the particular segment identifier from a kernel memory of the first router.

When the particular segment is not stored in the kernel memory of the first router, the method performs an operation to DMA (direct memory access) the particular segment into the kernel memory from a disk storage of the first router (e.g., a disk storage of the standalone appliance or a disk storage of the host computer executing the software router). Alternatively, when the segment is in the kernel memory, the method retrieves the segment from the kernel memory. Once the segment has been retrieved from the kernel memory, in some embodiments, the method sends the retrieved segment to the destination device.

In some embodiments, the first router includes a cache that includes entries for each segment stored by the first router. Each entry, in some embodiments, includes the segment identifier (e.g., a signature associated with the segment), a block address corresponding to a storage location of the segment, and an indicator value that indicates whether the segment is stored in the kernel memory. As such, in some embodiments, the first router attempts to retrieve the particular segment from the kernel memory by using the particular segment identifier to perform a lookup in the cache to identify an entry for the particular segment, and determines whether the segment is stored in the kernel memory based on the indicator value for the entry.

When the segment is not in the kernel memory, the first router of some embodiments performs the DMA operation by using the block address corresponding to the storage location of the segment (i.e., the storage location in the disk storage) to locate the segment, and DMAs the segment from the disk storage to the kernel memory. In some embodiments, the DMA operation is performed by an NVMe (non-volatile memory express) device operating on the first router that has access to both the disk storage and the kernel memory.

In some embodiments, before sending each segment to the destination device, the first router reconstructs the file using the segments retrieved from the kernel memory (e.g., segments that were already in the kernel memory and segments added to the kernel memory via the DMA operation). The first router reconstructs the file, in some embodiments, by replacing each segment identifier in the set of segment identifiers included in the file with the retrieved segment that corresponds to the segment identifier. In some embodiments, the file includes duplicate segment identifiers, and as such, the same segment is used to replace each duplicate segment identifier in the file. Once the file is reconstructed, the first router forwards the reconstructed file to the destination device, according to some embodiments.

Some embodiments of the invention also provide a WAN optimization method for when new segments are received by the first router. In these embodiments, the first router is configured with an end-to-end in-kernel datapath and user control. The method is performed in the kernel space of the first router. From the second router located at the second site, the method receives a file in an optimized first data stream originating from a source device at the second site and destined to a destination device at the first site. The file includes a set of one or more compressed segments that are not yet stored in a database of the first router.

The method copies the set of one or more compressed segments with zero copy to a shared memory that is used with a decompression program operating in a user space of the first router. For each particular compressed segment in the set of one or more compressed segments, the method (1) receives (e.g., via the shared memory), from the user space decompression program, a particular decompressed segment that the user space decompression program obtains by decompressing the particular compressed segment, and (2) stores the particular decompressed segment in a kernel space memory for use in processing the file and subsequent files received by the first router.

In some embodiments, the first router (i.e., kernel space of the first router) processes the file and subsequent files received by the first router by using the set of decompressed segments to reconstruct the file by replacing the set of compressed segment in the file with the set of decompressed segments. The first router then sends the reconstructed file to the destination device, in some embodiments.

The decompression program of some embodiments retrieves (i.e., reads) the set of compressed segments from the shared memory in order to decompress the set of compressed segments. Once the segments are decompressed, the decompression program provides the set of decompressed segments to the kernel space of the first router, and stores the set of decompressed segments in a database in the user space of the first router that is used to store multiple segments for the first router. In some embodiments, a database agent of the database writes each decompressed segment in the set of decompressed segments to a disk storage of the first router.

For each decompressed segment in the set, the kernel space of the first router receives a notification from the user space of the first router that the decompressed segment has been written to the disk storage of the first router (e.g., via a hook added to the disk storage), and based on the notification, deletes the decompressed segment from the kernel space memory. In some embodiments, after the particular decompressed segment has been deleted from the kernel space memory, the kernel space of the first router processes the file and subsequent files received by the first router by performing the DMA operation described above.

In some embodiments, when the kernel space stores a decompressed segment in the kernel memory, the kernel space also updates the cache to include an entry for the decompressed segment. Initially, the entry includes an identifier of the decompressed segment, an address corresponding to a location of the decompressed segment in the kernel space memory, and an indicator value that indicates the decompressed segment is stored in the kernel space memory.

After receiving the notification (i.e., via the hook) that the decompressed segment has been written to the disk storage, the kernel space updates the cache entry to replace the kernel memory address with a block address (e.g., a logical block address (LBA)) included in the notification and corresponding to a location of the particular decompressed segment in the disk storage. The kernel space then deletes the segment from the kernel memory, and again updates the cache entry to update the indicator value to specify that the segment is not stored in the kernel memory.

Each compressed segment in the set of one or more compressed segments of the received file is a key-value pair, according to some embodiments. The key in each key value pair, in some embodiments, is a signature that corresponds to a particular segment, while each value is the particular segment. The signatures, in some embodiments, are identical to the segment identifiers. As such, the segment identifiers used for each cache entry are the signatures received as part of the key-value pairs. Additionally, when the decompressed segments are written to the disk storage, and/or stored in the kernel memory, the decompressed segments are written and stored as key-value pairs (i.e., the signatures are stored alongside their corresponding segments).

FIG. 1 illustrates an SD-WAN of some embodiments that connects various branch sites (also referred to herein as branch networks) to each other and to at least one third-party datacenter. The SD-WAN 100 enables high performance and reliable branch network access across multiple different clouds, according to some embodiments. As shown, each of the branch networks 120, 122, and 124 are connected to the SD-WAN 100 by the SD-WAN edge forwarding elements (FEs) 130, 132, and 134, and the third-party SaaS (software as a service) datacenter 126 is connected to the SD-WAN 100 by the SD-WAN gateway forwarding element 136. Additionally, the SD-WAN 100 includes an SD-WAN controller cluster 105, a hub FE 110, and a cloud gateway 115. As shown, the hub FE 110 and the cloud gateway 115 are deployed to public clouds 150 and 155 respectively. In some embodiments, the elements of the SD-WAN 100 are in a full mesh topology in which each forwarding element is connected to every other forwarding element, while in this embodiment, the SD-WAN forwarding elements are in a partial mesh topology.

The SD-WAN controller cluster 105, in some embodiments, is a cluster of network managers and controllers that serves as a central point for managing (e.g., defining and modifying) configuration data that is provided to the edge FEs and/or gateways to configure some or all of the operations. In some embodiments, this SD-WAN controller cluster 105 is in one or more public cloud datacenters, while in other embodiments it is in one or more private datacenters. In some embodiments, the SD-WAN controller cluster 105 has a set of manager servers that defines and modifies configuration data for the SD-WAN 100, and a set of controller servers that distributes the configuration data to the edge FEs, hub FEs, and cloud gateways. In some embodiments, the SD-WAN controller 105 directs edge FEs and hub FEs to use certain gateways (i.e., assigns a gateway to the edge forwarding elements and hubs).

In some embodiments, each of the branch networks 120-124 belongs to the same entity, according to some embodiments. The branch networks 120-124, in some embodiments, are multi-machine sites of the entity. Examples of multi-machine sites of some embodiments include multi-user compute sites (e.g., branch offices or other physical locations having multiuser computers and other user-operated devices and serving as source computers and devices for requests to other machines at other sites), datacenters (e.g., locations housing servers), etc. These multi-machine sites are often at different physical locations (e.g., different buildings, different cities, different states, etc.). Each of the branch sites 120-124 has a respective set of machines 140, 142, and 144 that communicate with other machines and entities outside of their respective sites via the edge FEs 130-134. For instance, the edge FEs 130-134 each connect to one or both of the hub FE 110 and cloud gateway 115, and the cloud gateway 115 provides further connection to the SaaS datacenter 126 that hosts resources 146.

The SaaS datacenter 126 is a cloud datacenter, according to some embodiments. In some embodiments, cloud datacenters are public cloud datacenters, while in other embodiments cloud datacenters are private cloud datacenters. In still other embodiments, cloud datacenters may be a combination of public and private cloud datacenters. Examples of public clouds are public clouds provided by Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc.

The SaaS datacenter 126 connects to the SD-WAN through its respective gateway FE 136, which connects to the cloud gateway 115. In some embodiments, additional SD-WAN gateways may be present and can include multi-tenant, stateless service gateways deployed in strategic points of presence (PoPs) across the globe. Some such gateways serve as gateways to various clouds and datacenters. Also, in some embodiments, other SD-WAN forwarding elements may be present, including additional edge devices located at other branch sites of the entity, as well as additional SD-WAN hub FEs. The SD-WAN hub FEs 110, in some embodiments, can be used to connect to other edge FEs of other branch sites to each other, as well as to resources at a datacenter that hosts the hub FE. Hub FEs, in some embodiments, use or have one or more service engines to perform services (e.g., middlebox services) on data messages that it forwards from one branch site to another branch site.

Figure 2:
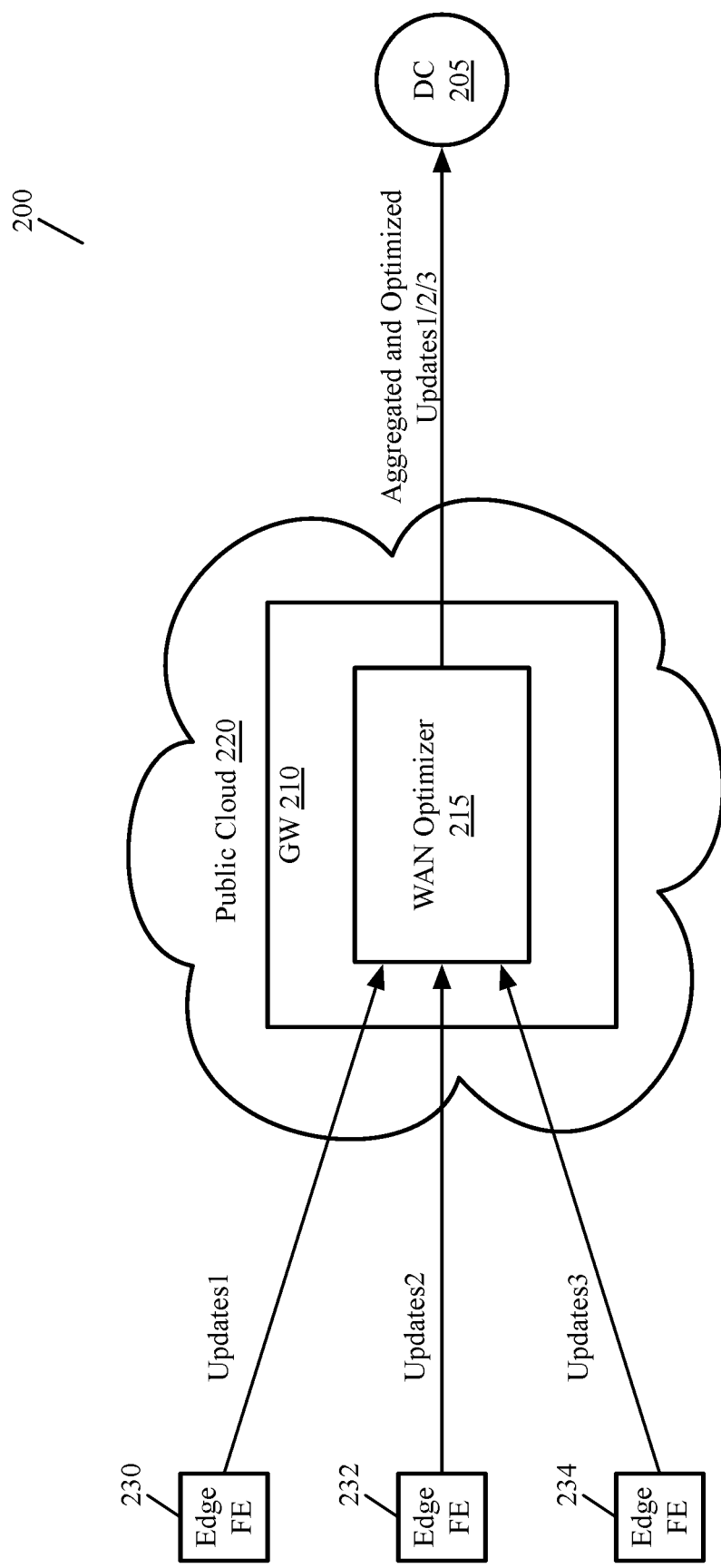
FIG. 2 conceptually illustrates an example of a cloud gateway of some embodiments that is equipped with a WAN optimizer for aggregating and optimizing data streams received from multiple different edge FEs to produce a single optimized data stream for forwarding to a centralized datacenter.

In some embodiments, SD-WAN cloud gateways are configured as aggregation points for various geographical regions and, as such, receive data streams from edge FEs operating at different branch sites in the various geographical regions. In some embodiments, the cloud gateways are equipped with WAN optimizers for aggregating and optimizing data streams received from edge FEs at branch sites and forwarding the aggregated and optimized data streams to a centralized datacenter. FIG. 2 conceptually illustrates an example of a cloud gateway of some embodiments that is equipped with a WAN optimizer for aggregating and optimizing data streams received from multiple different edge FEs to produce a single optimized data stream for forwarding to a centralized datacenter.

The SD-WAN 200 includes a centralized datacenter 205, a cloud gateway 210 deployed to a public cloud 220, and multiple edge FEs 230, 232, and 234 each deployed to a different branch site (not shown). While cloud gateways are described above as forwarding elements that connect elements of the SD-WAN to external networks and third-party datacenters, the cloud gateway 210 in this example has functionalities similar to the functionalities of a hub FE for the edge FEs 230-234 and the centralized datacenter 205 as it forwards data between the edge FEs 230-234 and the centralized datacenter 205.

The cloud gateway 210 includes a WAN optimizer 215, as shown. In some embodiments, the WAN optimizer 215 is configured to aggregate multiple data streams received from the edge FEs 230-234 to produce a single, aggregated data stream, and then performs one or more other WAN optimization operations on the single, aggregated data stream in order to produce a single WAN-optimized data stream for forwarding to the centralized datacenter 205. In some embodiments, the data streams sent to the cloud gateway 210 for aggregation, optimization, and forwarding are update streams for distributed and federated learning applications.

Distributed and federated learning applications, in some embodiments, rely on optimization algorithms such as stochastic gradient descent (SGD) and its variants (e.g., Federated Averaging, FedProx, SCAF-FOLD, etc.). In these algorithms, the training procedure is composed out of rounds, with each training round having the participating nodes (e.g., edge FEs located at branch sites) compute local parameters updates using data available to the participating nodes and exchange these updates for averaging and updating the model. In some embodiments, the training rounds continue until a termination criterion is met.

In order to accelerate these machine learning applications and prevent potential bottlenecks as the machine learning models rapidly increase in size and in the amounts of data used to train them, the WAN optimizer 215 is configured to intelligently eliminate redundancy in data transmission, according to some embodiments. For instance, in some embodiments, the WAN optimizer 215 handles aggregation and compression of neural-network gradients and parameter updates. As a result, bandwidth is significantly reduced and the training rounds are shortened.

Additionally, while the training procedure takes place in a single location, in some embodiments, it can benefit from data augmentation from other locations within the WAN. The WAN optimizer 215 can eliminate data redundancy, thereby significantly reducing the resources spent on data shuffling within the WAN, according to some embodiments. For example, when an anomaly detection machine learning model is built based on historical data application, it often holds structured data with most of the data being similar across the WAN (e.g., URL entries). As such, by implementing the WAN optimizer 215 in the cloud gateway 210, redundancies can be removed at the cloud gateway 210 before the data streams reach the centralized datacenter 205. For instance, each edge FE 230-234 is shown sending a respective updates stream to the WAN optimizer 215 at the gateway 210, while an aggregated and optimized updates stream is sent from the WAN optimizer 215 to the centralized datacenter 205.

The traffic (e.g., the aggregated and optimized updates stream) sent by the gateway router 210 traverses through an intervening network (not shown) to reach a destination-side gateway router (not shown) that forwards traffic to and from the datacenter 205. In some embodiments, the intervening network includes a private network, such as the MPLS network of a telephony company. In other embodiments, the intervening network includes one or more public networks, such as the Internet and/or one or more networks of one or more public clouds. In still other embodiments, the intervening network includes a combination of private and public networks (such as those mentioned above). Such traversal of intervening network fabric by traffic sent from a sender-side gateway (e.g., the cloud gateway 210) to a destination-side gateway (e.g., a destination-side gateway for the datacenter 205), is equally applicable to other WAN examples described below where a sender-side gateway router sends packets (e.g., in data streams) to a destination-side gateway router (e.g., a receiver).

Figure 3:
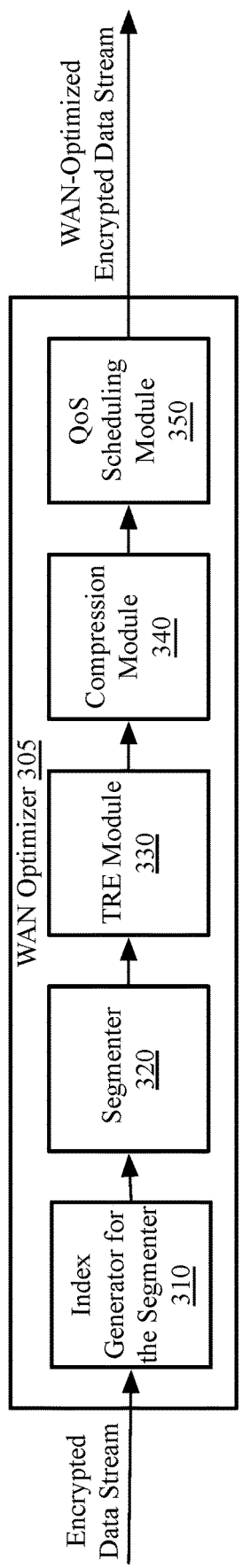
FIG. 3 conceptually illustrates a diagram of a WAN optimizer of some embodiments that is implemented in a cloud gateway.

In some embodiments, all WAN optimization operations are performed by the WAN optimizer that is implemented in the cloud gateway, while in other embodiments, a portion of the WAN optimization operations are performed by the senders of the data streams. FIG. 3 conceptually illustrates a diagram of a WAN optimizer of some embodiments that is implemented in a cloud gateway. As shown, the WAN optimizer 305 includes an index generator 310 for the segmenter, a segmenter 320, a TRE module 330, a compression module 340, and a QoS (quality of service) scheduling module 350.

When data streams are sent to the gateway (e.g., gateway 210), the streams are processed by the components of the WAN optimizer 305. In some embodiments, all data streams that traverse such a gateway are processed by the WAN optimizer 305, while in other embodiments, the gateway and WAN optimizer 305 are configured to only perform WAN optimization operations on certain data streams (e.g., between a certain source and destination). The WAN optimizer 305, in some embodiments, is provided with a particular key to enable to the WAN optimizer 305 to perform the WAN optimization operations on encrypted data streams without having to decrypt these data streams. As will be further described in the embodiments below, this particular key, in some embodiments, is a public evaluation key provided by either a source or destination of the data stream. In addition to the public evaluation key, the source and/or destination of the encrypted data stream, in some embodiments also provide an evaluation function, such as an FHE (fully homomorphic encryption) function for performing the WAN optimization operations on the encrypted data stream.

Homomorphic encryption is an encryption scheme where plaintext data is converted into ciphertext data that can be analyzed and worked with as though the ciphertext data were still in its original form (i.e., the plaintext data). When ciphertext data is generated using homomorphic encryption, computations can be performed on the ciphertext data without decrypting the ciphertext, and generate encrypted results. When the generated encrypted results are decrypted, the decrypted results are identical to results that would have been generated if the computations had been performed on the plaintext content rather than the ciphertext content. That is, homomorphic encryption is a form of encryption with an additional evaluation capability for running computations and programs over ciphertext content (i.e., encrypted data) without decrypting the ciphertext content (e.g., with the secret decryption key). The additional evaluation capability is enabled by homomorphic encryption algorithms, which are a type of encryption algorithm designed to allow the computations and programs to be run over the ciphertext data. Homomorphic encryption can be viewed as an extension of public-key cryptography.

As mentioned above and described further below, some embodiments utilize FHE schemes. FHE schemes further allow any computations and any programs to be run on encrypted inputs (i.e., a generated ciphertext), and produce encrypted results. These computations and programs can be run on the ciphertext by any party (e.g., any third party), including untrusted parties, without revealing the unencrypted inputs (i.e., the plaintext data), or the internal state. As such, these computations and programs can be outsourced without the risk of leaking the encrypted data, such as by sending the ciphertexts to a cloud for processing (e.g., to the public cloud 220 for processing by the WAN optimizer 215 of the gateway 210).

To run the computations and programs on the ciphertexts, FHE schemes use various keys in addition to the ciphertexts as input and produce encrypted outputs. Specifically, as also mentioned above, a public evaluation key generated for the FHE scheme is used as input along with a ciphertext to produce an encrypted output. For instance, upon receiving an encrypted data stream, the index generator 310 uses the public evaluation key and the evaluation function provided by the source and/or destination to compute a set of encrypted indices for the encrypted data stream. It should be noted that different embodiments can use different FHE schemes than those described herein. Additional information regarding homomorphic encryption, and FHE, can be found in the Homomorphic Encryption Standard (The Standard) maintained by the Homomorphic Encryption Standardization Consortium at homomorphicencryption.org.

The public evaluation key allows the index generator 310 to use the evaluation function to compute the set of indices for the encrypted data stream without decrypting the encrypted data stream. The public evaluation key is needed to perform homomorphic operations over the ciphertexts and is provided to any entity that will be performing computations over the ciphertexts. The public evaluation key is used as input along with the ciphertext as mentioned above, thus allowing for any computations or programs to be run over the ciphertext (i.e., the encrypted data stream) without accessing the secret key (i.e., secret decryption key mentioned above and further described below), and outputting encrypted results (i.e., the encrypted indices). As such, any entity that has the public evaluation key, and/or the public encryption key, cannot learn anything about the data from the only ciphertexts (i.e., the secret decryption key is required for an entity to learn about the data).

The computed set of indices use unique identifiers to categorize the data stream, and can include both primary and secondary identifiers for increasing efficiency of search algorithms, according to some embodiments. In some embodiments, given an input string of arbitrary length, the index generator 310 returns a monotonically increasing list of indices such that the index $i_0=0$ and $i_k=|s|$. After generating the set of indices, the index generator 310 provides the set of indices and the encrypted data stream to the segmenter 320.

The segmenter 320, in some embodiments, uses a segmentation function (e.g., derive function) to derive a set of encrypted segments from the encrypted data stream. That is, given a file (e.g., encrypted data stream) and a set of indices, the segmentation function outputs the set of encrypted segments. In addition to the set of encrypted segments, the segmenter 320 also computes a corresponding set of digests (e.g., hashes) for the set of encrypted segments.

For each encrypted segment (of arbitrary length) in the set of encrypted segments, the segmenter 320 returns a string of a fixed length, with that string of fixed length being the digest for that encrypted segment. Each digest is fixed size numeric representation of the contents of a segment, computed by, e.g., a hash function. The digest can be encrypted, in some embodiments, forming a digital signature. Encryption conceals the contents of the plaintext data, while the digest is a special kind of hash that acts as a fingerprint for the data, according to some embodiments. In some embodiments, if the segment digest is encrypted with a private key, this can be used as a digital signature to ensure it came from a particular source. After the set of encrypted segments and corresponding set of digests have been output by the segmenter 320, the segmenter 320 passes the set of encrypted segments and set of digests to the TRE module 330.

The TRE module 330 is configured to identify and remove duplicate segments in order to avoid sending duplicate segments of data. In some embodiments, the duplicate segments include both segments that are duplicates of each other within the data stream, as well as segments that are duplicates of segments known to the receiver (i.e., destination) and stored in a segment cache of the receiver. As such, the TRE module 330 identifies both segments that are duplicates within the data stream, and segments that are duplicates of the segments already in possession of the receiver.

In some embodiments, the TRE module 330 identifies the segments already in possession of the receiver by sending a short digest that uniquely identifies the contents of each segment to the receiver, and subsequently receiving a list of segment digests that the receiver was unable to find in its local segment cache. In other embodiments, the receiver provides a probabilistic data filter (e.g., Bloom filter) to the cloud gateway for use in identifying potential duplicate segments. Once the TRE module 330 has identified the duplicate segments, the TRE module 330 replaces each duplicate segment with the segment's corresponding digest, thereby reducing the amount of data to be transmitted to the receiver. Once the TRE operation is complete, the TRE module 330 provides the encrypted data stream, that is now a combination of segments and digests, to the compression module 340.

The compression module 340 uses a lossless compression function that eliminates redundancies on a smaller scale using a dictionary to replace repeated series of bytes with shorter ones, according to some embodiments. An example of such a compression function used by the compression module 340, in some embodiments, is the LZ4 algorithm, which can provide a compression ratio of 2 and above at speeds of 1 GB per second and above on a single CPU core, in some embodiments. In some embodiments, the compression module 340 can offer compression services that adjust the compression level based on the WAN's network state, and, in some embodiments, based on application data.

Because the segments are encrypted, the compression is performed using the public evaluation key, which allows the encrypted segments to be compressed without the need for any decryption. In some embodiments, the compression module 340 performs the compression operation on each encrypted segment by using a public evaluation key to decrypt, compress, and re-encrypt each segment. In some such embodiments, the public evaluation key is used in an FHE encryption scheme to perform this decryption/encryption operation. The compression module 340, in some embodiments, computes ECF=FHE.Eval(ek, EF, compress) where ek is the evaluation key, EF is the encryption file, and ECF is the encrypted compressed file. After the series of segments and digests have been compressed into a WAN-optimized encrypted data stream, the compression module 340 provides the WAN-optimized encrypted data stream to the QoS scheduling module 350, which schedules the WAN-optimized encrypted data stream for forwarding to its destination (i.e., receiver).

Figure 4:
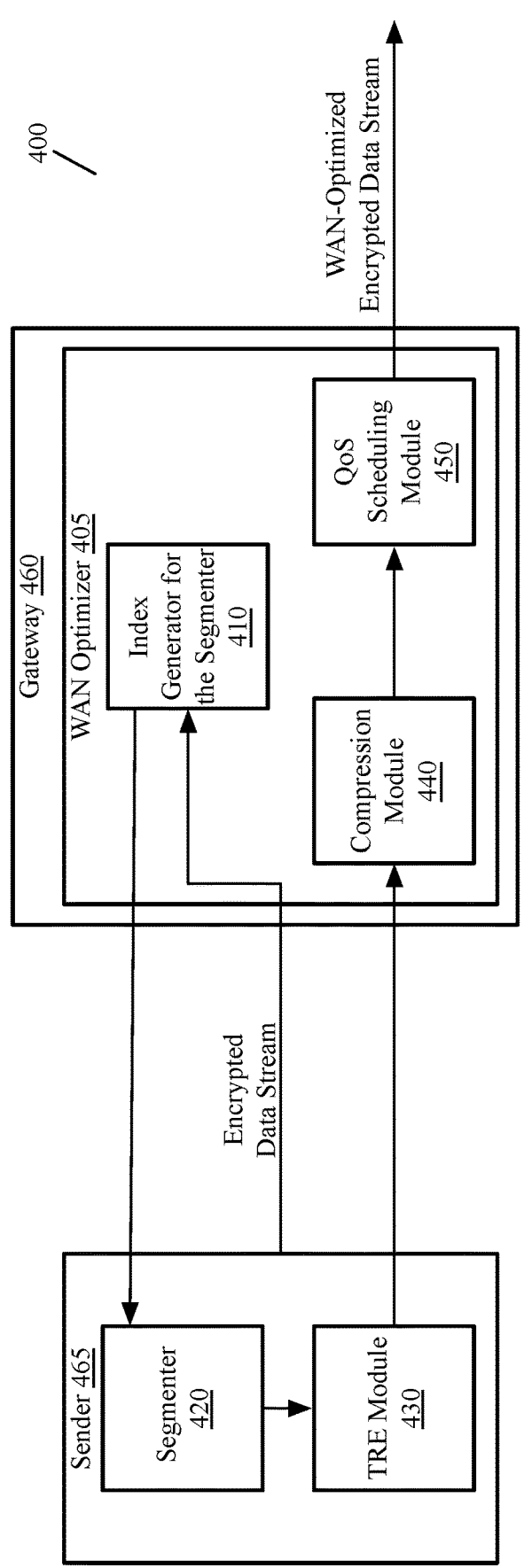
FIG. 4 conceptually illustrates another diagram of a WAN optimizer of some embodiments that is implemented in a cloud gateway.

FIG. 4 conceptually illustrates another diagram of a WAN optimizer of some embodiments that is implemented in a cloud gateway. Unlike the WAN optimizer 305 of FIG. 3, the WAN optimizer 405 in FIG. 4 only performs a subset of the WAN optimization operations. As shown, the diagram 400 includes both a sender 465 (e.g., a source machine) and a gateway 460, with the various WAN optimization operations being split between these two elements. The sender 465 includes a segmenter 420 and a TRE module 430, while the gateway 460 includes the WAN optimizer 405 that includes an index generator 410 for the segmenter 420, a compression module 440, and a QoS scheduling module 450.

In this example, the workflow starts with the sender 465 providing an encrypted data stream to the WAN optimizer 405 in the gateway 460, which is then received by the index generator 410. The index generator 410 computes a set of indices for the encrypted data stream using a public evaluation key and evaluation function provided by either the sender 465 (i.e., source) or receiver (not shown) of the encrypted data stream, as also described above. However, unlike the index generator 310 described above, the index generator 410 then returns the computed set of indices to the sender 465 where the segmenter 420 resides.

At the sender 465, the segmenter 420 uses the set of indices generated by the index generator 410 to derive a set of encrypted segments from the encrypted data stream and to compute a set of digests corresponding to the set of encrypted segments. Though the segmenter 420 performs its segmentation operation at the sender 465 rather than in the WAN optimizer 405 at the gateway 460, the segmentation operation is the same as described above for the segmenter 320. As such, after the set of encrypted segments and set of digests are derived and computed, the segmenter 420 provides them to the TRE module 430 on the sender 465.

In some embodiments, the TRE module 430 on the sender 465 performs the same operations as described above for the TRE module 330. In other embodiments, both the sender 465 and the WAN optimizer 405 on the gateway 460 have a respective TRE module 430, such that a portion of the TRE operation (e.g., removing segments that are duplicates of segments known to the receiver) is performed at the sender 465 and another portion of the TRE operation (e.g., removing segments that are duplicates of other segments in the encrypted data stream) is performed by the WAN optimizer 405 at the gateway 460. In some such embodiments, the portion of the TRE operation performed by the WAN optimizer 405 at the gateway 460 also includes TRE module 430 for data streams that are also aggregated at the gateway 460.

For the embodiments in which all of the TRE operations are performed by the TRE module 430 at the sender 465, the TRE module 430 replaces any duplicate segments (i.e., segments known to the receiver and repeat segments within the data stream) with their corresponding digests and forwards the encrypted segments and digests to the WAN optimizer 405 at the gateway 460 where the encrypted segments and digests are then received by the compression module 440. As will be described in the embodiments below, the TRE module 430 of some embodiments performs an additional operation to replace duplicate segments with encrypted values that map to said duplicate segments in order to provide an added layer of security and to prevent the gateway 460 from being able to deduce any information from, e.g., repeats of the same digest in the encrypted data stream.

Once the encrypted segments and digests (or encrypted values) are received at the compression module 440, the compression module 440 performs its compression operation on the encrypted segments and digests (or encrypted values) to produce a WAN-optimized encrypted data stream for forwarding to the destination (i.e., receiver). The compression module 440 then provides the WAN-optimized encrypted data stream to the QoS scheduling module 450 for scheduling for delivery to the destination according to QoS associated with the WAN-optimized encrypted data stream.

In some embodiments, as mentioned above, SD-WAN cloud gateways are equipped with WAN optimizers and configured as aggregation points for various geographical regions and, as such, receive data streams from edge FEs operating at different branch sites in the various geographical regions for aggregation, optimization, and forwarding to a centralized datacenter. In some such embodiments, while the SD-WAN cloud gateways operate similar to hubs for their respective geographical regions to send data between the edge FEs in the geographical region and the centralized datacenter, the SD-WAN cloud gateways also operate as spokes in a hub-and-spoke architecture with the centralized datacenter.

Figure 5:
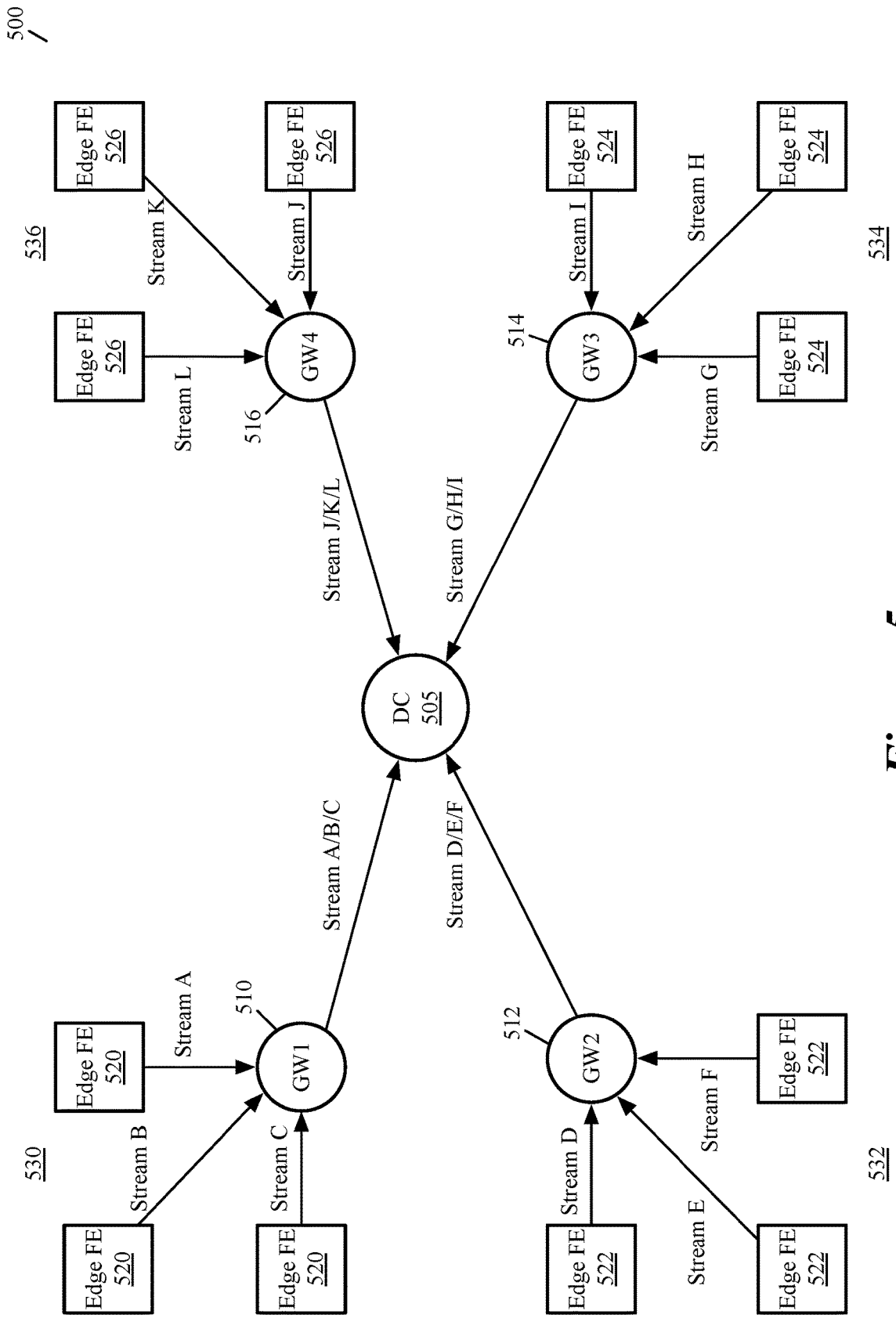
FIG. 5 conceptually illustrates a network of some embodiments that utilizes a hub-and-spoke architecture for aggregating, optimizing, and forwarding data traffic at a set of gateway routers and forwarding the aggregated data traffic to a centralized datacenter location (i.e., a centralized hub).

FIG. 5 conceptually illustrates a network of some embodiments that utilizes a hub-and-spoke architecture for aggregating, optimizing, and forwarding data traffic at a set of gateway routers and forwarding the aggregated data traffic to a centralized datacenter location (i.e., a centralized hub). As shown, the network 500 includes a centralized datacenter 505, a set of gateway routers 510-516, and multiple edge routers 520-526. Each gateway router 510-516 is deployed in a different geographical region 530-536 at which a different set of edge routers 520-526 reside.

In this example, the first region 530 includes gateway router 510 and a set of edge routers 520, the second region 532 includes gateway router 512 and a set of edge routers 522, the third region 534 includes gateway router 514 and a set of edge routers 524, and the fourth region 536 includes gateway router 516 and a set of edge routers 526, as shown. Each gateway router 510-516 is equipped with a WAN optimizer, like the WAN optimizers described above. The WAN-optimizer described in the embodiments herein is a distributed remote applications global optimization network ("DRAGON") that provides traffic redundancy elimination (TRE) and compression services for optimizing data streams forwarded by the gateway router (i.e., east-west traffic). In some embodiments, DRAGON is a SaaS (software as a service) platform that is slotted above a service provider's SASE (secure access service edge) service, used on top of a pathway network that utilizes network infrastructure of public clouds to create auto-scale, software-only, corporate WAN overlay networks across the globe in other embodiments, or implemented as a stand-alone appliance in still other embodiments. DRAGON will be referred to below as a WAN optimizer.

Rather than having the central hub datacenter 505 perform all of the aggregation for data streams from each of the edge routers 520-526, the edge routers 520-526 are configured to send their data streams to their respective gateway router 510-516, which are each equipped with a WAN optimizer, deployed to their respective region 530-536. The gateway routers 510-516 then perform aggregation and WAN optimization operations on the data streams in order to each send a single, optimized, compressed data stream to the centralized datacenter 505 for final aggregation and processing. Because each gateway router 510-516 sends a single, aggregate, optimized data stream rather than each edge router 520-526 sending an individual data stream to the centralized datacenter, the cost of sending the data streams is significantly reduced, according to some embodiments.

For instance, each edge FE 520-526 sends a respective stream A-L to their assigned gateway 510-516, as shown. The WAN optimizers (not shown) that each of the gateways 510-516 is equipped with then performs aggregation and optimization operations on the received data streams to produce a single, WAN-optimized data stream. As illustrated, the gateway 510 sends a single stream A/B/C to the centralized datacenter 505, the gateway 512 sends a single stream D/E/F to the centralized datacenter 505, the gateway 514 sends a single stream G/H/I to the centralized datacenter 505, and the gateway 516 sends a single stream J/K/L to the centralized datacenter 505. Once the centralized datacenter 505 receives all of the streams A/B/C, D/E/F, G/H/I, and J/K/L, the centralized datacenter 505 performs an aggregation operation to combine the streams into a single model.

Each of the streams A-L sent by an edge FE 520-526 is an update stream, in some embodiments, for distributed and federated learning applications, which the centralized datacenter 505 collects and aggregates. As the centralized datacenter 505 receives these update streams, which each include local parameters updates computed by the edge FEs 520-526 from which they originate, in some embodiments, the centralized datacenter 505 uses the update streams to update and train a machine learning model. By pushing a portion of the aggregation process to the gateways 510-516, and implementing the WAN optimizer in the gateways 510-516, bandwidth is significantly reduced and training rounds (i.e., rounds of sending and aggregating update streams) are shortened. As a result, the training of these models can occur more rapidly while also reducing the computations performed at the centralized datacenter 505.

Figure 6:
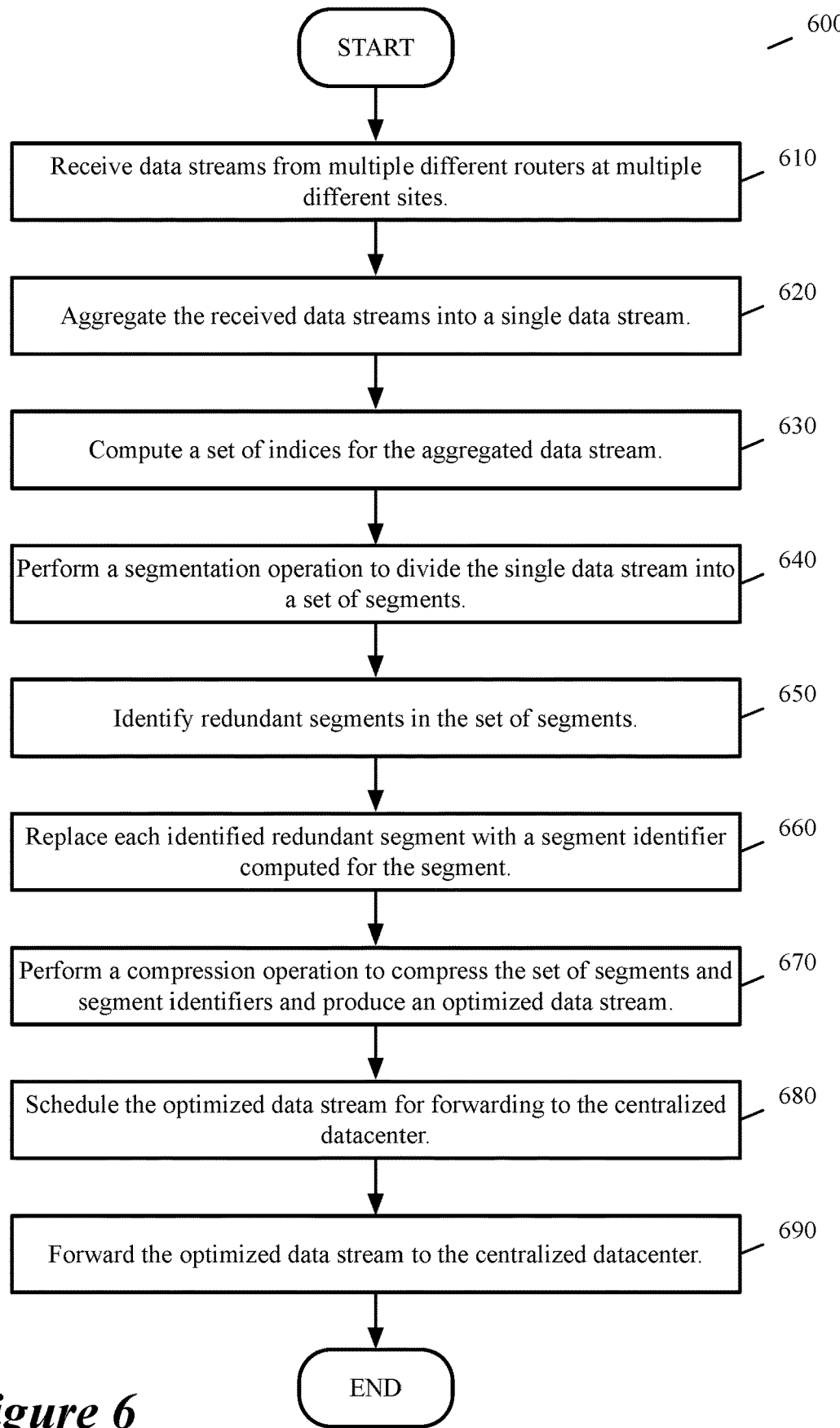
FIG. 6 conceptually illustrates a process performed by WAN-optimizer-equipped gateways deployed to different geographical regions in a hub-and-spoke architecture around a centralized datacenter, in some embodiments.

FIG. 6 conceptually illustrates a process performed by WAN-optimizer-equipped gateways deployed to different geographical regions in a hub-and-spoke architecture around a centralized datacenter, in some embodiments. The process 600 starts when the gateway receives (at 610) data streams from multiple different routers at multiple different sites. For instance, each of the gateways 510-516 in the SD-WAN 500 receives data streams from the edge FEs 520-526 in their respective regions. In some embodiments, each data stream from each edge FE 520-526 (i.e., from each edge router) is an updates stream that includes local parameters updates computed by the edge FE.

The process 600 aggregates (at 620) the received data streams into a single data stream. The WAN optimizer 215, for example, receives updates from each of the edge FEs 230-234 and outputs an aggregated and optimized updates stream that includes the updates received from each of the edge FEs 230-234. In some embodiments, the WAN optimizer-equipped gateways perform the aggregation in a same manner and for the same reasons as a smart hardware switch deployed in a datacenter. That is, each gateway sits in the datapath between the edge FEs and the centralized datacenter in order to perform part of the aggregation that would otherwise be performed at the centralized datacenter. As a result, multiple data streams can be aggregated into a single data stream, thereby also reducing the cost of sending the data to the centralized datacenter as only one stream is being sent from each region (i.e., one stream of data is exiting the public cloud).

The process 600 computes (at 630) a set of indices for the aggregated data stream. The WAN optimizer 305, for instance, includes an index generator 310 for computing sets of indices for data streams received at the gateway in which the WAN optimizer 305 is implemented. The computed set of indices are for use in the segmentation and TRE operations that will be subsequently performed on the aggregated data stream, according to some embodiments. The set of indices includes unique identifiers to categorize the data stream. In some embodiments, the set of indices includes primary identifiers and secondary identifiers. In some such embodiments, the primary identifiers are guaranteed to be free of duplicate identifiers, whereas the secondary identifiers may include duplicate identifiers.

The process 600 performs (at 640) a segmentation operation to divide the single data stream into a set of segments. As described above, after the index generator of some embodiments computes the set of indices, it provides the indices and the data stream to a segmenter. The segmenter then uses the indices to derive a set of segments from the data stream as well as the corresponding set of digests, with each segment having a respective corresponding digest. In some embodiments, the WAN optimization operations may be split between the gateway's WAN optimizer and the sources of the data streams, such as the implementation described above for FIG. 4, and the gateway receives the data streams after these data streams have already been segmented at their sources.

The process 600 identifies (at 650) redundant segments in the set of segments. The TRE module of the WAN optimizer implemented in the gateway performs redundant segment identification, according to some embodiments. The redundant segments can include duplicates within the data stream, as well as segments that are already known to the receiver (e.g., the centralized datacenter). The TRE module identifies the segments already known to the receiver using a probabilistic data filter provided by the receiver that lists all segments (probably) known to the receiver in some embodiments, or by sending a digest to the receiver to request a list of segments from the digest that are unknown to the receiver, as also described above.

After the redundant segments have been identified, the process 600 replaces (at 660) each identified redundant segment with a segment identifier computed for the segment. The segment identifiers used to replace the redundant segments are the digests computed by the segmenter during the segmentation operation, according to some embodiments. As such, when the data stream is received by the receiver, the receiver can use its segment cache to look up the segment identifiers in the data stream, retrieve the corresponding segments from the segment cache, and reinsert the retrieved segments in the data stream in place of the segment identifiers, thereby reconstructing the data stream in full, according to some embodiments.

The process 600 performs (at 670) a compression operation to compress the set of segments and segment identifiers and produce an optimized data stream. The WAN optimizer of some embodiments includes a compression module for performing compression operations on segmented, TRE'd data streams in order to produce WAN-optimized data streams for forwarding to their destination. As mentioned above, the compression module of some embodiments uses a lossless compression function that eliminates redundancies on a smaller scale (e.g., compared to the TRE operation) using a dictionary to replace repeated series of bytes with shorter ones, resulting in a compressed (e.g., zipped) data stream that is WAN-optimized.

The process 600 schedules (at 680) the optimized data stream for forwarding to the centralized datacenter. The WAN optimizer implemented in the gateway of some embodiments includes a QoS scheduling module for scheduling each data stream according to QoS associated with the data stream. In some embodiments, the QoS scheduling module maps segments of the WAN-optimized data stream to internal forwarding queues based on QoS information associated with the data stream. Higher priority traffic queues are sent out before lower priority traffic queues according to a queueing scheme, according to some embodiments.

The process 600 then forwards (at 690) the optimized data stream to the centralized datacenter. That is, once the scheduled WAN-optimized data stream has reached the front of the queue, the gateway forwards the WAN-optimized data stream to the centralized datacenter, where it is reconstructed and aggregated with other WAN-optimized data streams sent to the centralized datacenter for further processing. Following 690, the process 600 ends.

Figure 7:
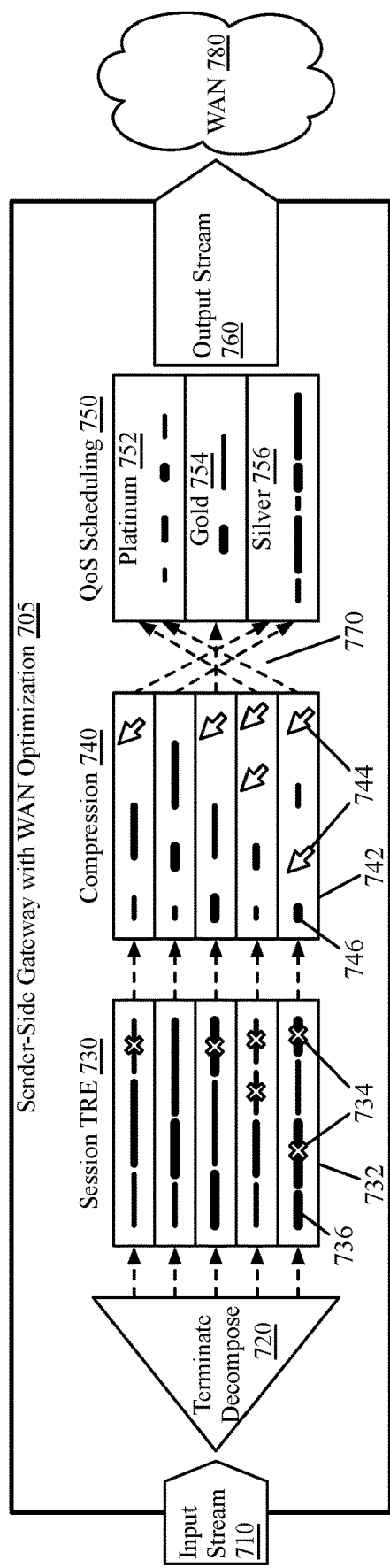
FIG. 7 conceptually illustrates an example diagram of a sender-side gateway (i.e., source-side gateway) equipped with a WAN optimization pipeline, in some embodiments.
Figure 8:
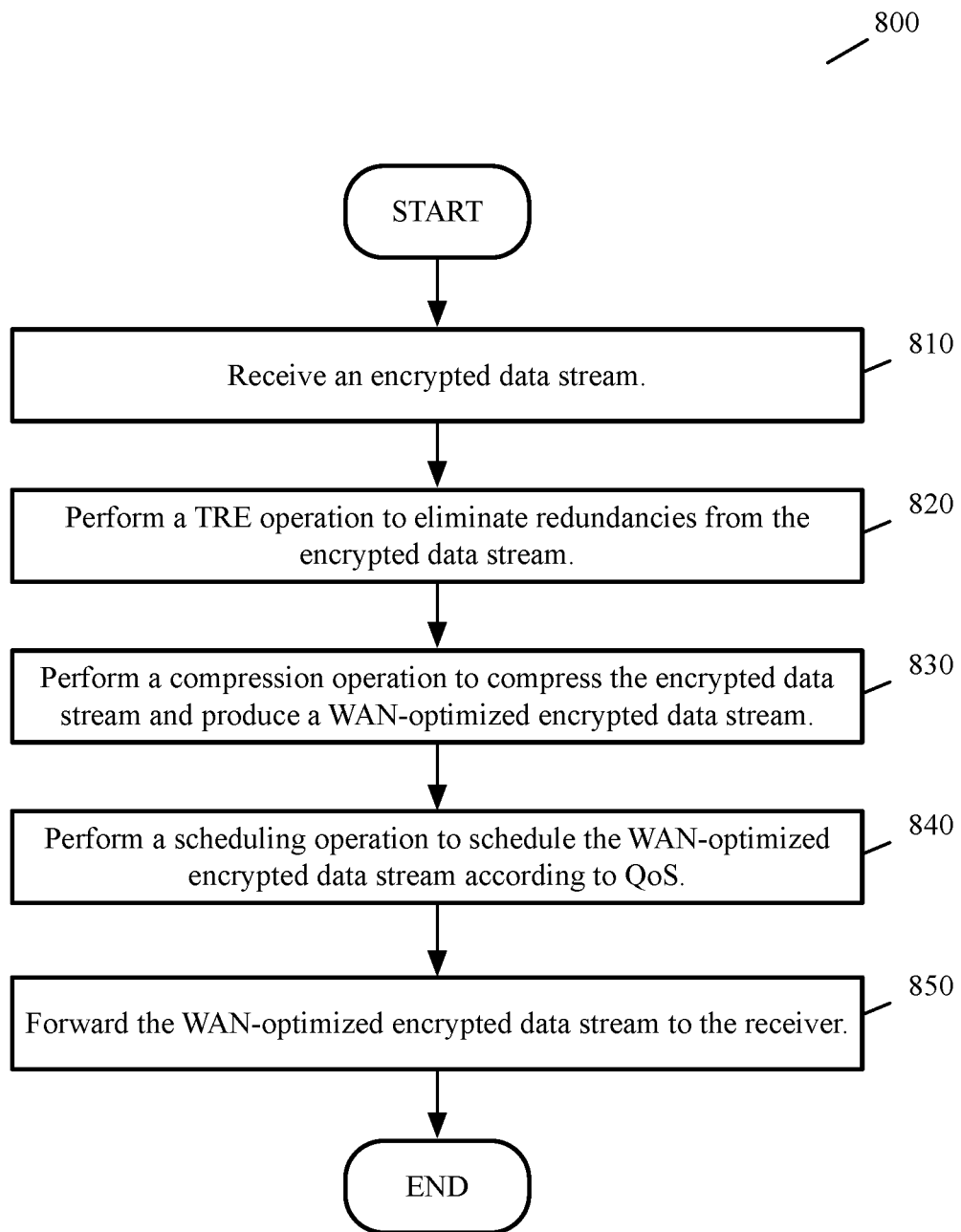
FIG. 8 conceptually illustrates a process performed in some embodiments by a sender-side gateway equipped with a WAN optimization pipeline.

In some embodiments, gateways equipped with WAN optimizers are deployed for both sources and destinations of data streams, with each gateway processing encrypted data streams sent between the sources and destinations without decrypting the encrypted data streams. FIG. 7 conceptually illustrates an example diagram of a sender-side gateway (i.e., source-side gateway) equipped with a WAN optimization pipeline, in some embodiments. In this example, the data stream has already been segmented. As shown, the sender-side gateway 705 includes a session TRE stage 730, a compression stage 740, and a QoS scheduling stage 750. FIG. 7 will be further described below by reference to FIG. 8, which conceptually illustrates a process performed in some embodiments by a sender-side gateway equipped with a WAN optimization pipeline.

The process 800 starts when the sender-side gateway receives (at 810) an encrypted data stream. When data streams are sent to the sender-side gateway 705, for instance, the data streams enter the gateway 705 as input streams 710, the connection is terminated at the termination point 720, and each data stream is placed in a respective buffer in the session TRE stage 730. The terminated connection, in some embodiments, is a TCP (transmission control protocol) connection or any other connection-oriented or connectionless protocol used by the source of the data stream. Also, it should be noted that in this example, the data stream has already been segmented by the source of the data stream.

The process 800 performs (at 820) a TRE operation to eliminate redundancies from the encrypted data stream. For instance, the TRE stage 730 in this example is processing 5 streams, with one stream in each of 5 buffers. In some embodiments, some data streams may not include any duplicate segments, and as such, the TRE operation does not result in any modifications to the data stream. As shown, four of the five data streams being processed at the session TRE stage 730 include redundant segments, as indicated by the white X placed over certain segments. For instance, in the bottom buffer 732, two segments 734 have been identified as duplicate segments.

The process 800 then performs (at 830) a compression operation to compress the encrypted data stream and produce a WAN-optimized encrypted data stream. In the sender-side gateway 705, after the redundant segments have been eliminated, each data stream is passed to a respective buffer at the compression stage 740, which performs a compression operation on each remaining segment in each stream. In the bottom buffer 742 at the compression stage 740, the segments 734 have been eliminated as indicated by the white cursor arrows 744 in their place, while the remaining segments such as segment 746 has been compressed, as illustrated by the size different between the uncompressed segment 736 and the compressed segment 746.

The process 800 performs (at 840) a scheduling operation to schedule the WAN-optimized encrypted data stream according to QoS. Following the compression stage 740 in the sender-side gateway 705, for example, each optimized data stream is placed in a queue of the QoS scheduling stage 750 according to QoS associated with the data stream. The QoS scheduling stage 750 includes three queues-namely a platinum queue 752, a gold queue 754, and a silver queue 756. As indicated by the arrows 770, the segments from the top two buffers of the compression stage 740 have been scheduled in the silver queue 756, the segments from the middle buffer of the compression stage have been scheduled in the gold queue 754, and the segments from the bottom two buffers of the compression stage 740 have been scheduled in the platinum queue 752.

Finally, the process 800 forwards (at 850) the WAN-optimized encrypted data stream to the receiver (i.e., destination). At the QoS scheduling stage 750, as each queue 752-756 is ready to be forwarded, the data streams are sent as output streams 760 to traverse the WAN 780 toward their destinations. Following 850, the process 800 ends.

Figure 9:
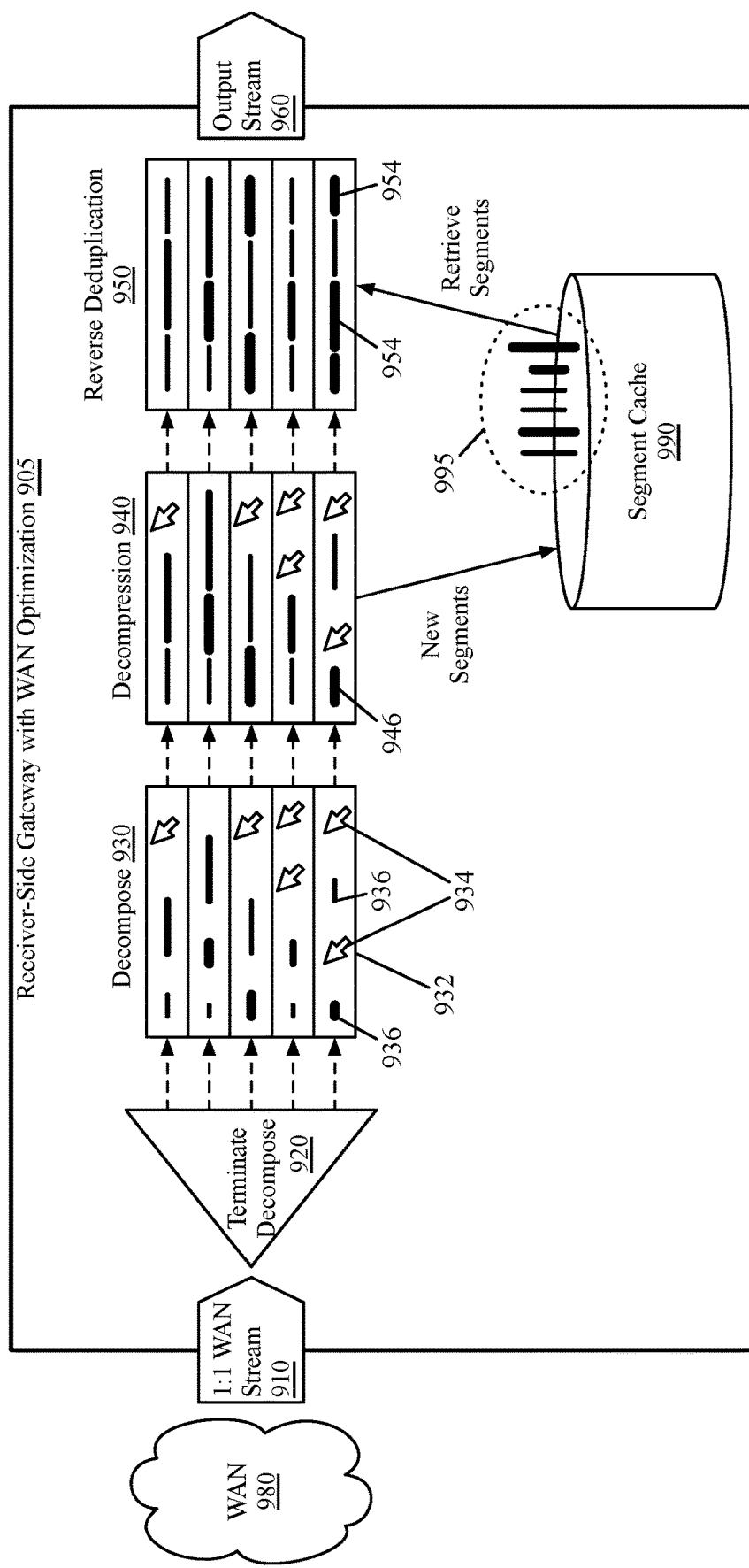
FIG. 9 conceptually illustrates an example diagram of a receiver-side gateway (i.e., source-side gateway) equipped with a WAN optimization pipeline, in some embodiments.
Figure 10:
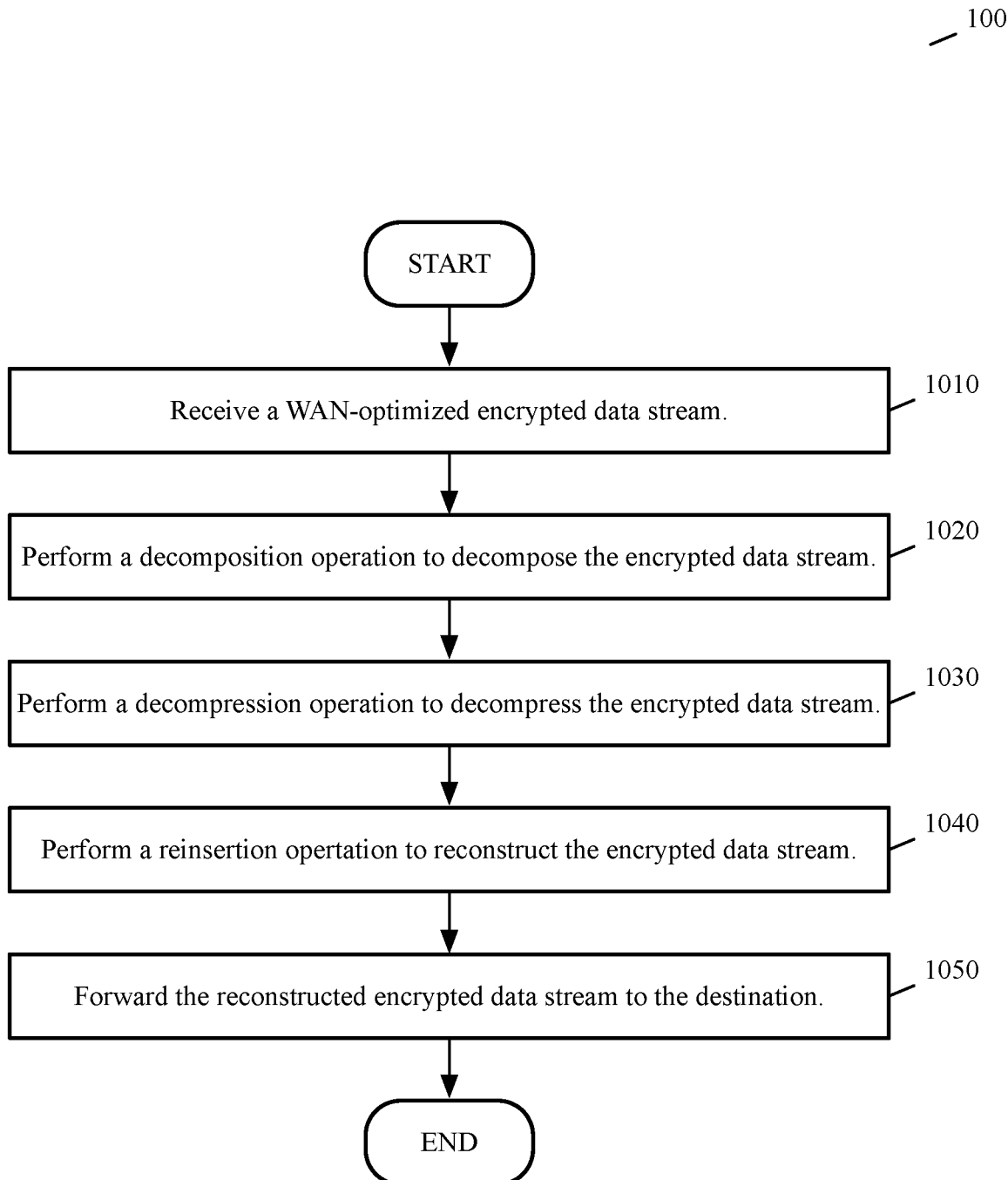
FIG. 10 conceptually illustrates a process performed in some embodiments by a receiver-side gateway equipped with a WAN optimization pipeline.

FIG. 9 conceptually illustrates an example diagram of a receiver-side gateway (i.e., source-side gateway) equipped with a WAN optimization pipeline, in some embodiments. The receiver-side gateway 905 includes a decompose stage 930, a decompression stage 940, a reverse deduplication stage 950, and a segment cache 990, as shown. FIG. 9 will be further described below by reference to FIG. 10, which conceptually illustrates a process performed in some embodiments by a receiver-side gateway equipped with a WAN optimization pipeline.

The process 1000 starts when the receiver-side gateway receives (at 1010) a WAN-optimized data stream. The receiver-side gateway 905, for instance, receives WAN-optimized encrypted data streams sent through the WAN 980. These data streams enter the gateway 905 as ingress streams at 910 and the connections are terminated at 920 at which point they are added to buffers of the decompose stage 930 for per-flow handling.

The process 1000 performs (at 1020) a decomposition operation to decompose the encrypted data stream. That is, the decomposition stage 930 breaks each received data stream down into its segments for further processing. As shown, the bottom buffer 932 of the decompose stage 930 includes two compressed segments 936, while the white cursor arrows 934 represent the segments that may have been replaced by segment digests or other types of identifiers during the TRE operation performed at the source of the data stream and/or sender-side gateway. After the decompose stage 930 has decomposed the encrypted data stream, the segments are passed to the buffers of the decompression stage 940.

The process 1000 performs (at 1030) a decompression operation to decompress the encrypted data stream. As mentioned above, on the sender side, the data stream goes through a compression operation performed by a compression stage of the sender-side gateway. The compression operation, in some embodiments, is a lossless compression operation that eliminates redundancies on a smaller scale using a dictionary to replace repeated series of bytes with shorter ones. As such, the decompression stage 940 performs a decompression operation on the segments of the received data streams to reverse the compression performed on the segments and reintroduce any redundancies eliminated during the compression operation and replace the shorter series of bytes with the longer ones. For example, the compressed segment 936 is replaced with the decompressed segment 946, which is visible longer to illustrate the decompression.

In addition to decompressing the segments, the decompression stage 940 in some embodiments also adds new segments to the segment cache 990. In some embodiments, each full segment received at the receiver-side gateway 905 is assumed to be a new segment as any segments known to the receiver would have been replaced with digests or other encrypted values (e.g., encrypted values generated using a probabilistic encryption operation) during the TRE operation performed at the sender-side gateway. As such, once the segments have been decompressed, they are added to the segment cache 990, where they can be later retrieved for reinsertion into subsequent data streams that arrive with segment identifiers corresponding to these stored segments, in some embodiments. For any full segments that are determined to already exist in the segment cache 990, states for the segments are instead updated in the cache 990 without storing duplicate segments. In some embodiments, each state is a data structure of type dictionary that maps digests to their corresponding segments such that the states are a list of links from digest 1 to segment 1 up through digest m through segment m, with each of the digests being of length n and the segments being of any length. The full segments are then passed to the buffers of the reverse deduplication stage 950.

The process 1000 performs (at 1040) a reinsertion operation to reconstruct the encrypted data stream. That is, for each segment identifier (e.g., digest or encrypted value) received in a data stream, the reverse deduplication stage 950 performs a lookup in the segment cache 990 and retrieves the full segments 995 for reinsertion into the appropriate data streams in place of the segment identifiers. For example, full segments 954 have been inserted where the white cursor arrows 934 previously acted as visual placeholders. Once the full segments have been reinserted, the encrypted data stream is reconstructed.

The process 1000 then forwards (at 1050) the reconstructed encrypted data stream to its destination. As shown, after a data stream has been reconstructed at the reverse deduplication stage 950 of the receiver-side gateway 905, the output stream 960 exits the gateway 905 toward the receiver. In some embodiments, the data stream is not delivered directly to its destination, but rather is forwarded to another forwarding element, such as an edge forwarding element at the edge of a branch site, which then forwards the encrypted data stream to its final destination. Following 1050, the process 1000 ends.

In some embodiments, a protocol is defined between the sender and receiver of a data stream regarding the segments that the receiver already has in its segment cache in order to prevent the sender from sending these known segments. As mentioned above, one such protocol is that the sender first sends a short digest, which acts as a segment identifier that uniquely identifies the content of the segment, of each segment in the input stream, and the receiver responds with a list of segment digests that it is unable to locate in its local segment cache, indicating to the sender that these segments should be sent to the receiver in full for the receiver to store in its segment cache for later use (e.g., for reinsertion operations when subsequent data streams send segment identifiers corresponding to the segment in lieu of sending the full segment). While this protocol decreases the number of full segments that the sender has to send the receiver as the sender will only need to send segments that are unknown to the receiver (i.e., not already stored in the segment cache), the protocol also increases the overhead as each segment digest must first be sent to the receiver to check if it is available in the receiver's segment cache, and, as such, incurs an RTT (round-trip time) latency for each segment that is not yet available in the segment cache (i.e., since the sender will wait for a response from the receiver before sending the segment in full).

Accordingly, in order to avoid the increased overhead, some embodiments instead enable the sender to learn the cache behavior of the receiver. For instance, if the sender is the only one sending segments to the receiver, and the sender has full knowledge of both the algorithm used by the receiver to evacuate old and/or unused segments as well as the size of the cache, then the sender can also know which of the segments that the sender has already sent are in the receiver's segment cache and which were already deleted. As such, the sender can, in some such embodiments, send segments that are missing from the receiver's segment cache in full without having to wait for the receiver's feedback regarding segments that may or may not be missing from its segment cache. Such a protocol would accomplish reducing the overhead of sending segment identifiers/digests for segments that the sender already knows are missing from the receiver's segment cache and would improve the latency for these segments.

However, this is not possible in cases where there are multiple senders sending to the same receiver so that the receiver can take advantage of similar segments between different streams of data coming in from different senders. The reason it is not possible is that the sender no longer has full knowledge of all the inputs to the receiver, even if it has full knowledge of the receiver's algorithm. As such, in some embodiments, to improve the sender's knowledge of which segments are contained in the receiver's segment cache is to send a summary of the segments in the segment cache from the receiver to each of the senders. The senders, in some such embodiments, would then consult this segment cache summary to determine whether or not a certain segment is available in the receiver's segment cache. For segments determined to be available in the segment cache according to the summary, a sender would only send the segment's identifier (e.g., digest), according to some embodiments. For segments determined to be unavailable in the segment cache according to the summary, in some embodiments, the sender would send the segment in full.

However, some such embodiments still do not provide the senders with full knowledge of the receiver's segment cache, as the summary is only true for the moment it is constructed in the receiver. That is, between the time the summary is constructed and the time a sender wants to consult that summary, the segment cache content may have changed as segments may have been removed from the cache and new segments may have been added. For this reason, when a sender sends a segment in full, it may be redundant, in which case the receiver can just ignore the segment or simply update a "last-seen" timestamp for the segment in the segment cache, and when the sender sends only a segment identifier, the receiver might still be missing the corresponding segment and the control protocol between the sender and receiver must still contain a request for the full segment from the receiver to the sender. Accordingly, the goal in some such embodiments is to keep false negatives (i.e., when a sender falsely assumes a cache miss) to a low number, which in turn would reduce the redundant segments sent from the sender to the receiver as well as reduce the bandwidth requirements between the sender and receiver. Additionally, in some such embodiments, it is ideal to also keep false positives to a low number, which will reduce the latency for these segments and slightly reduce the overhead of sending segment identifiers instead of the entire segment, according to some embodiments.

Figure 11:
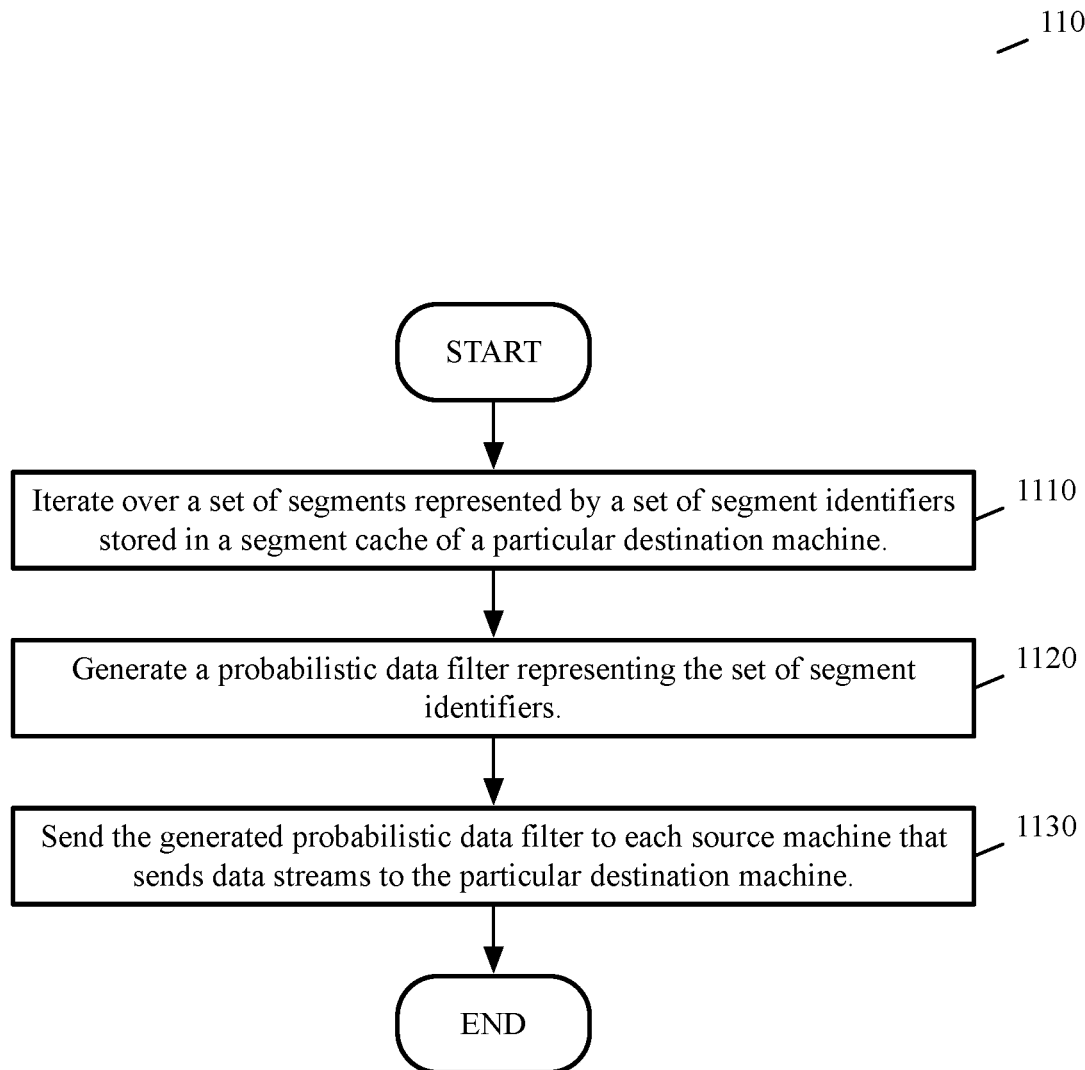
FIG. 11 conceptually illustrates a process performed by a receiver of some embodiments to generate such a probabilistic data filter.

In some embodiments, keep these numbers low, the receiver needs to periodically send the segment cache summary at a higher frequency, or at least send regular updates to the segment cache summary while also avoiding high increases in bandwidth consumption. As such, some embodiments utilize probabilistic data filters (e.g., Bloom filters) that are generated by the receiver and provided to each sender. As the receiver's segment cache experiences updates (e.g., deletion and/or addition of segments), the receiver in some such embodiments updates the probabilistic data filter and sends the updates to the senders to keep redundancies and requests for full segments to a minimum. FIG. 11 conceptually illustrates a process performed by a receiver of some embodiments to generate such a probabilistic data filter.

The process 1100 starts when the receiver iterates (at 1110) over a set of segments represented by a set of segment identifiers stored in a segment cache of a particular destination machine.

The process 1100 generates (at 1120) a probabilistic data filter representing the set of segment identifiers. In some embodiments, after generating the probabilistic data filter, the receiver also performs a compression operation on the generated probabilistic data filter to optimize it before sending.

Figure 12:
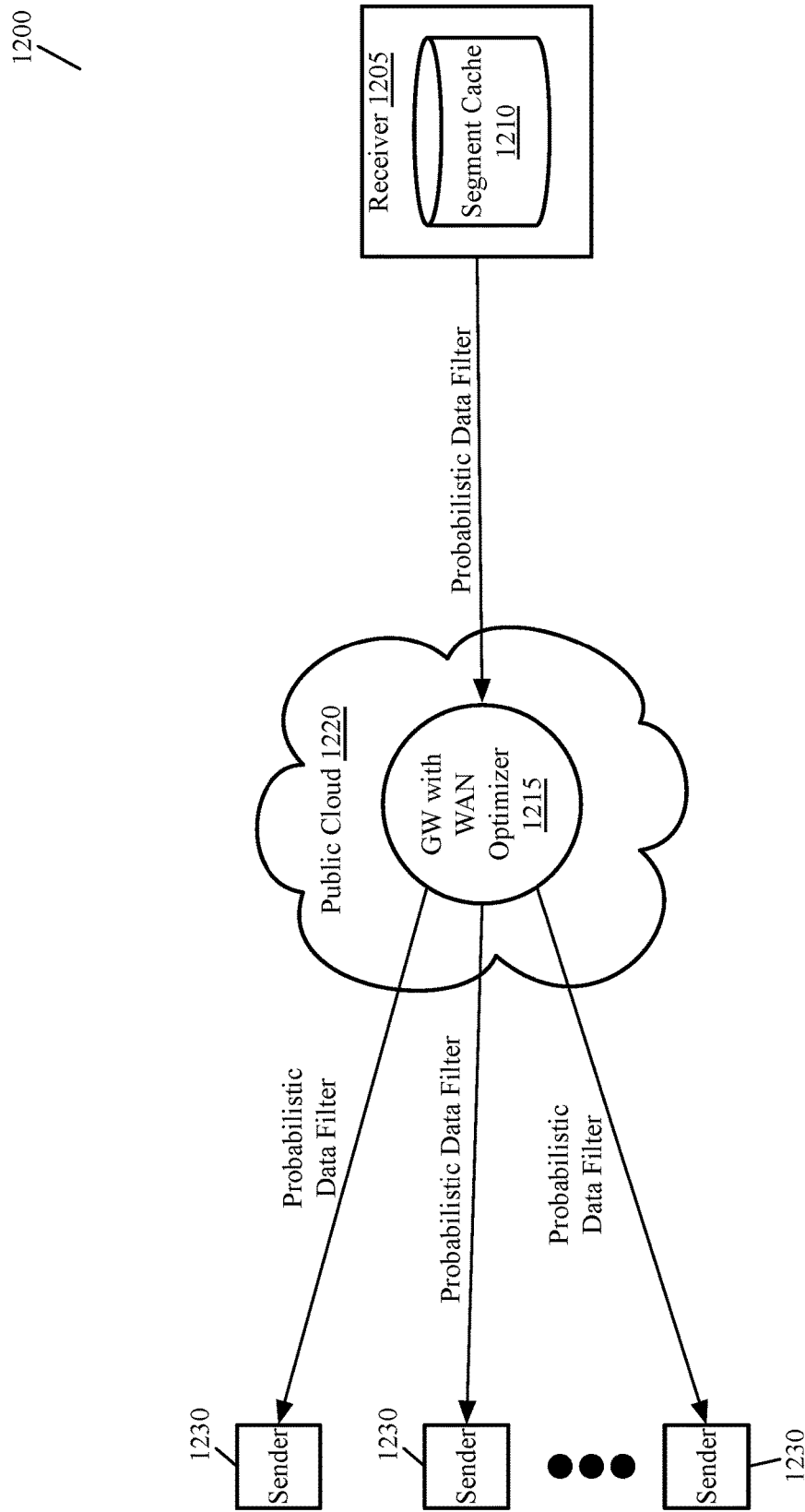
FIG. 12 conceptually illustrates a diagram in which a receiver sends a probabilistic data filter to a gateway and multiple senders.

The process 1100 sends (at 1130) the generated probabilistic data filter to each source machine that sends data streams to the particular destination machine. In some embodiments, when sending the probabilistic data filter to the senders, the receiver also sends the probabilistic data filter to any gateways that perform WAN optimization operations on data streams sent to the receiver for use by the gateways during the WAN optimization operations (e.g., TRE operations). For example, FIG. 12 conceptually illustrates a diagram in which a receiver sends a probabilistic data filter to a gateway and multiple senders. As shown, the diagram 1200 includes a receiver 1205, a gateway with a WAN optimizer 1215 that is deployed to a public cloud 1220, and multiple senders 1230.

The receiver 1205 includes a segment cache 1210 for storing segments it receives. After generating the probabilistic data filter, the receiver 1205 sends the probabilistic data filter to the gateway 1215 as shown. The gateway 1215 then forwards the probabilistic data filter to each of the senders 1230 for use in identifying segments likely to be in the segment cache 1210. As the senders 1230 forward data streams to the receiver 1205, the receiver 1205 updates its segment cache 1210, according to some embodiments. In addition to adding new segments, the receiver 1205, in some embodiments, also periodically may delete segments from the segment cache 1210. Based on these updates to the segment cache 1210, the receiver 1205 updates the probabilistic data filter and forwards the updates to the gateway 1215 and senders 1230.

Figure 13:
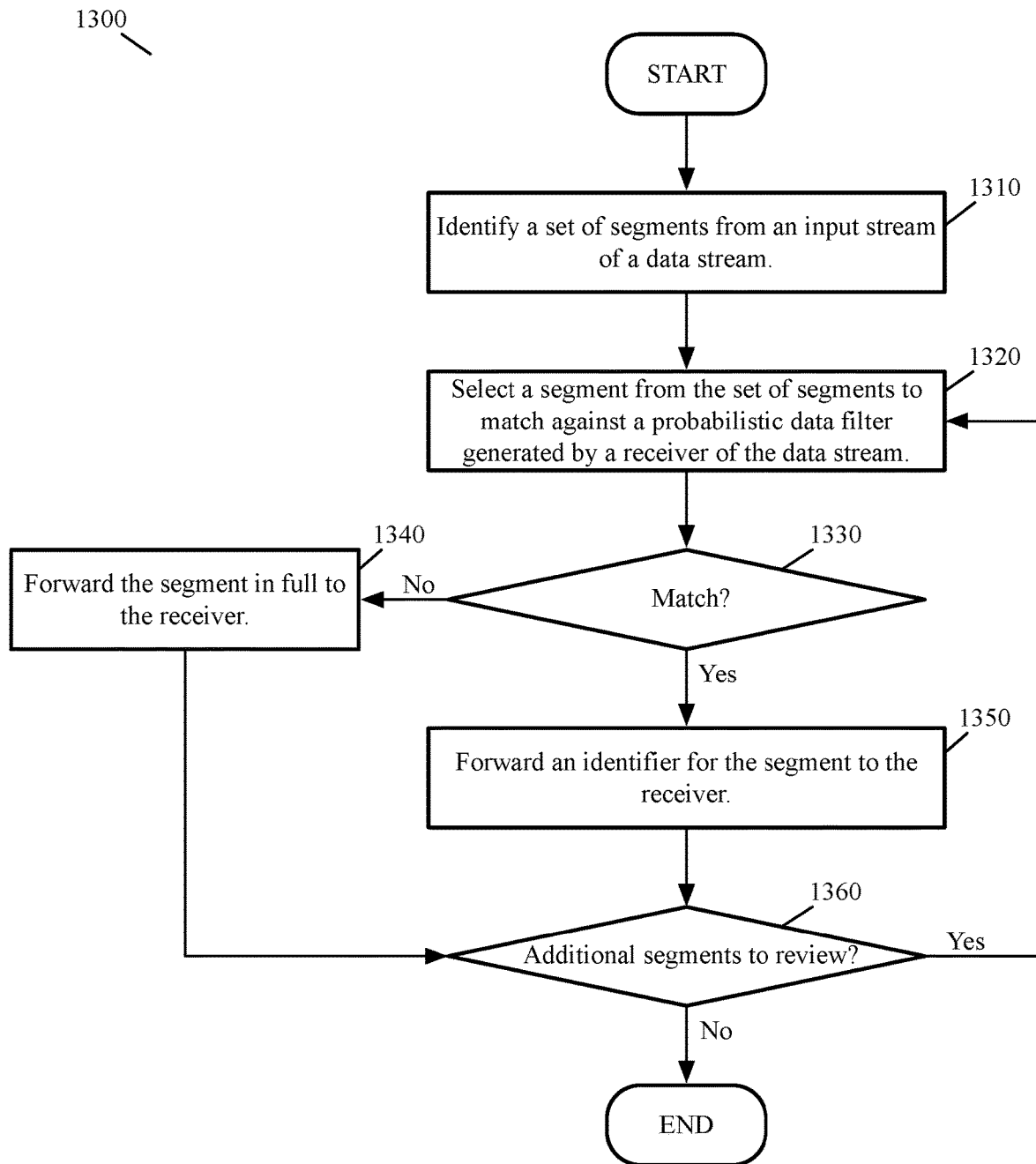
FIG. 13 conceptually illustrates a process for using the probabilistic data filter to determine whether a segment is in the segment cache of the receiver.

FIG. 13 conceptually illustrates a process for using the probabilistic data filter to determine whether a segment is in the segment cache of the receiver. The process 1300 is performed by a sender or gateway equipped with a WAN optimizer. The process 1300 starts when the sender identifies (at 1310) a set of segments from an input stream of a data stream. Like the embodiments described above, the data stream in some embodiments is an encrypted data stream of encrypted segments.

Figure 14:
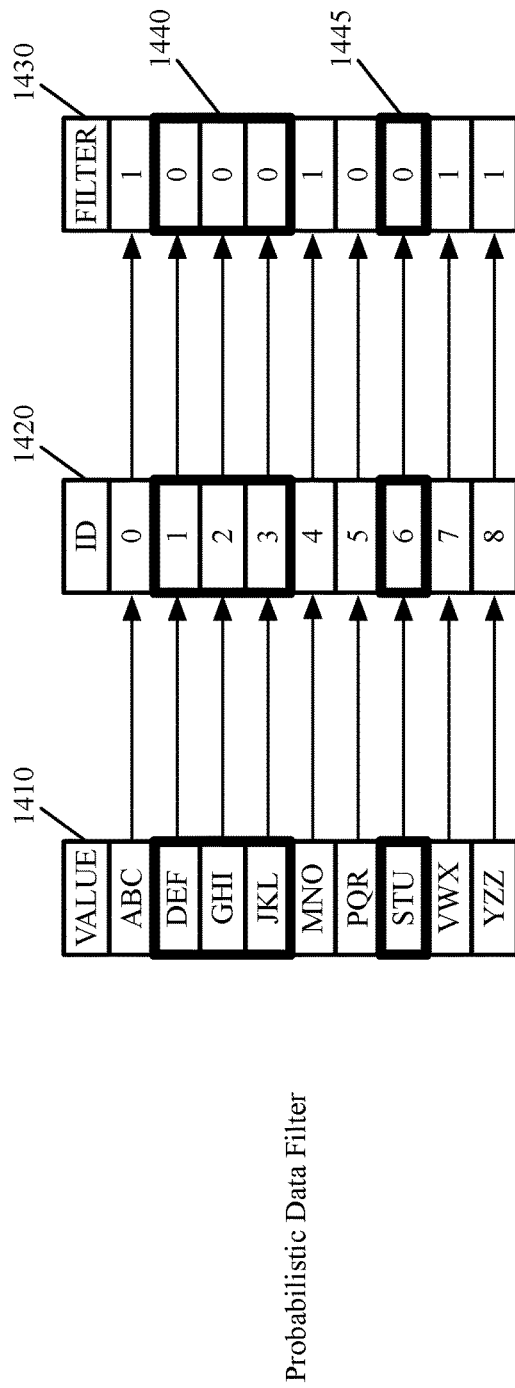
FIG. 14 conceptually illustrates simplified examples of a probabilistic data filter and an updated probabilistic data filter of some embodiments.
Figure 14:
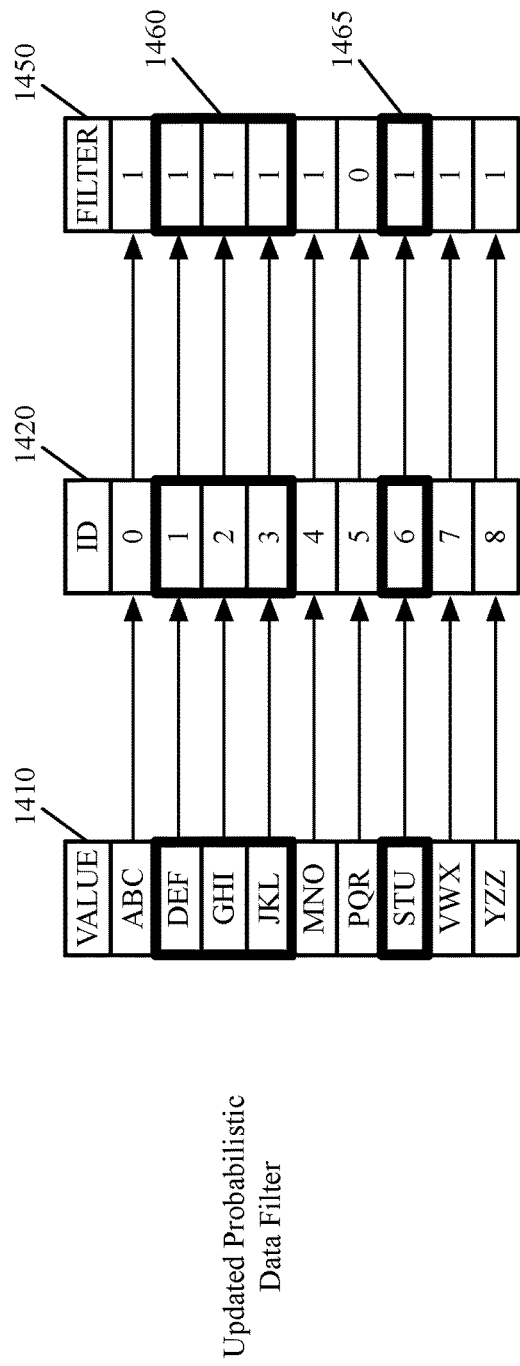

The process 1300 selects (at 1320) a segment from the set of segments to match against a probabilistic data filter generated by a receiver of the data stream. FIG. 14 conceptually illustrates simplified examples of a probabilistic data filter and an updated probabilistic data filter of some embodiments. As shown, the probabilistic data filter 1430 is generated from a set of values 1410 that map to a set of identifiers 1420. Only four of the values show cache hits according to the filter 1430. That is, only four of the values are probably in the segment cache of the sender at the time the filter 1430 was generated.

The process 1300 determines (at 1330) whether there is a match between the segment identifier and any segment identifiers included in the probabilistic data filter from the receiver. For instance, the sender can determine whether there is a cache hit or a cache miss for a value "STU" that corresponds to an identifier "6" using the filter 1430. As shown, the filter 1430 indicates a cache miss 1445 for the value "STU". As such, when the process 1300 determines that there is not a match (i.e., cache miss), the process transitions to forward (at 1340) the segment in full to the receiver. In some embodiments, probabilistic data filters, such as Bloom filters, do not include any false negatives. In other words, at the time the filter 1430 was generated, the value "STU" was definitely not in the segment cache, and thus the sender must send the full segment. Similarly, each of the values "DEF", "GHI", and "JKL", having the respective identifiers of "1", "2", and "3", are all cache misses 1440 according to the filter 1430. As mentioned above, if the receiver has updated its segment cache in the time between generating the probabilistic data filter and receiving the full segments from the sender to include any of the segments now sent by the sender, the receiver would discard the full segments and, in some embodiments, simply update timestamps for the segments in the cache.

As mentioned above, the receiver sends periodic updates to the probabilistic data filter as its cache is updated. For instance, the updated filter 1450 shows cache hits 1460 for the values "DEF", "GHI", and "JKL", as well as a cache hit 1465 for the value "STU". When the process 1300 determines that there is a match (i.e., cache hit), the process transitions to forward (at 1350) an identifier for the segment to the receiver. Using the example in FIG. 14, the sender would send identifiers "1", "2", "3", and "6" for each of the values "DEF", "GHI", "JKL", and "STU" based on the updated filter 1450. While false negatives are unlikely with the probabilistic data filter (i.e., they only occur if the cache has been updated since the filter was generated), false positives can occur and a cache hit is an indication that the segment is probably in the cache, rather than an assurance that the segment is definitely in the cache. As such, in some embodiments, the sender might send a segment identifier for a segment that is not actually in the cache. In some such embodiments, the receiver would send a request to the sender for the full segment.

The process 1300 then determines (at 1360) whether there are any additional segments to review. When there are additional segments to review (i.e., the last segment in the data stream has not yet been reviewed), the process returns to select (at 1320) a segment from the set of segments to match against the probabilistic data filter. Otherwise, when there are no additional segments to review, the process 1300 ends.

As described above, some embodiments implement WAN optimizers in gateways deployed to public gateways in order to optimize traffic between senders and receivers. In these embodiments, instead of sending the file in plain, the sender first encrypts the file (i.e., data stream) using a fully homomorphic encryption (FHE) scheme, which allows the gateway to run the segment algorithm on it even though the file is encrypted. The encrypted indices are returned back to the sender, who uses the encrypted indices to split the file and derive the segments which it then sends to the gateway for further optimization and forwarding, while ensuring the gateway does not see the content of the file. In some such embodiments, the information revealed to the gateway consists of the number of indices, the size of the segments, and their digests.

In the discussions below, the following notation will be used. For a string s, we denote by $|s|$ the length of s and its coordinates by $s_0, \ldots, s_{|s|-1}$. We write [a, b] to denote the set $\{a, a+1, \ldots, b\}$. A list $(a_0, \ldots, a_k)$ is monotonically increasing if $a_j < a_j+1$ for every $j \in [0, k-1]$. A concatenation of two strings $a \in \{0, 1\}^n$ and $b \in \{0, 1\}^m$ is denoted by $c = a \| b$ such that $c \in \{0, 1\}^{n+m}$. It should be noted that the terms segment and chunk may be used interchangeably in the discussions below. Additionally, the algorithms used in the discussions below will include a chunk algorithm, a derive algorithm, a digest algorithm, and a cache algorithm.

The segmentation algorithm is given a string $s \in \{0, 1\}^*$ of arbitrary length, and returns a monotonically increasing list of indices $i_0, \ldots, i_k \in [0, |s|]$ within s, such that $i_0 = 0$ and $i_k = |s|$. The derive algorithm is given a file F and a list of indices $i_0, \ldots, i_k$ and outputs the chunks $c_0, \ldots, c_{k-1}$ such that $c_j = (s_{i_j}, \ldots, s_{i_j-1})$. The digest algorithm is given a string (chunk) $c \in \{0, 1\}^*$ of arbitrary length, and returns a string, called digest (or hash), of a fixed length n. A state is a data structure of type dictionary that maps digests to its corresponding chunks (i.e., segments). That is, a state is of the form $st = \{d_1 \to c_1, \ldots, d_m \to c_m\}$ where $d_i \in \{0, 1\}^n$ is a digest and $c_i \in \{0, 1\}^*$ is a chunk, such that $\text{digest}(c_i) = d_i$. We use $d \in st$ if $d \to c$ (with $d = \text{digest}(c)$) exists in st and $d \notin st$ otherwise. The cache algorithm is given a state st and a list $(m_0, m_1, m_2, \ldots)$, where $m_i$ is a piece of information that may contain either a chunk or a digest, and returns an updates state st'. Let type($m_i$) return chunk if $m_i$ contains a chunk, and otherwise return a digest.

Figure 15:
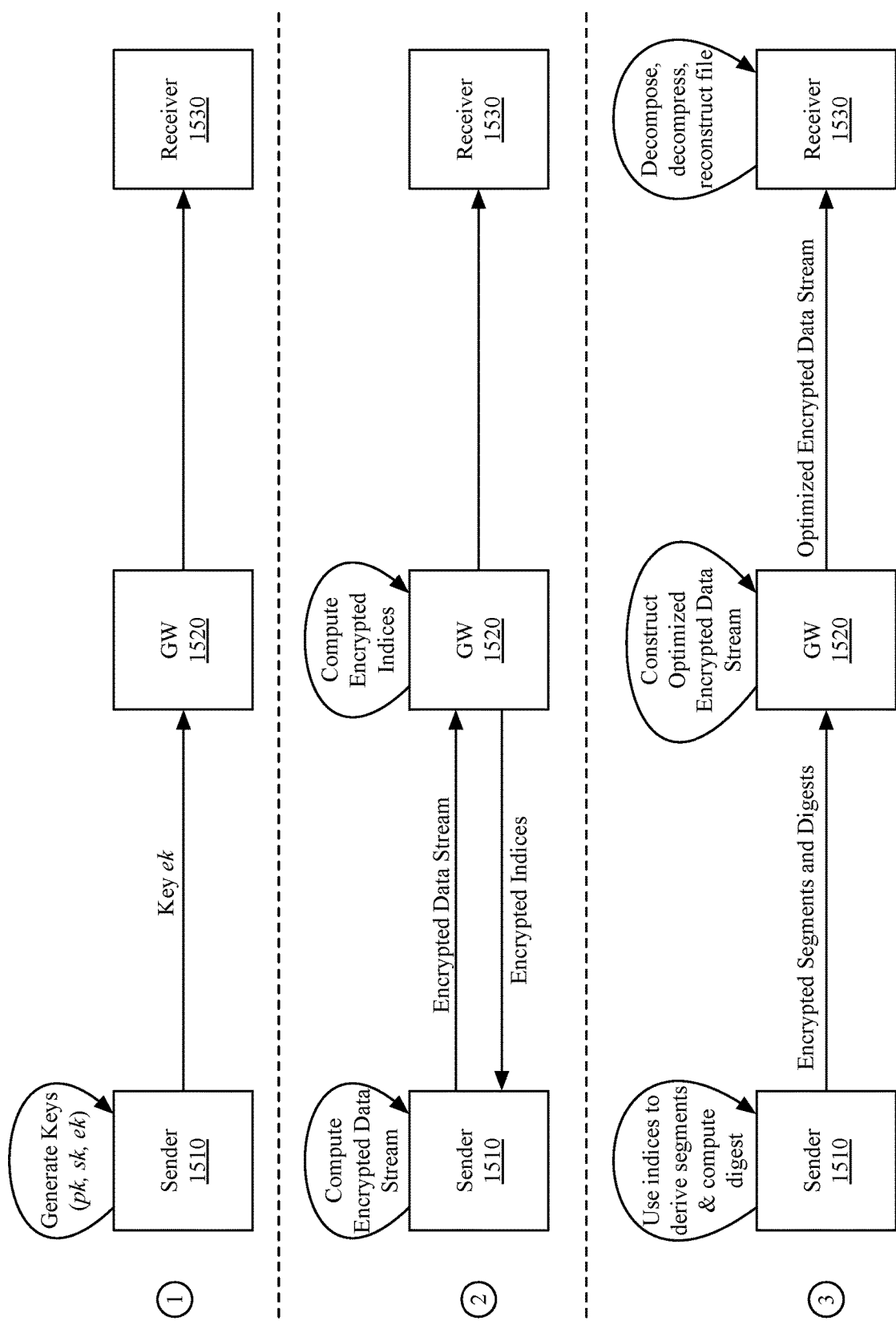
FIG. 15 conceptually illustrates a workflow between a sender, a gateway equipped with a WAN optimizer, and a receiver in some embodiments when sending an encrypted data stream from the sender to the receiver using a first FHE scheme.
Figure 16:
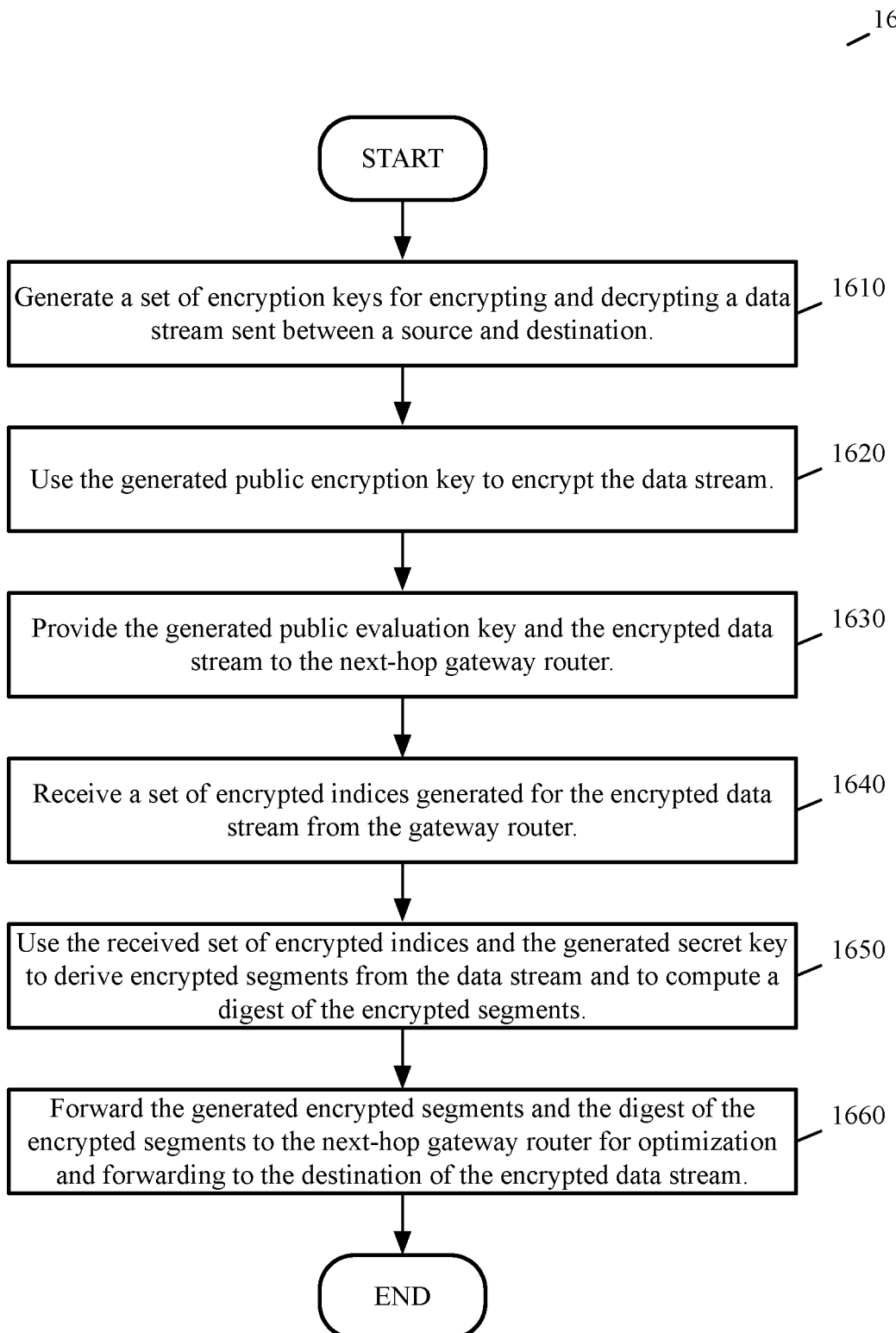
FIG. 16 conceptually illustrates a process performed by a sender in some embodiments when sending an encrypted data stream.

As will be described below, FIGS. 15-18 illustrate a first example of some embodiments that use a fully homomorphic encryption (FHE) scheme. FIG. 15 conceptually illustrates a workflow between a sender, a gateway equipped with a WAN optimizer, and a receiver in some embodiments when sending an encrypted data stream from the sender to the receiver using a first FHE scheme. FIG. 15 will be described by reference to FIGS. 16-18. FIG. 16 conceptually illustrates a process performed by a sender in some embodiments when sending an encrypted data stream.

It should be noted that in the embodiments described below, the sender and receiver share a symmetric key $k \leftarrow \text{SYM.Gen}(1^\kappa)$, that is not shared with the gateway. This symmetric key, k, is not shared with the gateway. To generate the symmetric key, the algorithm Gen is given the security parameter $\kappa$ and outputs a key k. An encryption algorithm Enc, used by the sender, is then given a key k and a plaintext pt (i.e., plaintext data) and outputs a ciphertext ct (i.e., an encrypted version of the file or data stream). Lastly, a decryption algorithm Dec, used by the receiver, is given the key k and ciphertext ct and outputs the plaintext pt.

The process 1600 starts when the sender generates (at 1610) a tuple of keys for encrypting, evaluating, and decrypting a data stream sent between a source and destination. For instance, in FIG. 15, the sender 1510 at the encircled 1 is illustrated as generating a tuple of keys (pk, sk, ek). This generated tuple of keys is different from the symmetric key described above that is shared by the sender and receiver. The tuple of keys (pk, sk, ek) includes a public encryption key pk, a secret decryption key sk, and a public evaluation key ek. The sender generates these keys using an algorithm Gen, which when given the security parameter $\kappa$, outputs the set of keys pk, sk, and ek (i.e., (pk, sk, ek) $\leftarrow$ FHE.Gen($1^\kappa$)).

The properties of a secure homomorphic encryption include correctness, security, and utility. With regard to correctness, it holds that FHE.Dec(sk, FHE.Enc(pk, pt))=pt, where (pk, sk, ek)$\leftarrow$FHE.Gen($1^\kappa$). The security follows a typical chosen-plaintext attack (CPA) security definition of an encryption scheme. Lastly, with regard to utility, for every (pk, sk, ek)$\leftarrow$FHE.Gen($1^\kappa$) and every m-ary function $f$, let $ct_1, \ldots, ct_m$ be m ciphertexts and $pt_1, \ldots, pt_m$ be their corresponding plaintexts. That is, $pt_i$=FHE.Dec(sk, $ct_i$) for every $i \in [m]$. It holds that $f(pt_1, \ldots, pt_m)$=FHE.Dec(sk, FHE.Eval(ek, $f$, $ct_1, \ldots, ct_m$)).

The process 1600 uses (at 1620) the generated public encryption key (pk) to encrypt the data stream. That is, the sender S has the file $F \in \{0, 1\}^*$ and computes $\hat{F} \leftarrow$ FHE.Enc(pk, F). The encrypted data steam (also referred to herein as a ciphertext) can later be decrypted at the receiver using the generated secret decryption key (sk) as will be described further below.

The process 1600 provides (at 1630) the generated public evaluation key (ek) and the encrypted data stream ($\hat{F}$) to the next-hop gateway router. In some embodiments, the sender provides the public evaluation key (ek) to the gateway router after it has been generated and before computing the encrypted data stream. For instance, the sender 1510 is shown providing the key ek to the gateway 1520 at the encircled 1, and subsequently computing the encrypted data stream and providing the encrypted data stream to the gateway 1520 at the encircled 2. By providing the public evaluation key ek to the gateway 1520, the sender 1510 enables the gateway to generate the set of encrypted indices without having to decrypt the encrypted data stream, as well as perform other operations on the encrypted data stream as will be described further below.

The process 1600 receives (at 1640) a set of encrypted indices ($\hat{i}_0, \ldots, \hat{i}_k$) generated for the encrypted data stream from the gateway router. The gateway 1520, for instance, provides encrypted indices to the sender 1510 at the encircled 2. As described above for FIGS. 3 and 4, the gateway routers are equipped with WAN optimizers 305/405 that include an index generator 310/410 for generating the encrypted indices for the encrypted data streams, in some embodiments. The generated encrypted indices are then provided to a segmenter 320/420, which in some embodiments, such as for the WAN optimizer 305, is located at the gateway, while in other embodiments, such as in the diagram 400, the segmenter 420 is located at the sender 465.

The process 1600 uses (at 1650) the received set of encrypted indices and the generated secret key to derive encrypted segments from the data stream and to compute a digest of the encrypted segments. That is, the sender computes $i_j \leftarrow$ FHE.Dec(sk, $\hat{i}_j$) for all $j \in [0, k]$ and, from these indices, derives the chunks ($c_0, \ldots, c_{k-1}$) (i.e., the segments) and computes the digests $d_j$=digest($c_j$) for all $j \in [0, k-1]$. Each digest is a special kind of hash that acts as a fingerprint for the data, in some embodiments, and if the segment digest is encrypted with a private key, this can be used as a digital signature to ensure it came from a particular source in some such embodiments.

The process 1600 forwards (at 1660) the generated encrypted segments and the digest of the encrypted segments to the next-hop gateway router for optimization and forwarding to the destination of the encrypted data stream. More specifically, the sender computes $\hat{c}_j \leftarrow \text{SYM.Enc}(k, c_j)$ for all $j \in [0, k-1]$ and sends $(\hat{c}_0, d_0), \ldots, (\hat{c}_{k-1}, d_{k-1})$ to the gateway. For instance, the sender 1510, at the encircled 3, uses the indices to derive segments and compute digests, and then sends the encrypted segments and digests to the gateway 1520 for further optimization and forwarding to the receiver 1530. Following 1660, the process 1600 ends.

Figure 17:
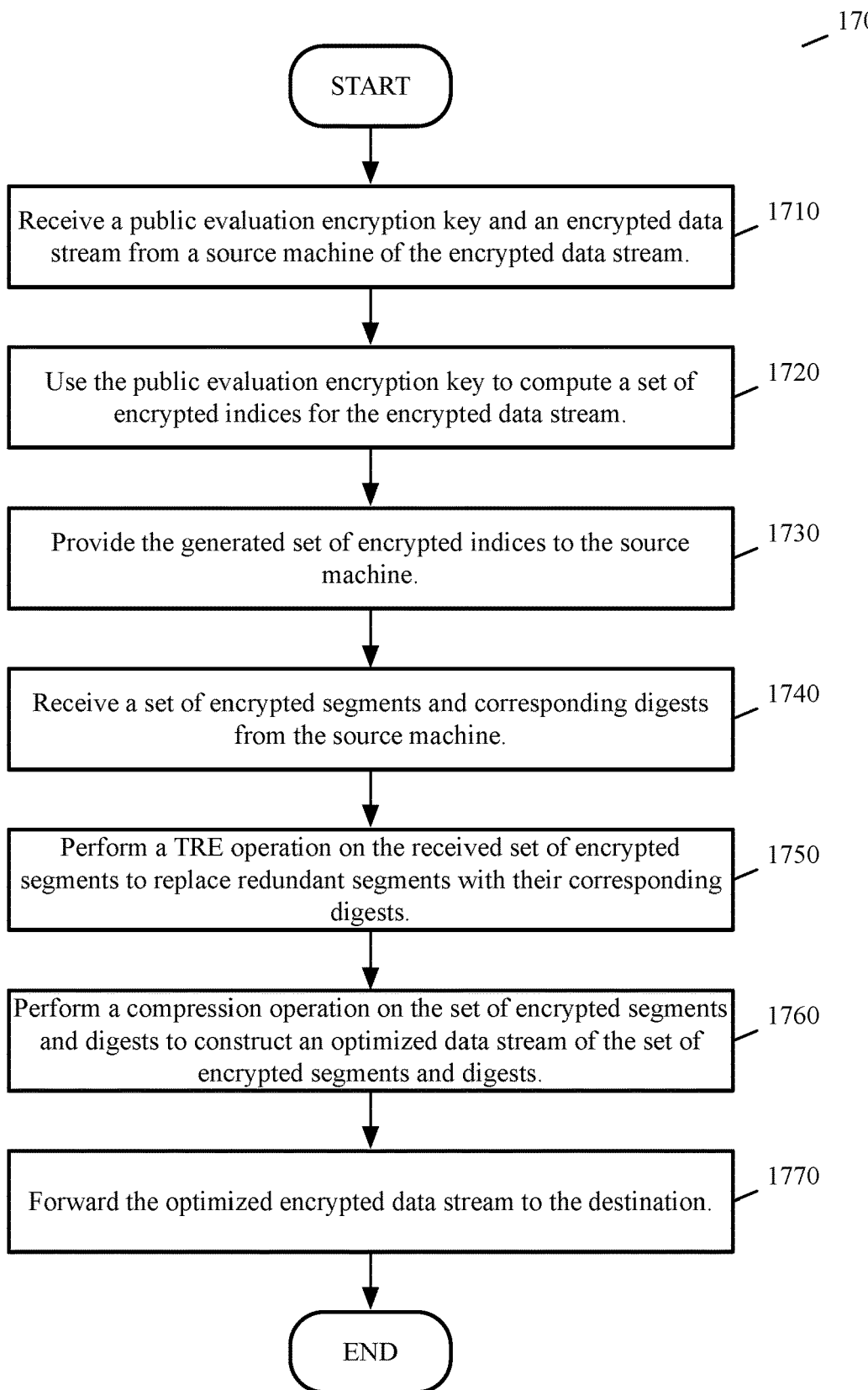
FIG. 17 conceptually illustrates a process performed in some embodiments by a gateway router that is deployed to a public cloud and equipped with a WAN optimizer for optimizing encrypted data streams sent from at least one sender to at least one receiver.

FIG. 17 conceptually illustrates a process performed in some embodiments by a gateway router that is deployed to a public cloud and equipped with a WAN optimizer for optimizing encrypted data streams sent from at least one sender to at least one receiver. The process 1700 starts when the gateway router receives (at 1710) a public evaluation key and an encrypted data stream from a source machine of the encrypted data stream. In some embodiments, the gateway router receives the public evaluation key separately from, and prior to receiving the encrypted data stream. For instance, in some embodiments, the sender computes the set of keys and provides the public evaluation key to the gateway router before encrypting the data stream (i.e., computing the ciphertext) that is eventually provided to the gateway router. At the encircled 1 in FIG. 15, for instance, the gateway 1520 receives the key ek from the sender 1510, and subsequently receives the encrypted data stream at the encircled 2.

The process 1700 uses (at 1720) the public evaluation key to compute a set of encrypted indices for the encrypted data stream. The gateway 1520, for example, is illustrated as computing the encrypted indices after receiving the encrypted data stream and key ek from the sender 1510. To generate the indices, the gateway uses the Eval algorithm and computes $(\hat{\iota}_0, \ldots, \hat{\iota}_k) \leftarrow \text{FHE.Eval}(ek, \text{chunk}, \hat{F})$, where $(\hat{\iota}_0, \ldots, \hat{\iota}_k)$ represents the computed indices. In other words, given an input string of arbitrary length, Eval algorithm used by the gateway returns a monotonically increasing list of indices such that the index $i_0=0$ and $i_k=|s|$.

The process 1700 provides (at 1730) the generated set of encrypted indices to the source machine. Because the source machine (i.e., sender) is responsible in this FHE scheme for segmenting the data stream and generating the digests, as described above with reference to the process 1600, the gateway router must return the indices to the source machine to enable the source machine to perform the computations to derive the segments (i.e., chunks) and compute the corresponding digests.

Accordingly, the process 1700 receives (at 1740) a set of encrypted segments and corresponding digests from the source machine. More specifically, from the source machine, the gateway router receives $(\hat{c}_0, d_0), \ldots, (\hat{c}_{k-1}, d_{k-1})$, representing the chunks and corresponding digests. At the encircled 3 in FIG. 15, for example, the gateway 1520 receives the encrypted segments and digests from the sender 1510, which the sender 1510 computed using the indices generated and provided by the gateway 1520.

The process 1700 performs (at 1750) a TRE operation on the received set of encrypted segments to replace redundant segments with their corresponding digests and performs (at 1760) a compression operation on the set of encrypted segments and digests to construct an optimized data stream of the set of encrypted segments and digests. The TRE operation and compression operation are the WAN optimizations that the gateway router performs on encrypted data streams (without decrypting these encrypted data streams) before forwarding to the receivers (i.e., destinations) of these encrypted data streams.

In some embodiments, the sender has already performed the TRE operation on the encrypted segments and replaced redundant segments with their corresponding digests before providing the encrypted segments and digests to the gateway, and the WAN optimization performed by the gateway includes compressing the encrypted segments and digests to produce the optimized encrypted data stream. The gateway router uses the encrypted segments and digests to construct the optimized encrypted data stream (i.e., file) $F'=(m_0, \ldots, m_{k-1})$ where $m_i=\hat{c}_i$ if $d_i \notin st_S$ and $m_i=d_i$ otherwise.

The process 1700 forwards (at 1770) the optimized encrypted data stream to the destination. In some embodiments, in addition to forwarding the optimized encrypted file F' where $F'=(m_0, \ldots, m_{k-1})$, the gateway router also updates $st_S=\text{cache}(st_S, F')$ to reflect that these chunks have been sent, and thus prevent the gateway router from sending redundant chunks in future data streams, according to some embodiments. For example, a subsequent data stream may include a chunk that is now stored in the segment cache after the initial data stream has been sent, and thus, the gateway would only need to send the digest for the segment rather than the full segment to the receiver based on the full segment having been added to the segment cache, and without requiring any updates from the receiver (i.e., updates regarding what it has stored in its segment cache). Following 1770, the process 1700 ends.

Figure 18:
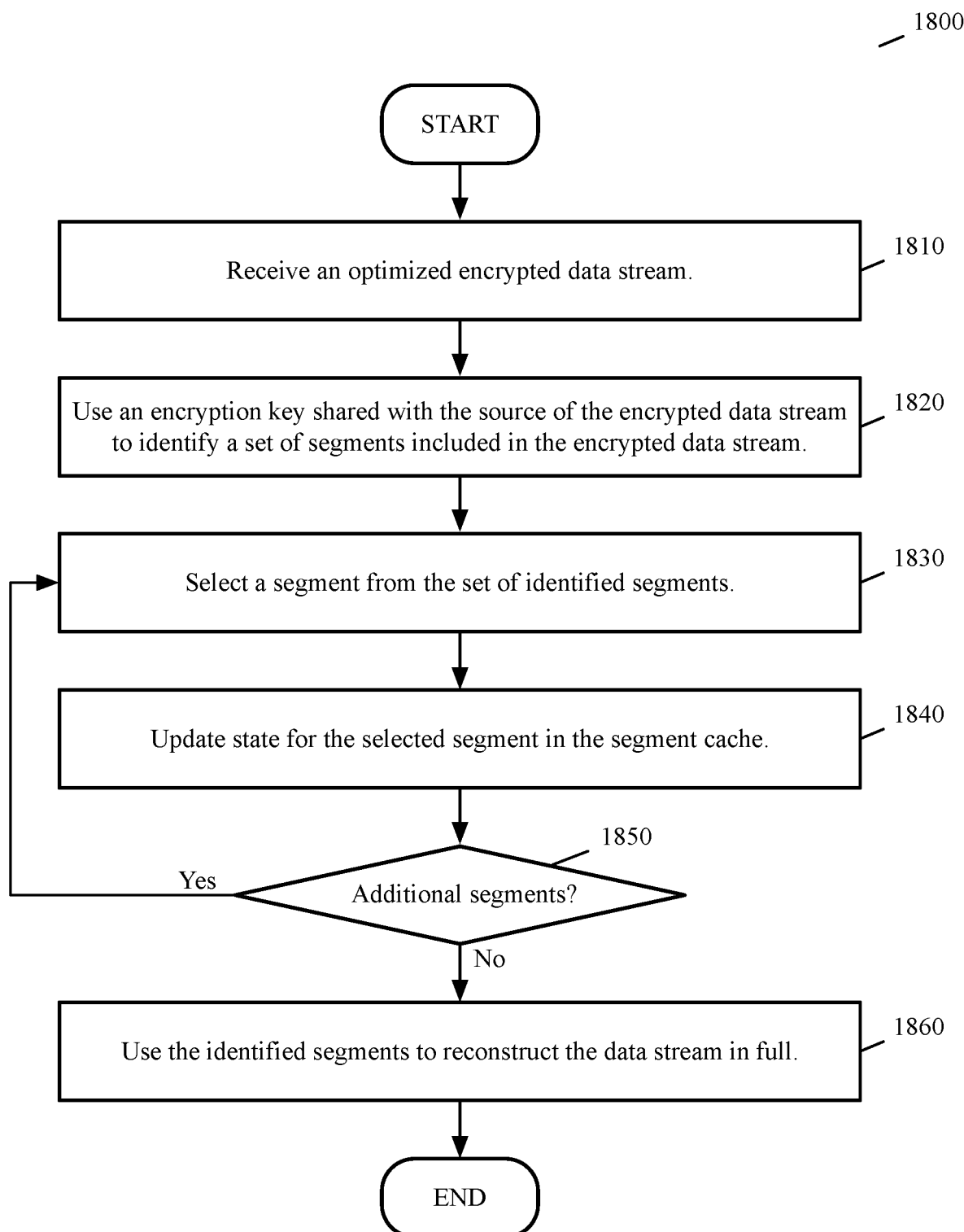
FIG. 18 conceptually illustrates a process performed in some embodiments by a receiver of an optimized, encrypted data stream.

FIG. 18 conceptually illustrates a process performed in some embodiments by a receiver of an optimized, encrypted data stream. The receiver, in some embodiments, is a receiver-side gateway router deployed to a public cloud to process optimized, encrypted data streams sent between a particular source and the receiver. In other embodiments, the receiver is a destination device of the data stream. The process 1800 starts when the receiver receives (at 1810) an optimized encrypted data stream. As described in the processes 1600 and 1700 above, the optimized encrypted data stream F' in this FHE scheme is equal to $(m_0, \ldots, m_{k-1})$, wherein where $m_i=c_i$ if $d_i \notin st_S$ and $m_i=d_i$ otherwise. The optimized encrypted data stream is received from a sender-side gateway router deployed to a public cloud to perform WAN optimization and forwarding operations for data streams sent between the sender and receiver. The receiver 1530, for example, is illustrated in FIG. 15 at the encircled 3 as receiving an optimized encrypted data stream from the gateway 1520.

The process 1800 uses (at 1820) an encryption key shared with the source of the encrypted data stream to identify a set of segments included in the encrypted data stream. As described above, the encryption key shared between the source and destination (i.e., sender and receiver) is a symmetric encryption key k computed by the sender ($k \leftarrow \text{SYM.Gen}(1^k)$), in some embodiments. This symmetric key is not shared with the gateway that optimizes the encrypted data stream. To identify the set of segments, the receiver computes $m_i=\text{SYM.Dec}(k, m_i)$ for all $i \in [0, k-1]$ such that $\text{type}(m_i)=\text{chunk}$.

The process 1800 selects (at 1830) a segment from the set of identified segments and updates (at 1840) state for the selected segment in the segment cache. For instance, for each segment, the receiver updates $st_R=\text{cache}(st_R, F')$. As describe above, each state is a data structure of type dictionary that maps digests to their corresponding segments such that the states are a list of links from digest 1 to segment 1 up through digest m through segment m, with each of the digests being of length n and the segments being of any length. In some embodiments, each state has a corresponding counter that is also updated with a timestamp to reflect the most recent receipt of the corresponding segment and/or digest.

The process 1800 determines (at 1850) whether there are additional segments for selection. In other words, the process 1800 determines whether the last chunk in the stream has been processed. When the process 1800 determines that there are additional segments for selection, the process 1800 returns to step 1830 to select a segment from the set of identified segments. Otherwise, when the process 1800 determines that there are no additional segments for selection, the process 1800 transitions to use (at 1860) the identified segments to reconstruct the data stream in full. The receiver reconstructs the file $F=(c_0, \ldots, c_{k-1})$ with $c_i=st_R[m_i]$ if $m_i \in st_R$, and $c_i=m_i m_i \notin st_R$. Following 1860, the process 1800 ends.

As mentioned above, the information revealed to the gateway consists of the number of indices, the size of the chunks, the digests and how many times the digests repeat. To justify this effort, suppose that the file to transfer contains a DNA data. Each gene has its own pattern, for instance, gene $g_1$'s contains a sequence of 5 nucleotides that repeats itself in positions 1, 290, 1123 in the file, and gene $g_2$ contains a sequence of 5 nucleotides that repeats itself in positions 5, 30, 60, 110. The gateway, which knows that the file contains a DNA sequence, can compute the digests of all possible 5-nucleotides sequences, and compare them to the digests received from the sender, in order to determine which DNA sequence was sent (and hence, other sensitive information). Furthermore, even if these sequences were of 100 nucleotides, in which case computing the digest of all possible 100-nucleotides sequences was not feasible, the gateway could distinguish between $g_1$ and $g_2$ by simply looking at the list of digests and counting how many times the same sequence is sent (i.e., how many times the digest of the repeating sequence repeats itself).

Figure 19:
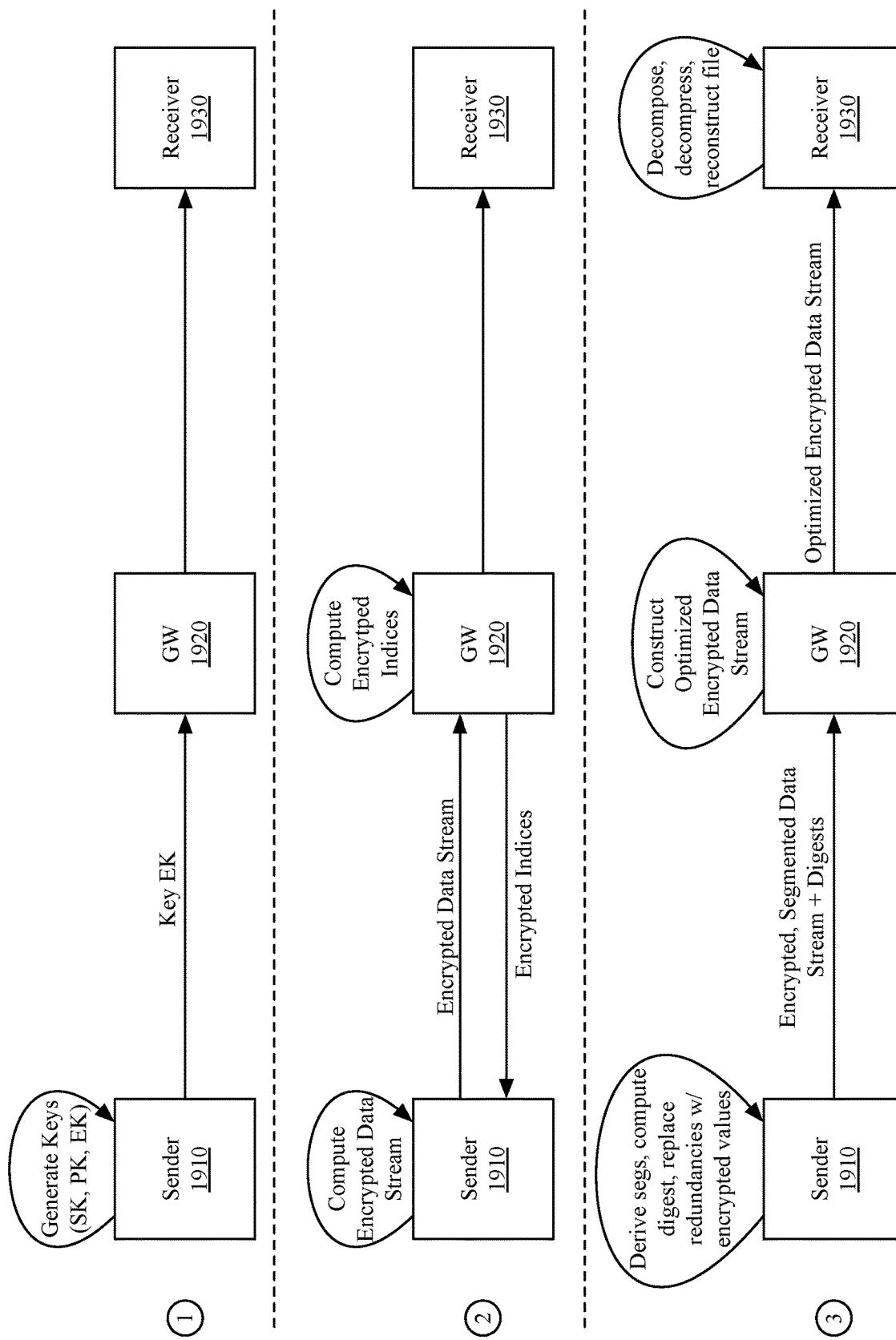
FIG. 19 conceptually illustrates a workflow between a sender, a gateway equipped with a WAN optimizer, and a receiver in some embodiments when sending an encrypted data stream from the sender to the receiver using a second FHE scheme.
Figure 20:
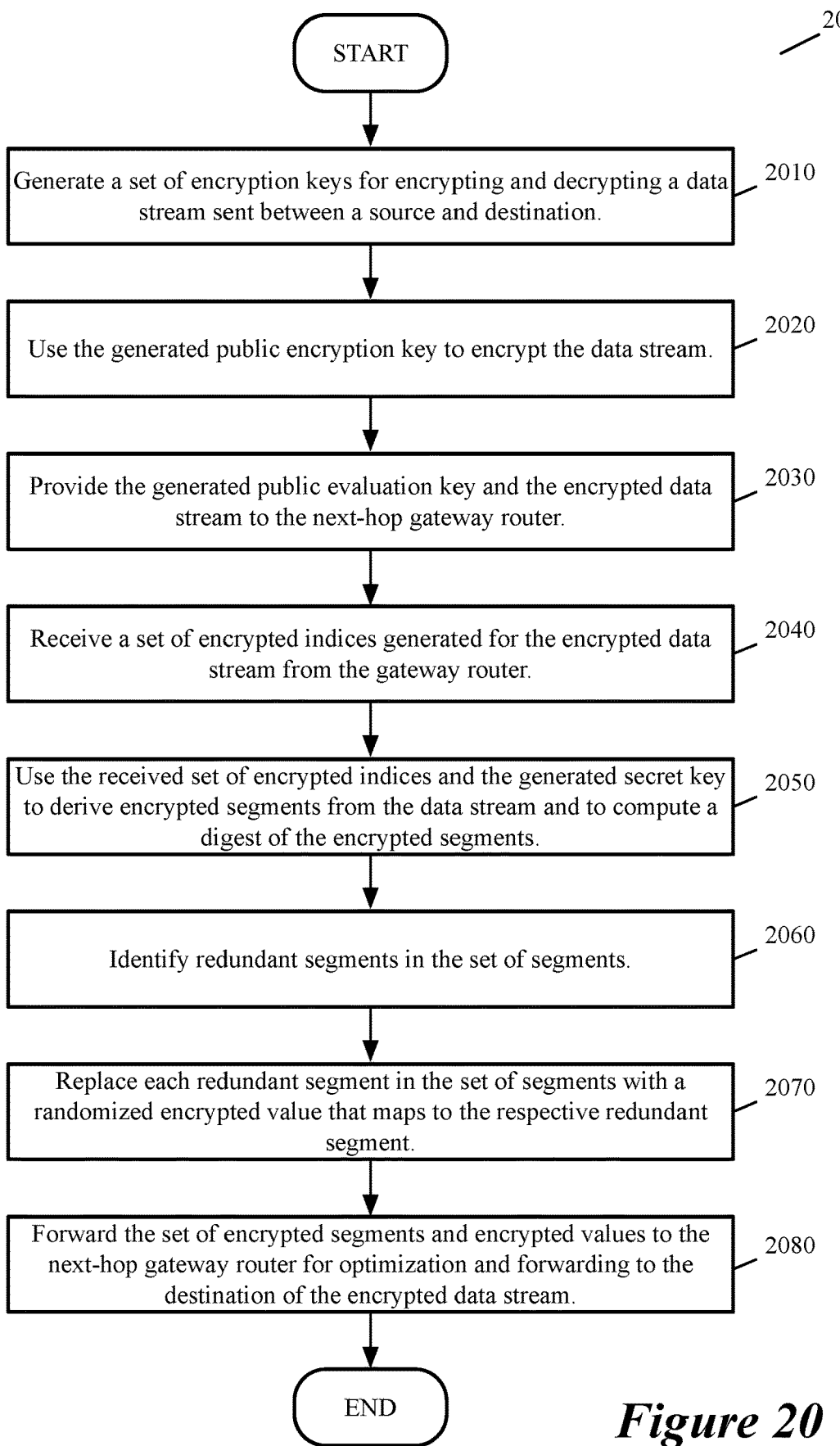
FIG. 20 conceptually illustrates a process performed by a source of an encrypted data stream using a second FHE scheme, in some embodiments.
Figure 21:
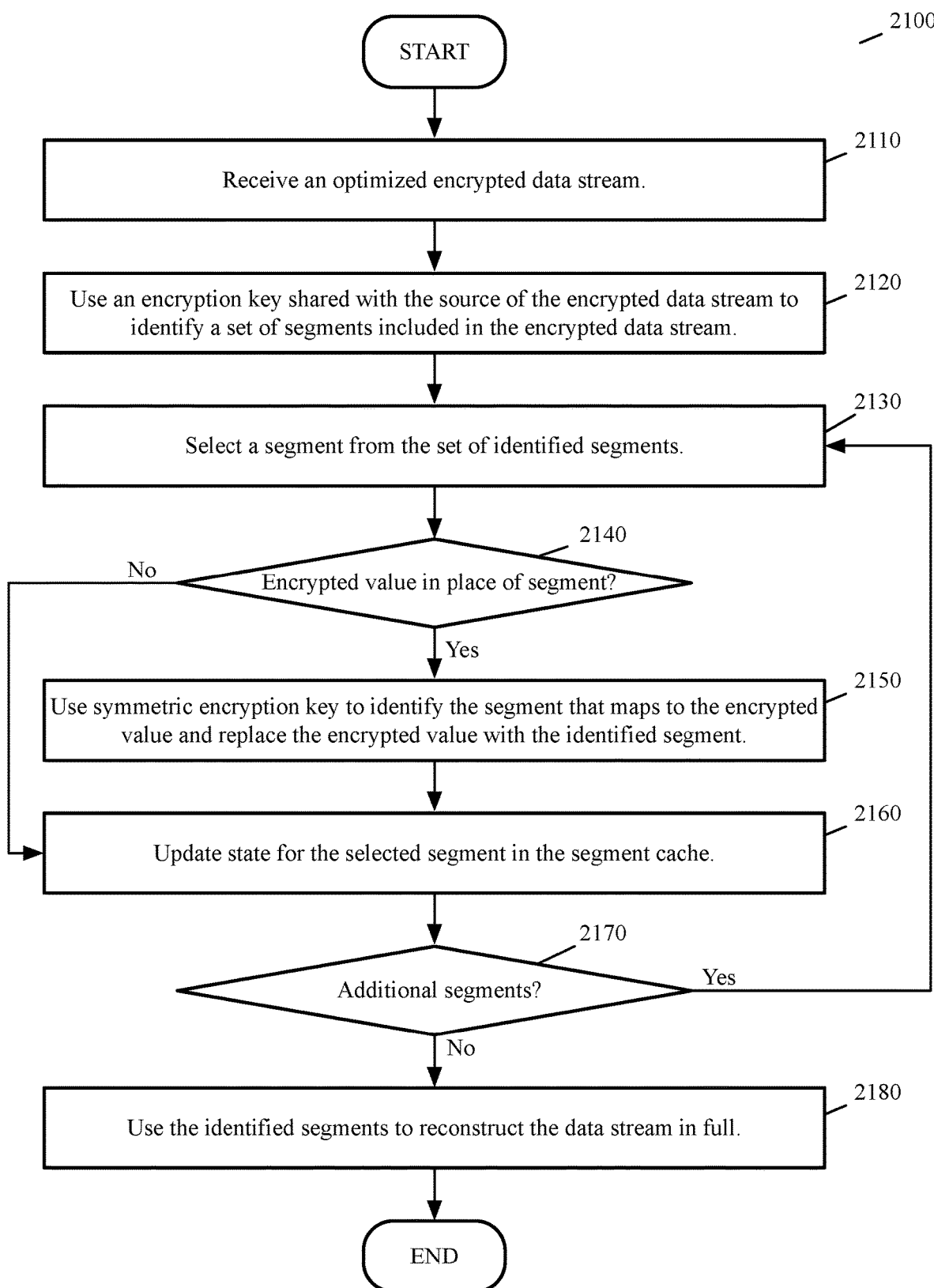
FIG. 21 conceptually illustrates a process performed in some embodiments by a receiver of an optimized encrypted data stream sent from a particular source and optimized by a gateway router deployed to a public cloud and equipped with a WAN optimizer.

In order to reduce this leakage, some embodiments inject a long random seed, which is shared only between the sender and receiver, to the digest algorithm. As a result of injecting this long random seed, only the sender and receiver would be able to run the digest algorithm on their own (i.e., the gateway router with WAN optimizer would not be able to run the digest algorithm). In addition to the long random seed, some such embodiments also eliminate repetitions of digests by encrypting the long random seeds that have been injected. In some embodiments, this network optimization can be done already at the sender itself before the encrypted data stream arrives at the gateway. FIGS. 19-21 illustrate embodiments in which these leakage reduction methods are performed. Like the embodiments described above, the sender and receiver in the embodiments described below share a symmetric key $k \leftarrow SYM.Gen(1^\kappa)$, that is not shared with the gateway. In addition to this shared symmetric key k, the sender and receiver in the embodiments described below also share a random seed $s \in \{0, 1\}^\kappa$, which will be used in the digest algorithm.

FIG. 19 conceptually illustrates a workflow between a sender, a gateway equipped with a WAN optimizer, and a receiver in some embodiments when sending an encrypted data stream from the sender to the receiver using a second FHE scheme. FIG. 19 will be described below by references to FIGS. 20-21. FIG. 20 conceptually illustrates a process performed by a source of an encrypted data stream using a second FHE scheme, in some embodiments. The process 2000 starts when the source generates (at 2010) a tuple of keys for encrypting, evaluating, and decrypting a data stream sent between a source and destination. The sender generates these keys using an algorithm Gen, which when given the security parameter κ, outputs the set of keys pk, sk, and ek (i.e., (pk, sk, ek)←FHE.Gen($1^\kappa$)). As illustrated by FIG. 19, the sender 1910 generates the tuple of keys at the encircled 1.

The process 2000 uses (at 2020) the generated public encryption key to encrypt the data stream. The sender S has the file $F \in \{0, 1\}^*$ and computes $\hat{F} \leftarrow FHE.Enc(pk, F)$. This step 2020 mirrors the step 1620 described above for the first example FHE scheme. The encrypted data stream, in some embodiments, is also referred to as a ciphertext.

The process 2000 provides (at 2030) the generated public evaluation key and the encrypted data stream to the next-hop gateway router. That is, the sender provides the generated public evaluation key ek and the encrypted data stream $\hat{F}$ to the gateway router for use by the gateway router to compute the indices. In some embodiments, steps 2020 and 2030 are performed in reverse, with the public evaluation key being provided to the gateway before the ciphertext of the data stream has been computed. For instance, the sender 1910 is illustrated as providing the key ek to the gateway 1920 at the encircled 1, and subsequently computing the encrypted data stream and providing the encrypted data stream to the gateway 1920 at the encircled 2.

The process 2000 receives (at 2040) a set of encrypted indices $(\hat{\imath}_0, \ldots, \hat{\imath}_k)$ generated for the encrypted data stream from the gateway router. After receiving the public evaluation key and the ciphertext, the gateway computes the encrypted indices and sends them back to the sender, which performs the segmenting operation on the encrypted data stream, according to some embodiments.

The process 2000 uses (at 2050) the received set of encrypted indices and the generated secret key to derive encrypted segments from the data stream and to compute a digest of the encrypted segments. The sender uses the indices and computes $i_j \leftarrow FHE.Dec(sk, \hat{\imath}_j)$ for all $j \in [0, k]$. From these indices, the sender derives the chunks $(c_0, \ldots, c_{k-1})$ and computes the digests $d_j = digest(s\|c_j)$ for all $j \in [0, k-1]$.

The process 2000 identifies (at 2060) redundant segments in the set of segments and replaces (at 2070) each redundant segment in the set of segments with an encrypted value that maps to the respective redundant segment. In some embodiments, each encrypted value is generated using a probabilistic encryption function. To identify redundant segments and replace these identified redundant segments with the encrypted values, the sender first computes $\hat{c}_j \leftarrow SYM.Enc(k, c_j)$ for all $j \in [0, k-1]$. Let $(\hat{c}_0, d_0), \ldots, (\hat{c}_{k-1}, d_{k-1})$ be the result of this computation. For every $j \in [0, k-1]$, if $(\hat{c}_j, d_j)$ already appears earlier in the list, suppose its first occurrence is at position $j_0$, then the sender computes $q_j = SYM.Enc(k, j_0)$ and replaces $(\hat{c}_j, d_j)$ with $g_j$.

In other words, rather than forwarding the encrypted data stream to the gateway, the sender performs the TRE operation on the encrypted data stream itself. For example, the sender 1910 is illustrated as deriving segments, computing digests, and replacing redundancies with encrypted values at the encircled 3. Performing this operation at the sender, and replacing the redundancies with encrypted values rather than the digests provides for better security when the gateway subsequently performs its series of processing and WAN optimization on the encrypted data stream.

The process 2000 forwards (at 2080) the set of encrypted segments and encrypted values to the next-hop gateway router for optimization and forwarding to the destination of the encrypted data stream. That is, the sender sends the list resulting from the computations in step 2070 to the gateway router for optimization and forwarding. The gateway router then constructs the optimized file $F'=(m_0, \ldots, m_{k-1})$ where $m_i = \hat{c}_i$ if $d_i \notin st_S$ and $m_i = d_i$ otherwise, sends it to the receiver, and updates $st_S = \text{cache}(st_S, F')$. The cache algorithm is instructed to ignore the positions in which there is an encryption q. As illustrated by FIG. 19, the operations performed by the gateway 1920 are essentially identical to those performed by the gateway 1520. Following 2080, the process 2000 ends.

FIG. 21 conceptually illustrates a process performed in some embodiments by a receiver of an optimized encrypted data stream sent from a particular source and optimized by a gateway router deployed to a public cloud and equipped with a WAN optimizer. The process 2100 starts when the gateway router receives (at 2110) an optimized encrypted data stream. The optimized encrypted data stream is the optimized encrypted file, F', which is equal to $(m_0, \ldots, m_{k-1})$ as mentioned above.

The process 2100 uses (at 2120) an encryption key shared with the source of the encrypted data stream to identify a set of segments (i.e., chunks) included in the encrypted data stream. That is, the receiver computes $m_i = \text{SYM.Dec}(k, m_i)$ for all $i \in [0, k-1]$ such that $\text{type}(m_i) = \text{chunk}$, where k is the symmetric encryption key shared between the sender and receiver.

The process 2100 selects (at 2130) a segment from the set of identified segments and determines (at 2140) whether there is an encrypted value in place of the selected segment. As described by step 2060 in the process 2000, the sender replaces each redundant segment with an encrypted value by first computing $\hat{c}_j \leftarrow \text{SYM.Enc}(k, c_j)$ for all $j \in [0, k-1]$, and where $(\hat{c}_0, d_0), \ldots, (\hat{c}_{k-1}, d_{k-1})$ is the result of this computation, for every $j \in [0, k-1]$, if $(\hat{c}_j, d_j)$ already appears earlier in the list, suppose its first occurrence is at position $j_0$, then the sender computes $q_j = \text{SYM.Enc}(k, j_0)$ and replaces $(\hat{c}_j, d_j)$ with $q_j$. As such, when the process determines that there is not an encrypted value in place of the segment, the process 2100 transitions to 2160 to update state for the selected segment.

Otherwise, when the process 2100 determines that there is an encrypted value in place of the selected segment, the process 2100 transitions to use (at 2150) the symmetric encryption key k shared with the sender to identify the segment that maps to the encrypted value and replace the encrypted value with the identified segment. To do so, for every position $j \in [0\ k-1]$ in which there is an encryption, $m_j = q$, of an index, the receiver computes $j_0 = \text{SYM.Dec}(k, q)$ and replaces $m_j$ with the whatever appears in $m_{j_0}$ (i.e., either a chunk or a digest). For instance, the receiver 1930 is illustrated as decomposing, decompressing, and reconstructing the file after receiving the optimized data stream from the gateway 1920.

The process 2100 updates (at 2160) state for the selected segment in the segment cache. In some embodiments, the receiver updates the state (i.e., $st_R = \text{cache}(st_R, F')$) for each segment upon computing the set of segments during step 2120 above rather than following steps 2140 and/or 2150. Each state is a mapping between a segment and its corresponding digest, according to some embodiments, and, in some embodiments, also includes a timestamp reflecting the most recent receipt of the corresponding segment and/or digest. As mentioned above, in some embodiments, the cache algorithm is instructed to ignore the positions in which there is an encryption q.

The process 2100 next determines (at 2170) whether there are additional segments to select. When there are additional segments for selection, the process 2100 returns to step 2130 to select a segment from the set of identified segments. Otherwise, when there are no additional segments for selection, the process transitions to use (at 2180) the identified segments to reconstruct the data stream in full. The receiver reconstructs the file $F=(c_0, \ldots, c_{k-1})$ with $c_i = st_R[m_i]$ if $m_i \in st_R$, and $c_i = m_i, m_i \notin st_R$. Following 2180, the process 2100 ends.

In the above embodiments described by reference to FIGS. 19-21, the sender and the gateway have to interact before sending the optimized file to the receiver (i.e., to have the gateway generate the indices for use by the sender). In some such embodiments, these interactions can increase the latency. The embodiments that will be described below by references to FIGS. 22-26 provide a third FHE scheme that reduces these interactions by storing the state in an FHE-encrypted format such that even the cache algorithm could be evaluated on encrypted data. For these embodiments described below, the optimize algorithm is defined such that given a state st, a file F, a list of indices $i_0, \ldots, i_k$, the optimize algorithm computes $F'=(c'_0, \ldots, c'_{k-1}) \leftarrow \text{derive}(F, i_0, \ldots, i_k)$, and then, for every $j \in [0, k-1]$, the optimize algorithm replaces $c'_j$ with $d_j = \text{digest}(c'_j)$ if $c'_j \in st$. Finally, the algorithm computes $st' \leftarrow \text{cache}(st, F')$, and outputs $(st', F')$.

Figure 22:
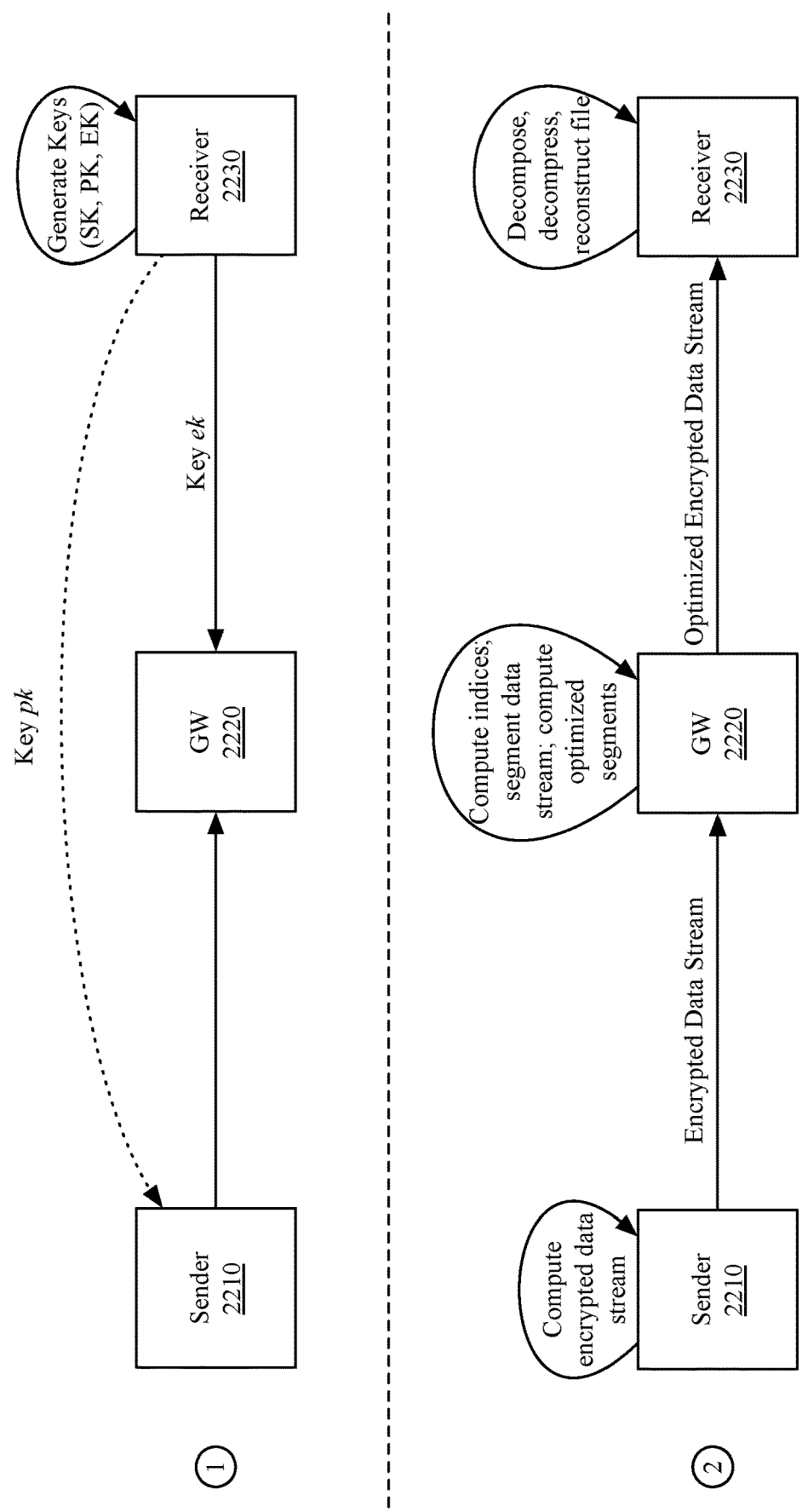
FIG. 22 conceptually illustrates a workflow between a sender, a gateway equipped with a WAN optimizer, and a receiver in some embodiments when sending an encrypted data stream from the sender to the receiver using the third FHE scheme.
Figure 23:
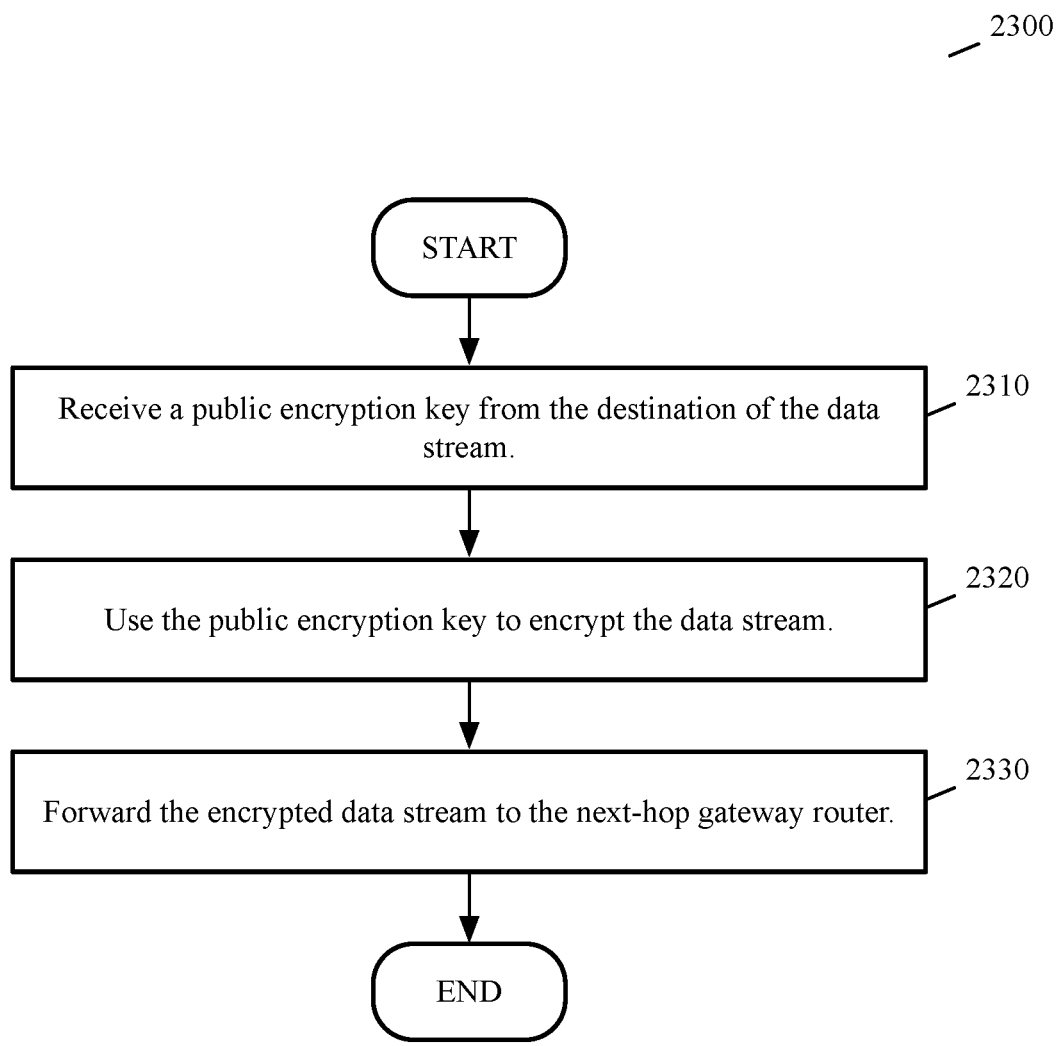
FIG. 23 conceptually illustrates a process performed in some embodiments by a source of an encrypted data stream using the third FHE scheme.

FIG. 22 conceptually illustrates a workflow between a sender, a gateway equipped with a WAN optimizer, and a receiver in some embodiments when sending an encrypted data stream from the sender to the receiver using the third FHE scheme. FIG. 22 will be described below by references to FIGS. 23-25. FIG. 23 conceptually illustrates a process performed in some embodiments by a source of an encrypted data stream using the third FHE scheme.

The process 2300 starts when the source receives (at 2310) a public encryption key from the destination of the data stream. Unlike the first and second FHE schemes described in the embodiments above, the third FHE scheme described herein by FIGS. 22-27 has the receiver generating the tuple of keys, as will be further described below. For example, the sender 2210 illustrated in FIG. 22 receives, at the encircled 1, a key pk from the receiver 2230, which is illustrated as generating the set of keys. In some embodiments, in addition to receiving the public encryption key from the receiver, the sender and receiver also initialize an empty state st, and send $st \leftarrow \text{FHE.Enc}(pk, st)$ to the gateway.

The process 2300 uses (at 2320) the public encryption key to encrypt the data stream. Once the sender has the public encryption key pk from the receiver, the sender uses the public encryption key pk to encrypt the file $F \in \{0, 1\}^*$ by computing the ciphertext $\hat{F} \leftarrow \text{FHE.Enc}(pk, F)$. While the means of obtaining the public encryption key pk differ from the above embodiments, the operation for computing the ciphertext remains the same.

The process 2300 forwards (at 2330) the encrypted data stream to the next-hop gateway router. Because the third FHE scheme intends to reduce interactions between sender and gateway, the WAN optimization operations performed by the sender in some of the embodiments described above are moved instead to the gateway. For instance, rather than the implementation illustrated and described by FIG. 4, the third FHE scheme instead utilizes the WAN optimizer 305 illustrated and described by FIG. 3 which includes the index generator 310 for the segmenter 320, the segmenter 320, the TRE module 330, the compression module 340, and the QoS scheduling module 350. As such, after the sender forwards the encrypted data stream to the gateway at 2330, the process 2300 ends.

Figure 24:
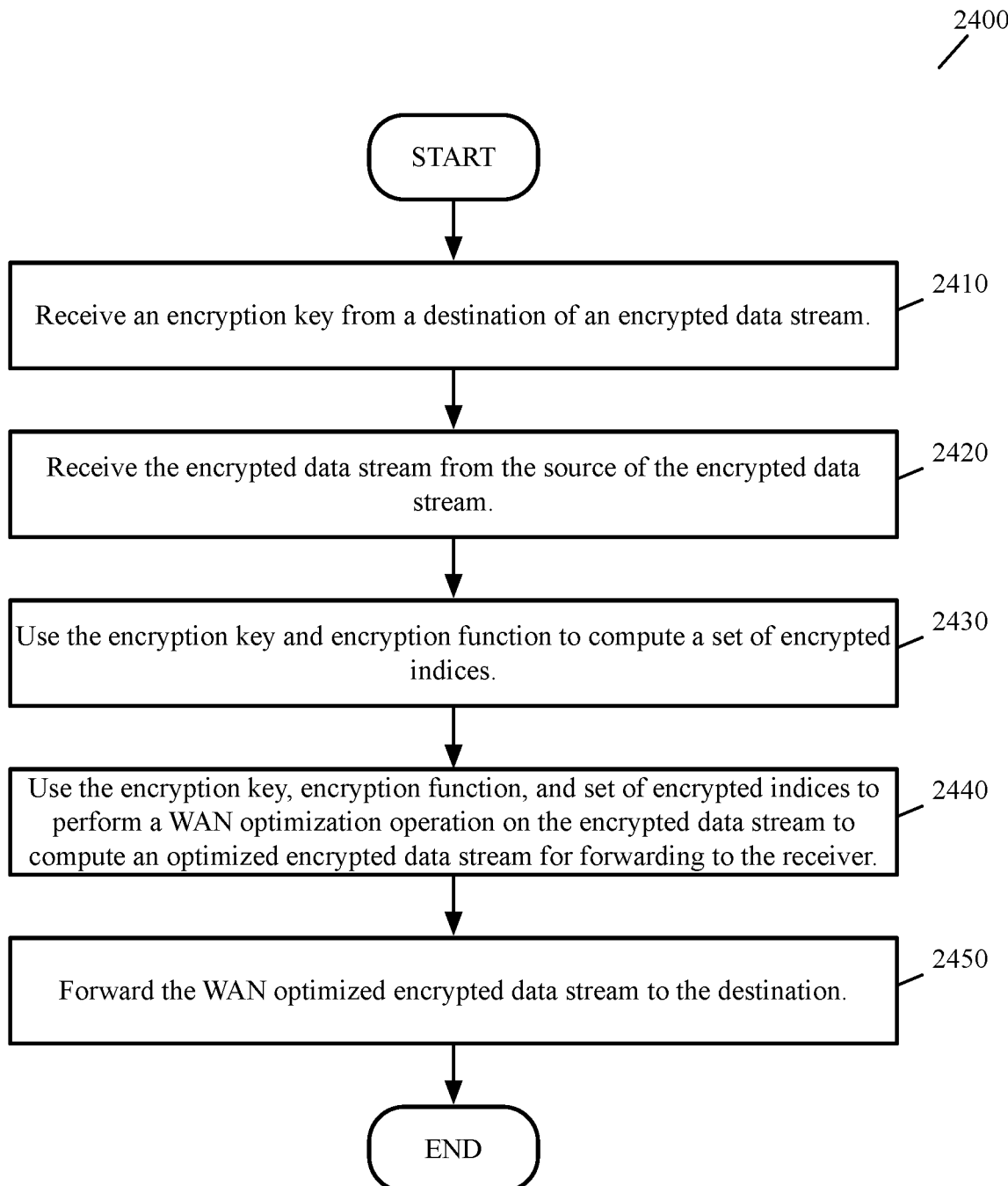
FIG. 24 conceptually illustrates a process performed in some embodiments by a source-side gateway router that optimizes encrypted data streams sent from a particular source to a particular destination using the third FHE scheme.

FIG. 24 conceptually illustrates a process performed in some embodiments by a source-side gateway router that optimizes encrypted data streams sent from a particular source to a particular destination using the third FHE scheme. The process 2400 starts when the source-side gateway router receives (at 2410) a public evaluation key from a destination of an encrypted data stream. Unlike the first and second FHE schemes, the gateway receives the key ek from the receiver rather than from the sender.

The process 2400 receives (at 2420) the encrypted data stream from the source of the encrypted data stream. In FIG. 22 for example, the sender 2210 is illustrated at the encircled 2 as computing the encrypted data stream and sending the encrypted data stream to the gateway 2220. The encrypted data stream is a ciphertext computed by $\hat{F} \leftarrow$ FHE.Enc(pk, F), where F represents the file or data stream, pk is the public encryption key generated by the receiver, and the resulting $\hat{F}$ is the ciphertext.

The process 2400 uses (at 2430) the public evaluation key and encryption function to compute a set of encrypted indices. That is, the gateway computes $(\hat{\imath}_0, \ldots, \hat{\imath}_k) \leftarrow$ FHE.Eval(ek, chunk, $\hat{F}$), where $(\hat{\imath}_0, \ldots, \hat{\imath}_k)$ are the indices. When the WAN optimizer 305 described above receives an encrypted data stream, for instance, the encrypted data stream is provided to the index generator 310 for generating the encrypted indices. Rather than send these encrypted indices back to the sender, the index generator 310 passes the generated encrypted indices and encrypted data stream to the segmenter 320. In some embodiments, one or more operations performed by one or more of the modules included in the WAN optimizer 305 are performed by a single module.

The process 2400 uses (at 2440) the public evaluation key, encryption function, and set of encrypted indices to perform a WAN optimization operation on the encrypted data stream to compute an optimized encrypted data stream for forwarding to the receiver. The WAN optimization operation, in some embodiments, includes deriving the chunks and digests, performing a TRE operation to replace duplicate segments with their digests, and performing a compression operation on the encrypted segments and digests. More specifically, the gateway computes $(\hat{\frown}, \hat{F}') \leftarrow$ FHE.Eval(ek, optimize, $\hat{\frown}, \hat{F}, \hat{\imath}_0, \ldots, \hat{\imath}_k)$. The gateway 2200, for instance, is illustrated at the encircled 2 as computing indices, segmenting the data stream, and computing the optimized segments.

The process 2400 forwards (at 2450) the WAN optimized encrypted data stream (P) to the destination. Once the gateway has produced the optimized encrypted data stream, the gateway forwards the optimized encrypted data stream to its destination through the WAN. For example, the gateway 2220 forwards the optimized encrypted data stream at the encircled 2 to the receiver 2230. Following 2450, the process 2400 ends.

Figure 25:
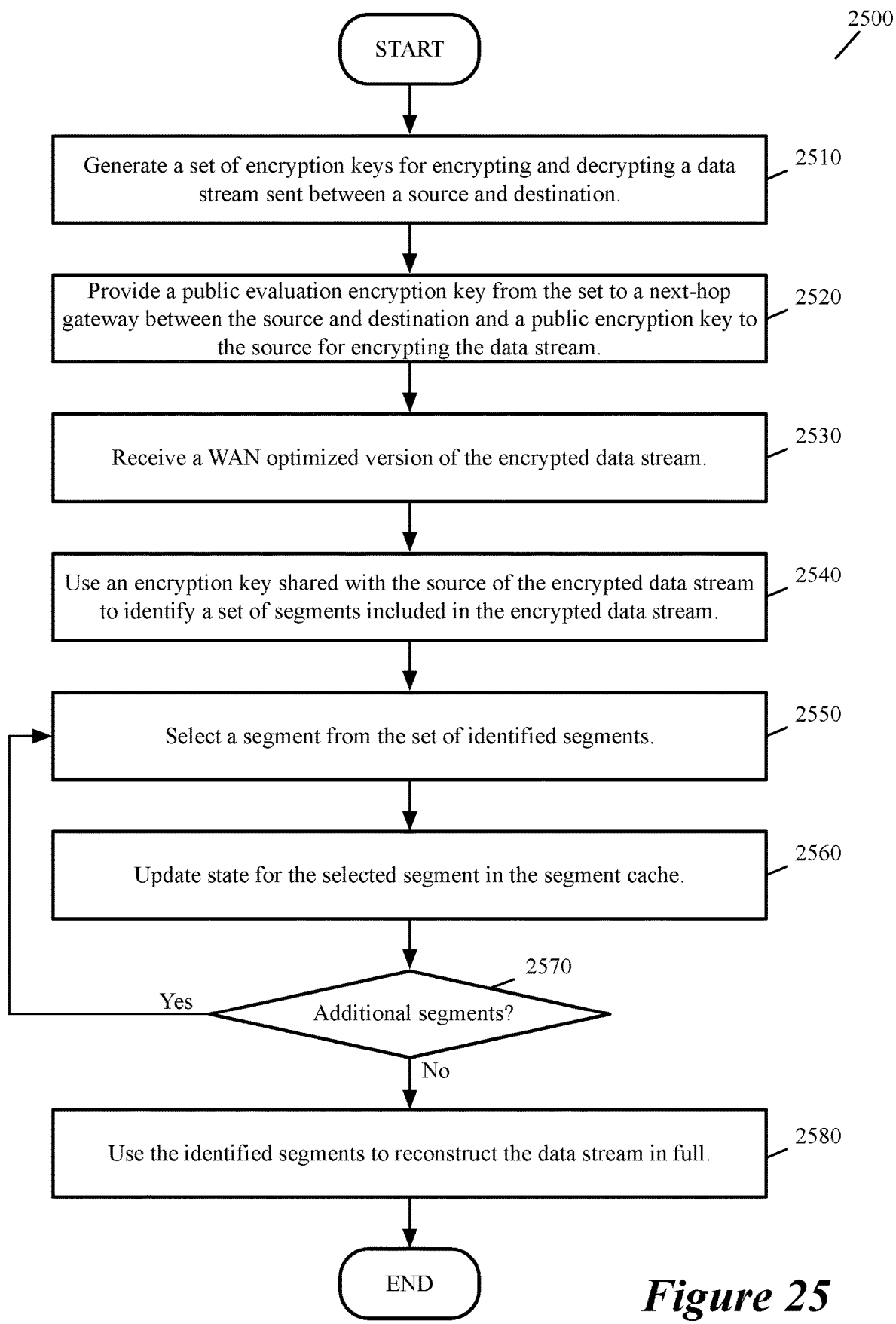
FIG. 25 conceptually illustrates a process performed in some embodiments by a receiver of an optimized encrypted data stream.
Figure 26:
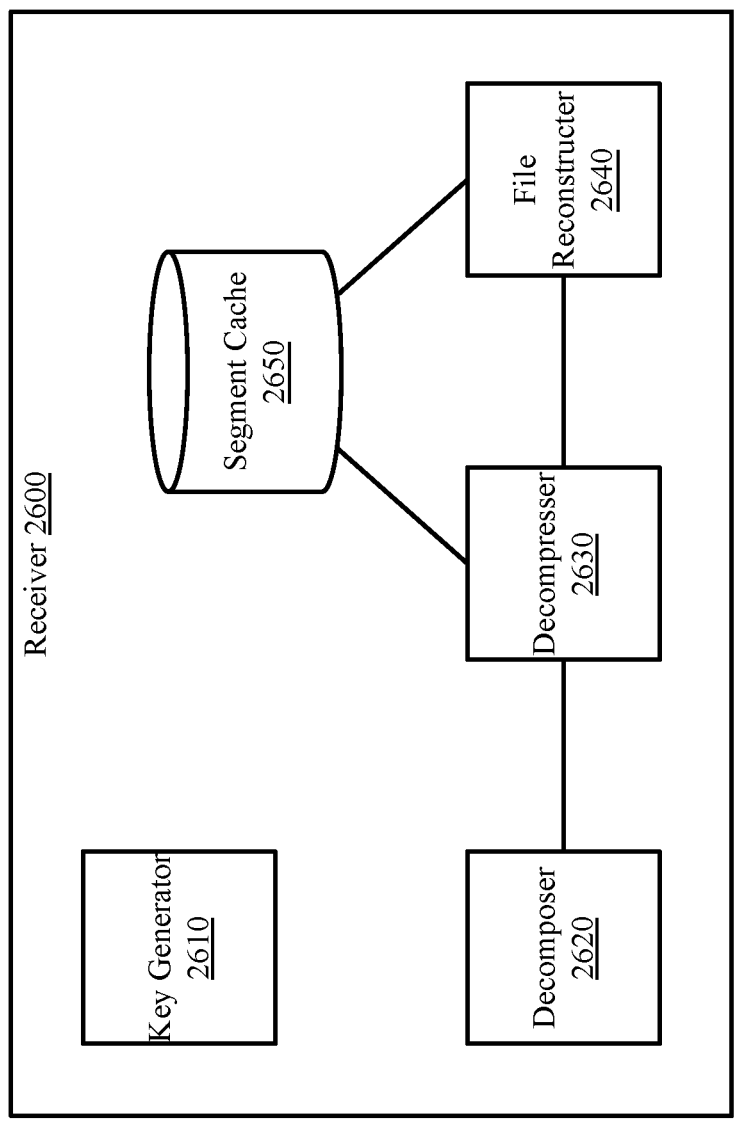
FIG. 26 conceptually illustrates a receiver of optimized encrypted data streams, in some embodiments.

FIG. 25 conceptually illustrates a process performed in some embodiments by a receiver of an optimized encrypted data stream. As in the embodiments above, the receiver performing the process 2500 in some embodiments is a receiver-side gateway router that processes optimized, encrypted data streams sent to a particular receiver, while in other embodiments, the receiver is simply the destination of the data stream. The process 2500 will be described below with references to FIG. 26, which conceptually illustrates a receiver in some embodiments.

The process 2500 starts when the receiver generates (at 2510) a tuple of keys for encrypting, evaluating, and decrypting a data stream sent between a source and destination. For instance, the receiver 2600 is illustrated as having a key generator 2610. Like the set of keys generated by the sender in embodiments described above, the tuple of keys generated by the receiver also includes a public encryption key pk, a secret decryption key sk, and a public evaluation key ek. The receiver generates these keys using the Gen algorithm, which when given the security parameter κ, outputs the set of keys pk, sk, and ek (i.e., (pk, sk, ek)←FHE.Gen($1^\kappa$)).

The process 2500 provides (at 2520) a public evaluation key from the set to a next-hop gateway between the source and destination and a public encryption key to the source for encrypting the data stream. In FIG. 22, for example, the receiver 2230 is illustrated as providing the key ek to the gateway 2220 and the key pk to the sender 2210. As mentioned above by reference to the process 2300, the sender and receiver of some embodiments also initialize an empty state st, and send st←FHE.Enc(pk, st) to the gateway.

The process 2500 receives (at 2530) a WAN optimized version of the encrypted data stream. The receiver 2230, for instance, receives the optimized encrypted data stream from the gateway 2220 at the encircled 2. The optimized encrypted data stream in some such embodiments does not include any encrypted values like those described for the second FHE scheme above as all of the WAN optimization operations are performed by the gateway rather than at the sender.

The process 2500 uses (at 2540) the secret decryption key generated during step 2510 to identify a set of segments included in the encrypted data stream. That is, from $\hat{F}'$, the receiver computes F'=FHE.Dec(sk, $\hat{F}'$) and denotes $F'=(m_0, \ldots, m_{k-1})$. The receiver 2600, for instance, includes a decomposer 2620 for identifying the segments included in the encrypted data stream. Similar to the receiver-side gateway 905 described above, when an optimized encrypted data stream is received by the receiver 2600, the optimized encrypted data stream is passed to the decomposer 2620 for decomposition (i.e., identifying and separating out each segment), and then passes the decomposed segments to the decompressor 2630, which can add any new segments to the segment cache 2650.

The process 2500 selects (at 2550) a segment from the set of identified segments and updates (at 2560) state for the selected segment in the segment cache. More specifically, the receiver updates $st_R$=cache($st_R$, F'). In some embodiments, this is performed by the decompressor 2630 of the receiver 2600. As the decompressor 2630 adds new segments to the segment cache 2650, the decompressor 2630 also updates state for segments already stored in the cache 2650. In some embodiments, the updates include updating last-received timestamps for the segments to reflect the most recent receipt of these segments.

The process 2500 determines (at 2570) whether there are additional segments to be selected. When there are additional segments for selection (i.e., segments that have not yet been processed and either added to the cache or updated in the cache), the process returns to 2550 to select a segment. Otherwise, when there are no additional segments for selection, the process 2500 transitions to use (at 2580) the identified segments to reconstruct the data stream in full. The receiver reconstructs the file $F=(c_0, \ldots, c_{k-1})$ with $c_i = st_R[m_i]$ if $m_i \in st_R$, and $c_i = m_i, m_i \notin st_R$. The receiver 2600, for instance, includes file reconstructer 2640 for reconstructing the files. The reconstructer 2640 has access to the segment cache 2650, and as such, can retrieve any full segments needed to replace segment identifiers (e.g., digests) in the file or data stream that were previously removed during TRE. Following 2580, the process 2500 ends.

In some embodiments, a readily-deployable mechanism that can provide fast access to emerging fast storage devices, and that requires no specialized hardware and no significant changes to the application while working with existing kernels and file systems is utilized in order to avoid having the kernel storage stack become a major source of overhead. This readily-deployable mechanism, in some embodiments, is an efficient in-kernel datapath module that leverages stable and robust existing kernel APIs and drivers. Leveraging the existing kernel APIs helps to avoid low utilization due to busy waiting, and allows for a large number of threads or processes to share the same core, thus leading to better overall utilization, according to some embodiments.

As mentioned above, some embodiments utilize a kernel-only data path, and leverage direct NVMe (non-volatile memory express) access and zero-copy operations to accelerate operations performed by DRAGON. PCIe NVMe disk controllers use circular queues of command descriptors residing in host memory to serve I/O requests for disk logical blocks (LBAs). The host places NVMe I/O commands in a submission queue. Each command includes the operation type (e.g., READ, WRITE), the initial LBA address, the length of the request, the source or destination buffer address in the host main memory, and various flags. Once commands have been enqueued, the device driver notifies the controller that there are requests waiting by updating the submission queue's tail doorbell. The submission queue's tail doorbell is a device register, similar to NIC TX and RX doorbells for packet descriptors.

Multiple I/O commands can be in progress at a time, and the disk firmware is allowed to perform out-of-order completions. Each submission queue is associated with a completion queue, which is used by the disk to communicate I/O completion events to the host. The OS is responsible for consuming command completions, and subsequently notifying the controller via a completion queue doorbell so that completion slot entries can be reused. NVMe devices support a highly configurable number of queue pairs and depths, which greatly helps with scaling to multiple CPU cores and permits a share-free, lockless design.

In some embodiments, a full end-to-end zero-copy datapath, including direct NVMe access, is constructed for each DRAGON receiver component. User space database (e.g., RocksDB) lookups are removed from the critical data path, and fast in-kernel lookups and reads are performed using a DRAGON cache. The in-kernel datapath takes hash A from socket SA, performs a lookup of chunk A in the DRAGON cache, retrieves chunk A, and puts the retrieved chunk A on socket SB.

To support memory allocations for the DRAGON receiver, a custom memory allocator is built, in some embodiments. This memory allocator is designed for large-size long-lived objects, with allocation granularity of 512B, as allocations need to be NVMe-friendly. At boot time, a large contiguous chunk of memory is allocated to be used for all memory allocation needs. The bottom part is reserved for the DRAGON cache, and the top is split again into two portions. The first portion is used for variable size buffer allocations, and the second portion is used for fixed-size metadata allocations.

The variable-size buffer allocator is a simple circular buffer of 512B blocks, in some embodiments. Contiguous regions of up to 128 KB can be allocated, in some embodiments, by allocating 256 consecutive blocks. In some embodiments, these buffers are used for storing chunks in memory. Chunks are stored in memory for the duration of an I/O operation, in some embodiments, or until a newly arrived chunk is written to disk. Chunks allocated together in the same temporal vicinity are also released around the same time. This scheme allows for fast large buffer allocation throughout the life of the system.

In some embodiments, a trivial statically sized hash is implemented to store partial chunk descriptors. The DRAGON sender component computes sha1 hashes, while sha1 is cryptographically broken, it still provides a good uniform distribution of values. Thus, the hash function is simply $f(x) \rightarrow fold(x)$, where "fold" takes the 20 byte sha1 value and folds it by computing the xor product of its high and low bits. The actual size of the hash and, thus, the number of bits used for the index is defined on system startup. The stored partial chunk descriptors are 8 bytes and formatted such that flags are 18 bits, addresses are 46 bits, and in-memory indicators are 1 bit.

Linux kernel addresses have a set layout, and as such, some embodiments take advantage of such addresses. More specifically, the Linux kernel address set layout is a direct mapping of physical memory (i.e., page and is always in the range of [ffff888000000000-fffc87ffffffff], which makes the top 17 available for utilization. Additionally, the LSB is used in some embodiments to signify that an entry is a pointer to the actual chunk buffer, and not a full-chunk-descriptor (FCD) address. FCDs contain the complete hash and a list of one or more block IO addresses. The block IO addresses typically include an LBA and size. A large contiguous buffer is still striped over multiple NVMes, in some embodiments. FCD also includes an rb_tree entry to handle index collisions, which facilitates binary search by the complete hash value.

Figure 27:
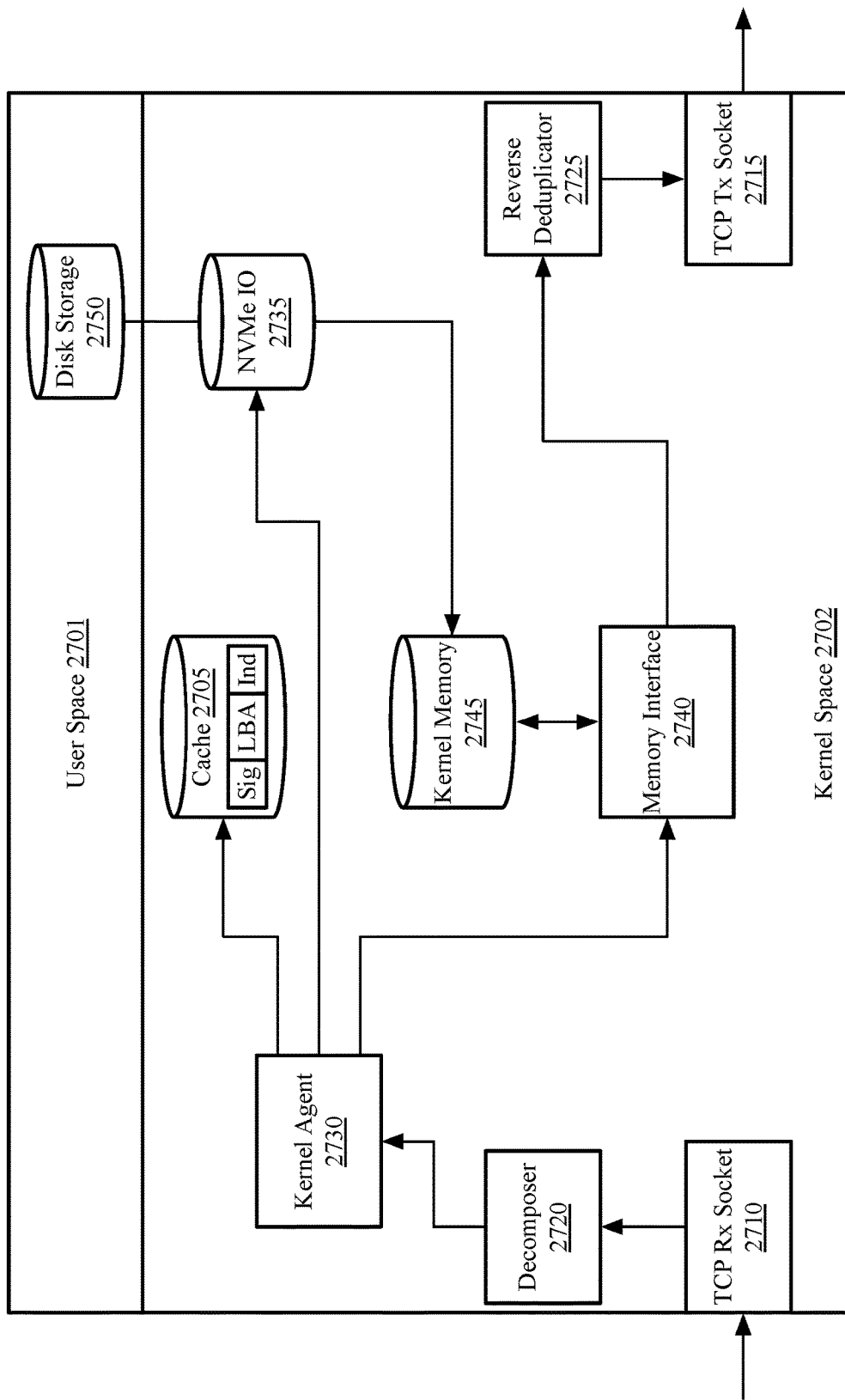
FIG. 27 conceptually illustrates a diagram of a DRAGON receiver with a kernel-only data path, in some embodiments.

FIG. 27 conceptually illustrates a diagram of a DRAGON receiver 2700 with a kernel-only data path, in some embodiments. As shown, the DRAGON receiver 2700 includes a user space 2701 and kernel space 2702. The kernel space 2702 includes a TCP receive (Rx) socket 2710, a decomposer 2720, a kernel agent 2730, a cache 2705, a memory interface 2740, a kernel memory 2745, an NVMe IO 2735, a reverse deduplicator 2725, and a TCP transmit (Tx) socket 2715. The user space 2701, in this illustration, includes a disk storage 2750.

As a DRAGON sender (not shown) sends a data stream to the DRAGON receiver 2700, the data stream is received at the TCP receive socket 2710 with zero copy. The data stream, in some embodiments, includes a file that includes multiple signatures (i.e., identifiers) that correspond to segments of data stored in a database (not shown) and written to the disk 2750 on the DRAGON receiver 2700. The TCP Rx socket 2710 performs a zero-copy operation to provide files received in the data stream to the decomposer 2720.

The decomposer 2720 is responsible for performing a decomposition operation on received files to decompose (i.e., break down) the received files in order to identify individual pieces of data that make up the file. These individual pieces of data can include signatures corresponding to data segments and/or the data segments themselves. The kernel-only data path illustrated in this example is utilized when the received files include only signatures corresponding to segments of data stored in a database (not shown) and written to the disk 2750. The datapath utilized when a received file includes segments of data not yet stored by the DRAGON receiver 2700 will be described further below.

The kernel agent 2730 performs several operation, in some embodiments, when a file is received in the data stream between the DRAGON sender (not shown) and DRAGON receiver 2700. In this example, the kernel agent 2730 uses signatures identified by the decomposer 2720 to perform lookups in the cache 2705 to determine whether the data segments corresponding to the signatures can be retrieved from the kernel memory 2745, or whether additional operations need to be performed to read the corresponding data segments from the disk storage 2750 in the user space 2701 of the DRAGON receiver 2700.

The cache 2705 includes entries of the most recently accessed segments, in some embodiments. Each entry in the cache 2705 includes the signature corresponding to a particular segment, an LBA of the particular segment, and an indicator of whether the particular segment is currently stored in memory (i.e., in the kernel memory 2745). The LBAs are block addresses corresponding to locations at which the corresponding data segments can be found. The LBAs in the cache 2705 of some embodiments also include a size of the segment. In some embodiments, each signature in the cache is 17 bits, each LBA is 46 bits, and each in-memory indicator is 1 bit.

When an entry for a particular segment in the cache 2705 has an indicator that the particular segment is in the kernel memory 2745, the kernel agent 2730 interacts with the memory interface 2740 to direct the memory 2740 interface to retrieve the particular segment from the kernel memory 2745. When the entry for the particular segment in the cache 2705 does not have the indicator that the particular segment is in the kernel memory 2745, the kernel agent 2730 interacts with the NVMe IO 2735 to direct the NVMe IO 2735 to perform a DMA operation to DMA the segment into the kernel memory 2745 (i.e., from the disk storage 2750), according to some embodiments. Additionally, the kernel agent 2730 of some embodiments subsequently directs the memory interface 2740 to retrieve particular segment from the memory 2745 after the NVMe IO 2735 has completed its DMA operation to DMA the particular segment into the memory 2745.

The memory interface 2740 retrieves segments from the kernel memory 2745 as directed by the kernel agent 2730. As the memory interface 2740 retrieves the segments, the memory interface 2740 provides the retrieved segments to the reverse deduplicator 2725. In some embodiments, the reverse deduplicator 2725 performs reverse deduplication operations on the segments in order to reconstruct the original file sent by a sender device. Unlike the reverse deduplicator of some embodiments described above (e.g., the reverse deduplication stage 950), the reverse deduplicator 2725 of the DRAGON receiver 2700 is provided with the segments by the memory interface 2740, and thus does not have to perform any operations to obtain the segments.

The reverse deduplicator 2725 of some embodiments uses the segments provided by the memory interface 2740 to reconstruct the file by replacing instances of the signatures with their corresponding segments. In some embodiments, the reverse deduplicator 2725 reconstructs the file based on the order in which it receives the segments form the memory interface 2740. In other embodiments, the reverse deduplicator 2725 is provided with the decomposed file (e.g., by the kernel agent 2730 via the memory interface 2740), and replaces the signatures in the decomposed file with their corresponding segments. Once the file has been reconstructed, the reverse deduplicator 2725 provides the reconstructed file to the TCP transmission socket 2715 for transmission to the destination receiver device (not shown).

Figure 28:
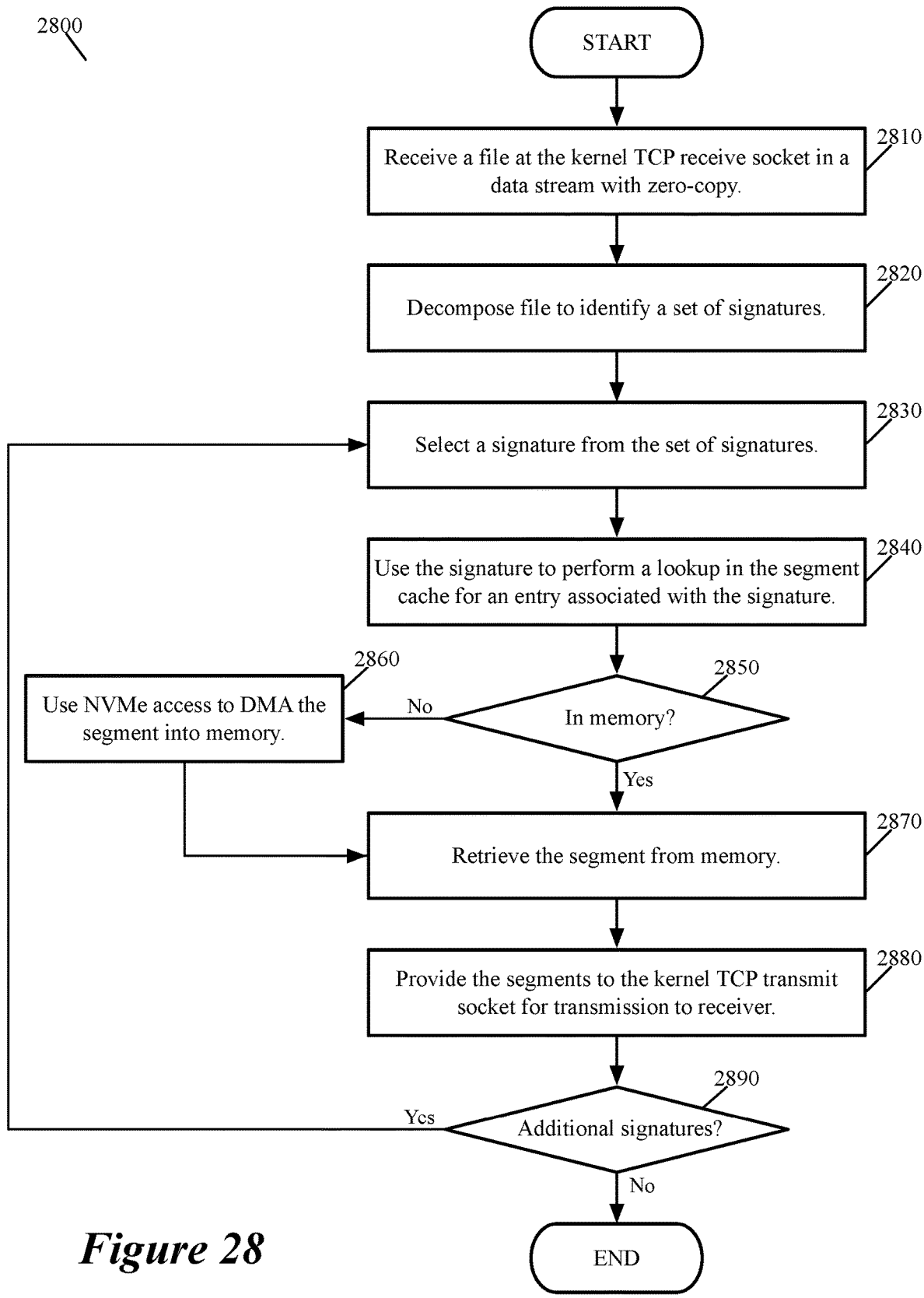
FIG. 28 illustrates a process that is performed by the in-kernel end-to-end datapath of the DRAGON receiver component, in some embodiments, when a file received in a data stream does not include any new chunks that have to be stored in the database (e.g., RocksDB) and written to disk.

FIG. 28 illustrates a process 2800 that is performed by the in-kernel end-to-end datapath of the DRAGON receiver component, in some embodiments, when a file received in a data stream does not include any new chunks that have to be stored in the database (e.g., RocksDB) and written to disk. The process 2800 does not include any copy operations, system calls, or file system traversals. The process 2800 will be described below with references to the kernel-only datapath of the DRAGON receiver 2700.

The process 2800 starts when the DRAGON receiver component receives (at 2810) a file at the kernel TCP receive socket in a data stream with zero copy. The DRAGON receiver 2700, for instance, receives files at the TCP receive socket 2710. The TCP receive socket 2710 receives the file in a data stream that includes one or more packets, and provides the packets to the decomposer 2720 with zero copy. In some embodiments, the TCP receive socket 2710 provides the packets to the decomposer 2720 by placing the packets in a buffer (not shown) of or accessible to the decomposer 2720.

The process 2800 decomposes (at 2820) the file to identify a set of signatures included in the file. The decomposition of the file involves breaking down the packets in which the file is received to identify individual segments of file. These segments, in some embodiments, are segments of data, signatures (e.g., identifiers) corresponding to segments of data stored by the DRAGON receiver, or a combination of both segments of data and signatures. In this example, the segments are all signatures corresponding to stored segments of data.

As described in some of the embodiments above, the file is an encrypted file, in some embodiments, and as such, the segments and signatures included in the file are encrypted segments and encrypted signatures. The encrypted files are encrypted using FHE, in some embodiments, which enables computations to be performed on the encrypted files without decrypting the files. Each encrypted file is a ciphertext generated by encrypting a plaintext file. When encrypted using FHE, the decrypted results of the computations performed on a ciphertext are identical to the results if the same computations were performed on the plaintext.

The process 2800 selects (at 2830) a signature from the set of signatures. In some embodiments, after the decomposer 2720 has decomposed the file (e.g., by decomposing the packets that include the file), the decomposer 2720 provides the decomposed file (e.g., the identified set of signatures) to the kernel agent 2730. The kernel agent 2730 then selects a signature from the set of signatures of the decomposed file. In some embodiments, the kernel agent 2730 selects the first signature in the set, while in other embodiments, the kernel agent 2730 selects signatures randomly.

The process 2800 uses (at 2840) the signature to perform a lookup in the segment cache for an entry associated with the signature. As described above, each entry in the cache 2705 includes a signature corresponding to a particular segment, an LBA corresponding to a location at which the particular segment is stored (e.g., in the disk storage 2750), and an indication of whether the particular segment is stored in memory (i.e., in the kernel memory 2745). As such, the kernel agent 2730 uses the selected signature as a match criteria to identify an entry in the cache 2705 for the segment that corresponds to the signature.

The process 2800 determines (at 2850) if a segment corresponding to the signature is stored in memory. The kernel agent 2730 makes this determination based on whether the entry includes an indicator that indicates the segment is stored in memory 2745. This indicator is 1 bit in length, as also mentioned above. In some embodiments, the segments stored in the kernel memory 2745 include segments that have been received previously by the DRAGON receiver 2700, but have not yet been written to disk 2750. The segments stored in the kernel memory 2745 of some embodiments also include recently retrieved segments (e.g., retrieved for reconstructing a file that was received some time before the current file).

When the process 2800 determines (at 2850) that the segment is not stored in memory, the process 2800 transitions to direct (at 2860) an NVMe access to DMA the segment into memory. The kernel agent 2730, for example, directs the NVMe IO 2735 to DMA the segment into the kernel memory 2745 when the kernel agent 2730 determines that the segment is not currently in the kernel memory 2745. The NVMe IO 2735 performs the DMA operation by reading the segment from the disk storage 2750 and writing the segment to the kernel memory 2745, according to some embodiments. After the segment is in memory, the process 2800 then retrieves (at 2870) the segment from memory.

When the process 2800 determines (at 2850) that the segment is stored in memory, the process 2800 transitions to retrieve (at 2870) the segment from memory. The memory interface 2740, for instance, retrieves segments from the kernel memory 2745 (e.g., upon direction from the kernel agent 2730) with zero copy.

The process 2800 provides (at 2880) the segment to the kernel TCP transmit socket for transmission to a receiver device that is a destination of the data stream. In some embodiments, before the segment is provided to the TCP transmit socket, the segment is first provided to a reverse deduplicator that performs a reverse deduplication operation to reconstruct the file before it is transmitted to the destination receiver device. The reverse deduplicator of some embodiments waits until it has received all of the segments to be included in the file before reconstructing the file and providing the reconstructed file to the TCP transmit socket for transmission. In some embodiments, the reverse deduplicator 2725 reconstructs the files by replacing instances of signatures in the files with the segments corresponding to the signatures.

The process 2800 determines (at 2890) whether there are additional signatures in the file for which the corresponding segments have not yet been retrieved. When there are additional signatures, the process 2800 returns to select (at 2830) a signature from the set of signatures. Otherwise, when there are no additional signatures at 2890, the process 2800 ends.

The process 2800 described above is performed when all of the segments in a given file are already known to the DRAGON receiver component (i.e., are already stored in some capacity by the DRAGON receiver component). In embodiments where the DRAGON receiver component does not already have the segments being sent by a DRAGON sender, initially, the DRAGON sender sends segments and their values (i.e., signatures) in tandem as key-value pairs after compressing these key-value pairs with a compression algorithm (e.g., the LZ4 algorithm mentioned above). These key-value pairs need to be decompressed and written to disk when they are received by the DRAGON receiver component.

Figure 29:
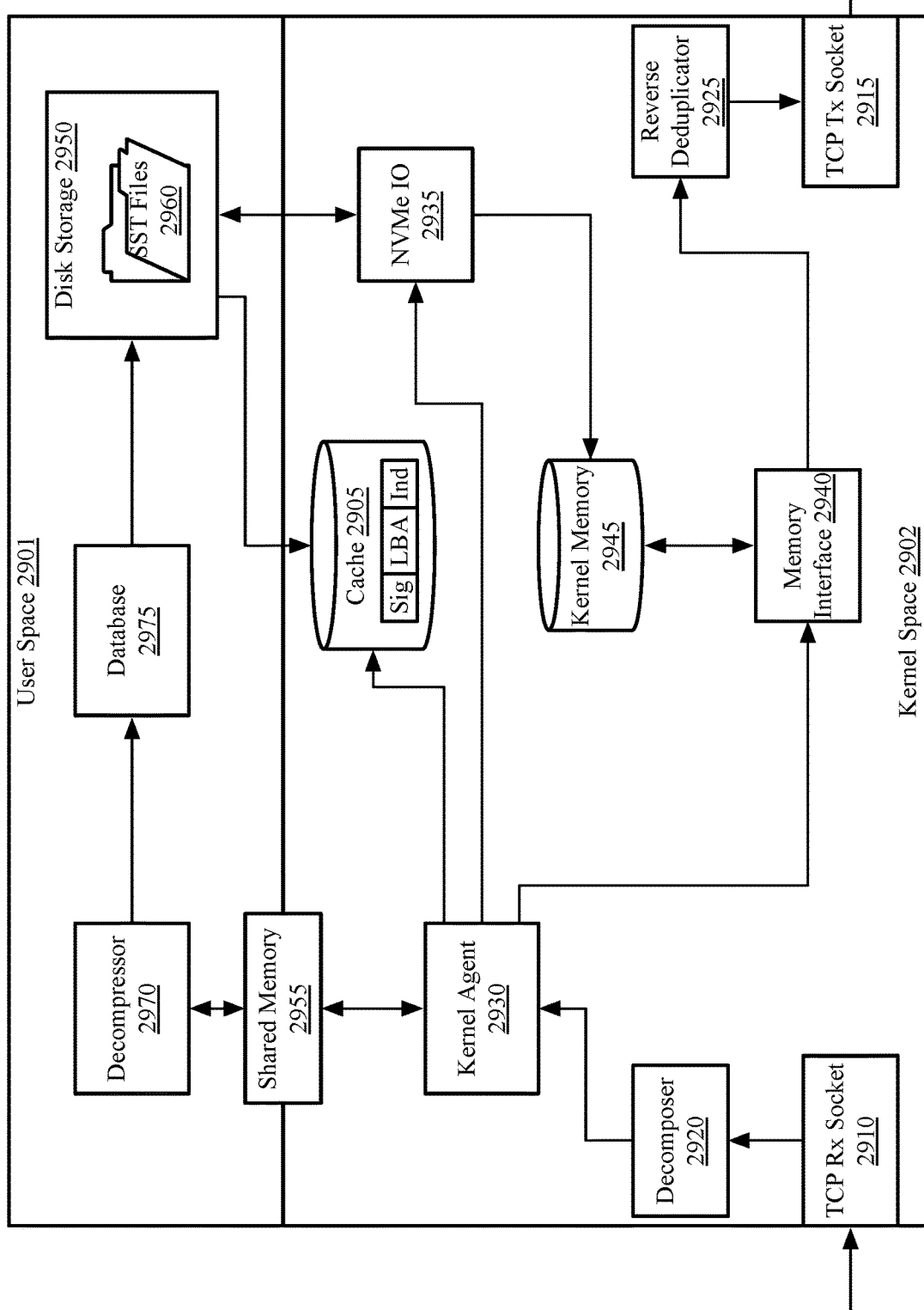
FIG. 29 conceptually illustrates a diagram of a DRAGON receiver component of some embodiments that includes an end-to-end in-kernel datapath and user control.

FIG. 29 conceptually illustrates a diagram of a DRAGON receiver component 2900 of some embodiments that includes an end-to-end in-kernel datapath and user control.

As shown, the DRAGON receiver component 2900 includes a user space 2901 and kernel space 2902. The user space 2901 includes a decompressor 2970, a database 2975, sst files 2960, and a disk storage 2950. The kernel space 2902 includes a TCP receive (Rx) socket 2910, a decomposer 2920, a kernel agent 2930, a cache 2905, a kernel memory 2945, a memory interface 2940, an NVMe IO 2935, a reverse deduplicator 2925, and a TCP transmit (Tx) socket 2915. Additionally, the user space 2901 and kernel space 2902 have a shared memory buffer 2955.

As the DRAGON sender (not shown) sends a file (e.g., as one or more packets) in a data stream to the DRAGON receiver 2900, the file is received by the TCP receive socket 2910. As described above for the DRAGON receiver 2700, the TCP receive socket 2910 provides the receive file to the decomposer 2920, which decomposes the file to identify individual compressed segments (e.g., compressed data segments and/or signatures) of the file. The decomposer 2920 provides the decomposed file to the kernel agent 2930.

For any compressed data segments identified in the file, the kernel agent 2930 copies each compressed data segment to the shared memory 2955. By copying the compressed segments to the shared memory 2955, the kernel agent 2930 effectively serializes the data on a single contiguous memory buffer. This memory buffer is then read by the user space 2901, and the segment is decompressed by the decompressor 2970. In some embodiments, the decompressor 2970 reads the compressed segments from the shared memory 2955, while in other embodiments, a user space agent (not shown) configured in the user space 2901 reads the compressed segments from the shared memory 2955 and provides the compressed segments to the decompressor 2970 for decompression.

The decompressor 2970 provides decompressed segments to the database 2975 (e.g., RocksDB) for storage. The decompressor 2970 also provides the decompressed segments back to the kernel space 2902 via a hook provided by the DRAGON receiver component. For example, the decompressor 2970 of some embodiments copies the decompressed segments back to the shared memory 2955, and the kernel agent 2930 retrieves the decompressed segments from the shared memory 2955.

In some embodiments, the kernel agent 2930 then provides the decompressed segments to the memory interface 2940, and the memory interface 2940 stores the decompressed segment in the kernel memory 2945. The memory interface 2940 of some embodiments also provides the decompressed segment (e.g., a copy of the decompressed segment) to the reverse deduplicator for use in reconstructing the file for transmitting to the receiver device (not shown) via the TCP transmit socket 2915.

For each decompressed segment that is stored in the kernel memory 2945, in some embodiments, the cache 2905 is updated to reflect that the segment is stored in memory by updating the in memory indicator. Also, in some embodiments, an address of the decompressed segment that corresponds to the location of the decompressed segment in the kernel memory 2945 is used to populate the LBA in the cache 2905. In some embodiments, the kernel agent 2930 is responsible for updating the cache 2905.

In some embodiments, the reverse deduplicator 2925 waits until it has received all segments needed to reconstruct a file, and provides the reconstructed file to the TCP transmit socket 2915 for transmission to the receiver device (not shown). In other embodiments, the reverse deduplicator 2925 provides the segments to the TCP transmit socket 2915 as the reverse deduplicator 2925 receives the segments to allow the TCP transmit socket 2915 to immediately transmit the segments to the receiver device. In some such other embodiments, the reverse deduplicator 2925 provides the segments to the TCP transmit socket 2915 in the order in which the segments appear in the file such that the receiver device receives the segments in the correct order, including any segments that repeat within the file (i.e., duplicate segments replaced by the DRAGON sender with their corresponding signatures).

Figure 30:
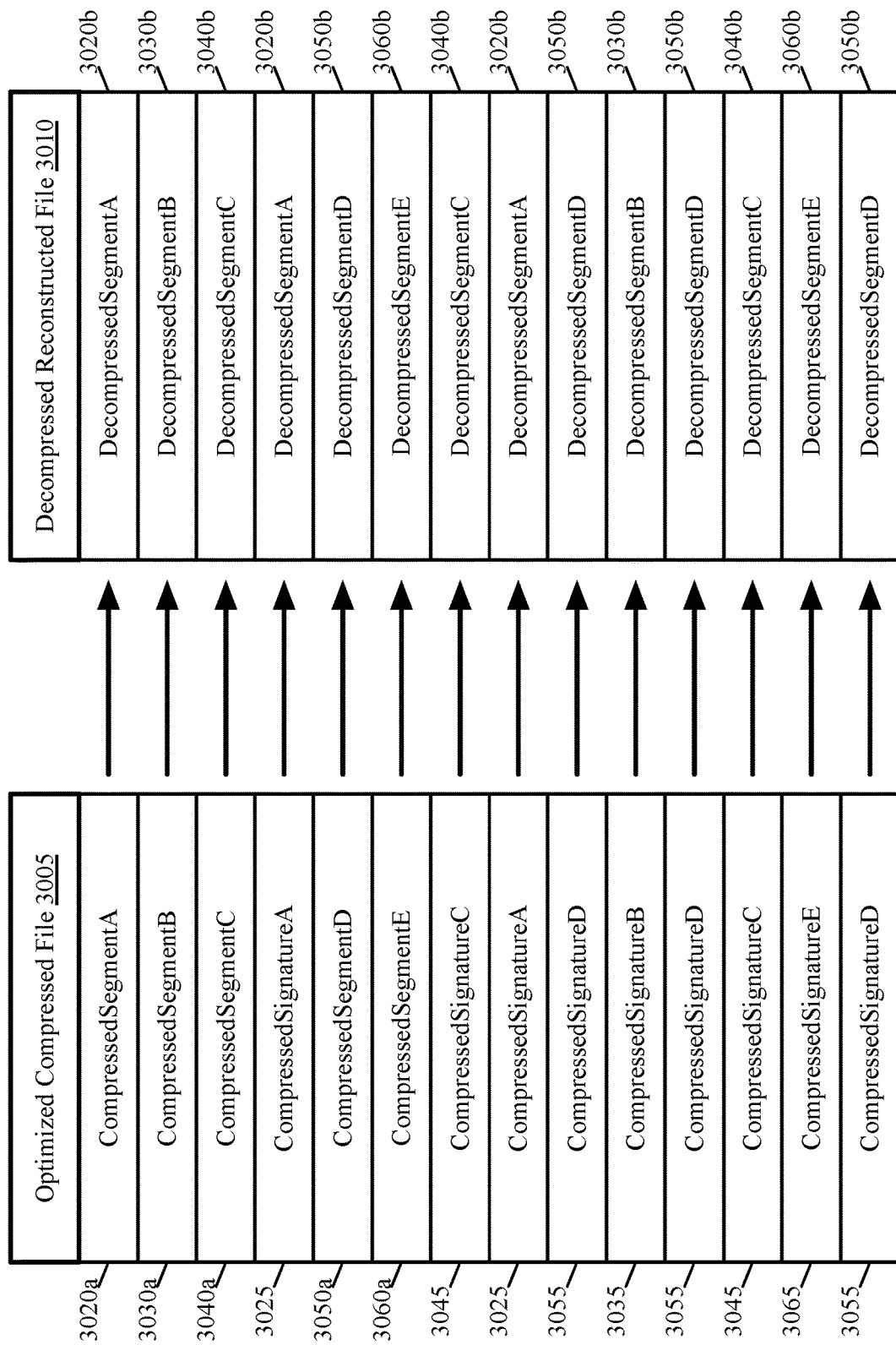
FIG. 30 conceptually illustrates an example of a simplified optimized and compressed file and the decompressed, reconstructed file generated by a reverse deduplicator, in some embodiments.

FIG. 30 conceptually illustrates an example of a simplified optimized and compressed file 3005 and the decompressed, reconstructed file 3010 generated by a reverse deduplicator, in some embodiments. The optimized and compressed file 3005 includes 14 compressed segments and signatures. The compressed segments include compressed segments A 3020*a*, B 3030*a*, C 3040*a*, D 3050*a*, and E 3060*a*. Each segment appears only once in the file 3005, and each additional instance of any of the segments is replaced with the signature corresponding to the segment, as shown. The compressed signatures include compressed signature A 3025 that corresponds to compressed segment A 3020*a*, compressed signature B 3035 that corresponds to compressed segment B 3030*a*, compressed signature C 3045 that corresponds to compressed segment C 3040*a*, compressed signature D 3055 that corresponds to compressed segment D 3050*a*, and compressed signature E 3065 that corresponds to compressed segment E 3060*a*.

After a reverse deduplicator has received the decompressed segments and performed reverse deduplication to reconstruct the file, the decompressed reconstructed file 3010 includes 14 full segments, including decompressed segments A 3020*b*, B 3030*b*, C 3040*b*, D 3050*b*, and E 3060*b*. Each instance of a compressed segment from the optimized compressed file 3005 has now been replaced with the decompressed segment in the decompressed reconstructed file 3010, and each instance of a compressed signature from the optimized compressed file 3005 has been replaced with the decompressed segment corresponding to the signature in the decompressed reconstructed file 3010. For example, each instance of compressed signature A 3025 has been replaced with the corresponding decompressed segment A 3020*b*.

Back in the user space 2901 on the DRAGON receiver 2900, the database 2975 (e.g., RocksDB) writes the decompressed segment to disk 2950. The database performs the write operation on a compaction stage. During the compaction stage of some embodiments, files are compacted down to lower levels of the file system of the database 2975 in order to increase space efficiency and allow more files to be added at the highest level.

The data structure of RocksDB, for instance, includes various levels from L0 at the top to Ln, or Lmax, at the bottom. In some embodiments, each level of RocksDB subsequent to level L0 (i.e., levels L1-Ln) has a configurable target size. As each level reaches its target capacity, the compaction process of RocksDB is triggered, during which files are compacted down to lower levels.

A hook is added at the compaction stage (e.g., by modifying the code of the database) in order to notify the kernel space that a new SST file has been written to disk. It should be noted that the Linux buffer cache on write is disabled by modifying hdparam. The database (e.g., RocksDB) SST files hold the key-value pairs associated with the segments (i.e., the signatures and corresponding segments). When the kernel space 2902 is notified (i.e., via the hook) that the new SST file has been written to disk, all new and updated SST files are then scanned and the cache 2905 is updated accordingly. For example, direct hash-to-LBA mappings (i.e., signature-to-block address mappings) are added to the cache 2905. In some embodiments, a size of the segment is included along with the LBA.

Figure 31:
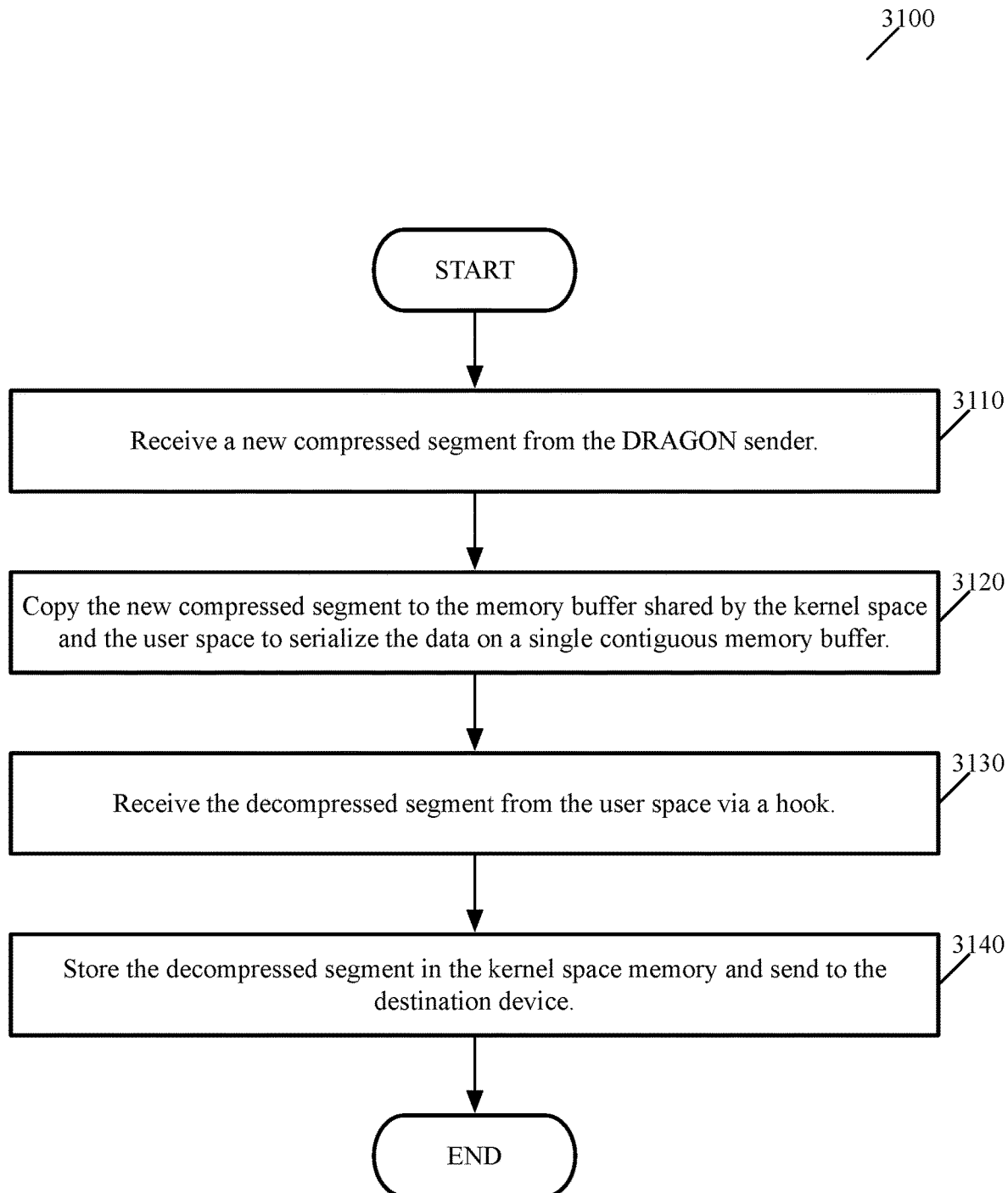
FIG. 31 illustrates a process performed in some embodiments when a new segment is received by a DRAGON receiver.

FIG. 31 illustrates a process 3100 performed in some embodiments when a new segment is received by a DRAGON receiver. The process 3100 will be described below with references to the DRAGON receiver 2900. The process 3100 starts when the DRAGON receiver receives (at 3110) a new segment from the DRAGON sender. When the DRAGON sender sends new segments to the DRAGON receiver, the DRAGON sender sends the segment in a key-value pair, in some embodiments, where the key is the signature associated with the segment and the value is the segment itself. As described above, the segments (e.g., a file sent as packets in a data stream) are received at the TCP receive socket of the DRAGON receiver. The DRAGON receiver 2900, for instance, receives the segments at the TCP receive socket 2910.

The process 3100 copies (at 3120) the new segment to the memory buffer shared by the kernel space and user space of the DRAGON receiver in order to serialize the data on a single contiguous memory buffer. In some embodiments, the new segment is copied to the shared memory buffer after a decomposition process has been performed to identify the new segment from one or more other segments and/or signatures included in the file. For instance, after a file is received by the TCP receive socket 2910 on the DRAGON receiver 2900, the TCP receive socket 2910 passes the file to the decomposer 2920 for decomposition in order to identify the individual segments and/or signatures included in the file. The decomposer 2920 then provides the decomposed file to the kernel agent 2930, which copies any new segments to the shared memory 2955.

The process 3100 receives (at 3130) the decompressed segment from the user space via a hook. After reading the segment from the shared memory 2955 and decompressing the segment, the decompressor 2970 in the user space 2901 of the DRAGON receiver 2900 of some embodiments copies the decompressed segment back to the shared memory 2955, where it is retrieved by the kernel agent 2930.

The process 3100 stores (at 3140) the decompressed segment in the kernel space memory and sends the decompressed segment to the destination device. After the kernel agent 2930 retrieves the decompressed segment from the shared memory 2955, the kernel agent 2930 provides the decompressed segment to the memory interface 2940 for storage in the kernel memory 2945 and for sending to the destination device. As such, the memory interface 2940 writes the segment to the kernel memory 2945, and provides the segment to the reverse deduplicator 2925.

In some embodiments, the reverse deduplicator 2925 uses the segment to reconstruct the file (e.g., along with other segments provided by the memory interface 2940 that are associated with the file). Once reconstructed, in some embodiments, the reverse deduplicator 2925 then provides the reconstructed file to the TCP transmit socket 2915. The TCP transmit socket 2915 sends the reconstructed file to the destination device. Following 3140, the process 3100 ends.

Figure 32:
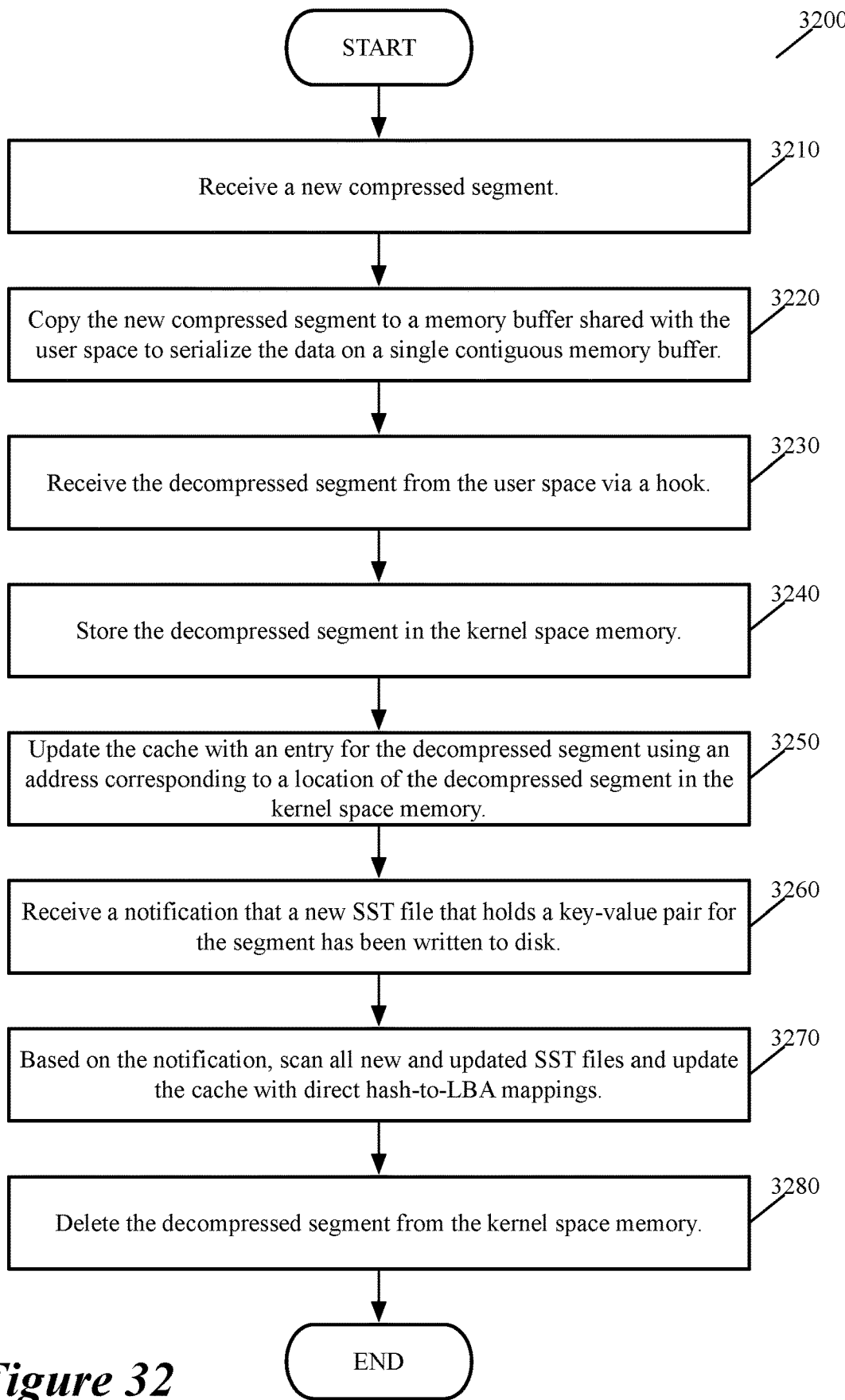
FIG. 32 illustrates another process performed by kernel space of the DRAGON receiver, in some embodiments.

FIG. 32 illustrates another process 3200 performed by kernel space of the DRAGON receiver, in some embodiments. The process 3200 will be described below with references to the DRAGON receiver 2900. In some embodiments, the process 3200 is performed concurrently with the process 3100 described above. The process 3200 starts when the DRAGON receiver receives (at 3210) a new compressed segment. The DRAGON receiver 2900, for instance, receives the segments at the TCP receive socket 2910.

The process 3200 copies (at 3220) the new compressed segment to a memory buffer shared with the user space to serialize the data on a single contiguous memory buffer. As also described above, the TCP receive socket 2910 provides received files to the decomposer 2920 for decomposition to identify the individual segments and/or signatures included in the file. The decomposer 2920 provides the decomposed file to the kernel agent 2930, which copies any new segments to the shared memory 2955. As described above, each new segment is received as a key-value pair, in some embodiments, where the key is the signature associated with a segment, and the value is the segment itself. As such, the segment is copied to the shared memory as part of the key-value pair (i.e., is copied along with its corresponding signature), according to some embodiments.

The process 3200 receives (at 3230) the decompressed segment from the user space via a hook. After the decompressor 2970 in the user space 2901 reads the segment from the shared memory 2955 and decompresses the segment, the decompressor 2970 copies the decompressed segment to the shared memory 2955 for retrieval by the kernel agent 2930. The process 3200 stores (at 3240) the decompressed segment in the kernel space memory. After retrieving the decompressed segment from the shared memory 2955, the kernel agent 2930 provides the segment to the memory interface 2940 for storage in the kernel memory 2945.

The process 3200 updates (at 3250) the cache with an entry for the decompressed segment using an address corresponding to a location of the decompressed segment in the kernel space memory. In some embodiments, the kernel agent 2930 is responsible for updating the cache 2905 with an entry for the new segment. The entry includes the signature associated with the segment (i.e., as learned from the key-value pair), an address of the segment corresponding to a location of the segment in the kernel memory 2945, and an indicator of whether the segment is in memory, according to some embodiments.

The process 3200 receives (at 3260) a notification that a new SST file that holds a key-value pair for the segment has been written to disk. As will be further described below, while the kernel space performs the processes 3100 and 3200, the user space performs its own processes, in some embodiments, including storing the new segments (and their corresponding signatures) and writing the new segments (and their corresponding signatures) to disk. In some embodiments, a hook is added during a compaction stage performed by the database in the user space to notify the kernel space when a new SST file has been written to disk. The notification is received, in some embodiments, by the kernel agent 2930.

Based on the notification, the process 3200 scans (at 3270) all new and updated SST files and updates the cache with direct hash-to-LBA mappings. Because an entry for the new segment has already been added to the cache, the entry is updated to reflect the LBA provided in the notification that corresponds to a location in the disk storage at which the new segment and its signature are stored. Accordingly, the in-memory address for the segment is replaced with the LBA. In some embodiments, a size of the segment is also included alongside the LBA, and added to the cache as part of the LBA, in some embodiments.

The process 3200 deletes (at 3280) the decompressed segment from the kernel space memory. Once the segment is deleted from the kernel space memory, the cache is again updated, in some embodiments, to update the indicator to indicate that the segment is no longer stored in memory. When the segment is subsequently needed (e.g., to reconstruct files that reference the segment using the corresponding signature), the kernel space performs the process 2800 described above, in some embodiments. Following 3280, the process 3200 ends.

Figure 33:
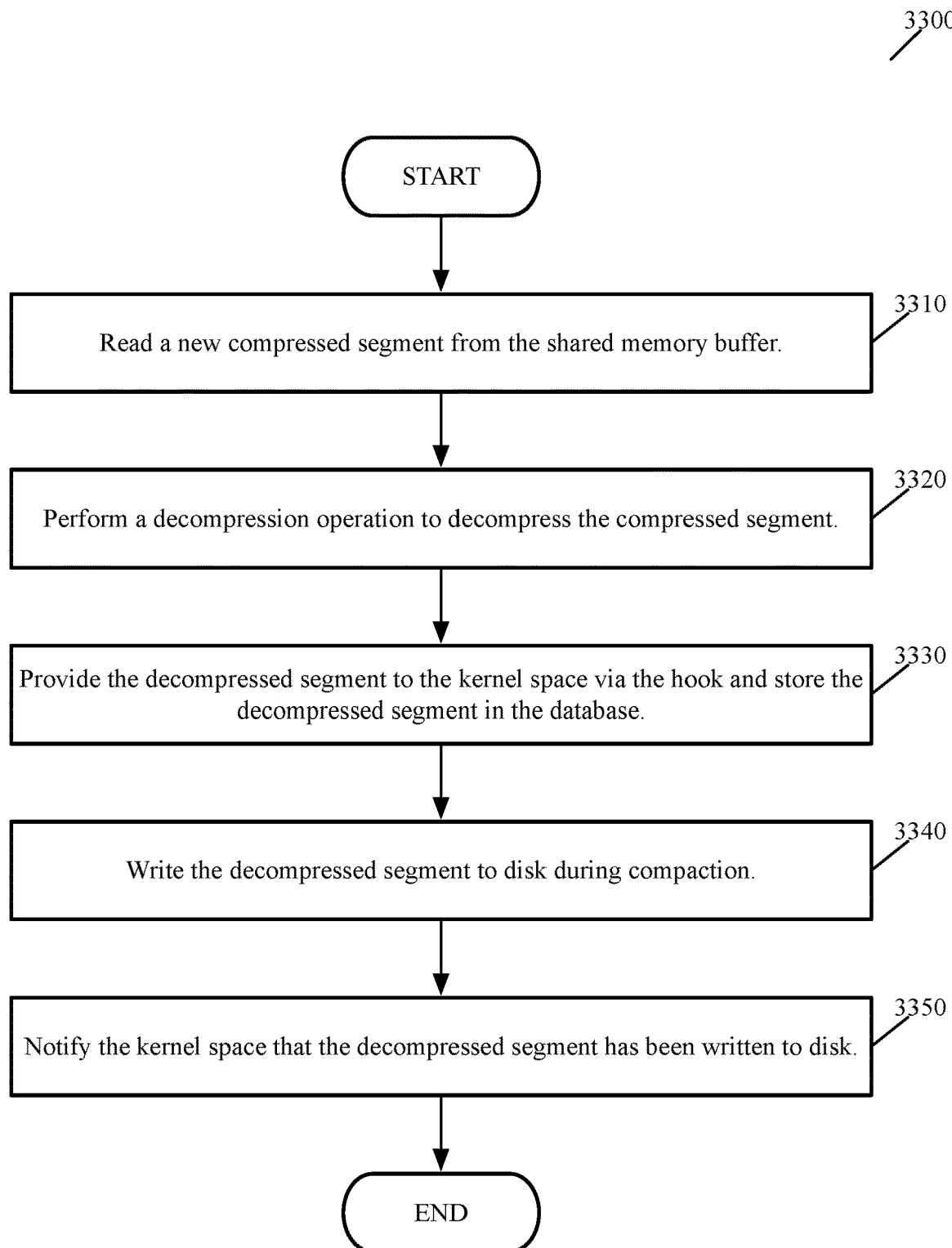
FIG. 33 illustrates a process performed in some embodiments by the user space of a DRAGON receiver.

FIG. 33 illustrates a process 3300 performed in some embodiments by the user space of a DRAGON receiver. The process 3300 will be described below with reference to the DRAGON receiver 2900. The process 3300 starts when the user space reads (at 3310) a new compressed segment from the shared memory buffer. On the DRAGON receiver 2900, for instance, the decompressor 2970 reads segments from the shared memory 2955.

The process 3300 performs (at 3320) a decompression operation to decompress the compressed segment. The decompression operation is performed by the decompressor 2970, according to some embodiments. The segment is compressed, in some embodiments, as a key-value pair, where the key is a signature corresponding to the segment and the value is the segment itself, as described above. As such, decompressing the segment includes decompressing the key-value pair, in some embodiments.

The process 3300 provides (at 3330) the decompressed segment to the kernel space via the hook and stores the decompressed segment in the database. In some embodiments, after the decompressor 2970 has decompressed the segment (i.e., key-value pair), the decompressor 2970 copies the decompressed segment (i.e., key-value pair) to the shared memory 2955, and provides the decompressed segment (i.e., key-value pair) to the database 2975 for storage.

The process 3300 writes (at 3340) the decompressed segment to disk during compaction. The database 2975 of some embodiments performs write operations during a compaction stage in which files are compacted down to lower levels of the file system of the database 2975 (i.e., in the disk storage 2950) in order to increase space efficiency and allow more files to be added at the highest level. In some embodiments, compaction is triggered when any one of the levels of the file system 2960 in the disk storage 2950 reaches capacity.

The process 3300 notifies (at 3350) the kernel space that the decompressed segment has been written to disk. As described above, the notification is sent via a hook added to the compaction stage. In some embodiments, the notification is sent to the kernel agent 2930, which causes the kernel agent 2930 to update the cache 2905 with the address information for the newly stored segment in the disk storage 2950. Following 3350, the process 3300 ends.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 34:
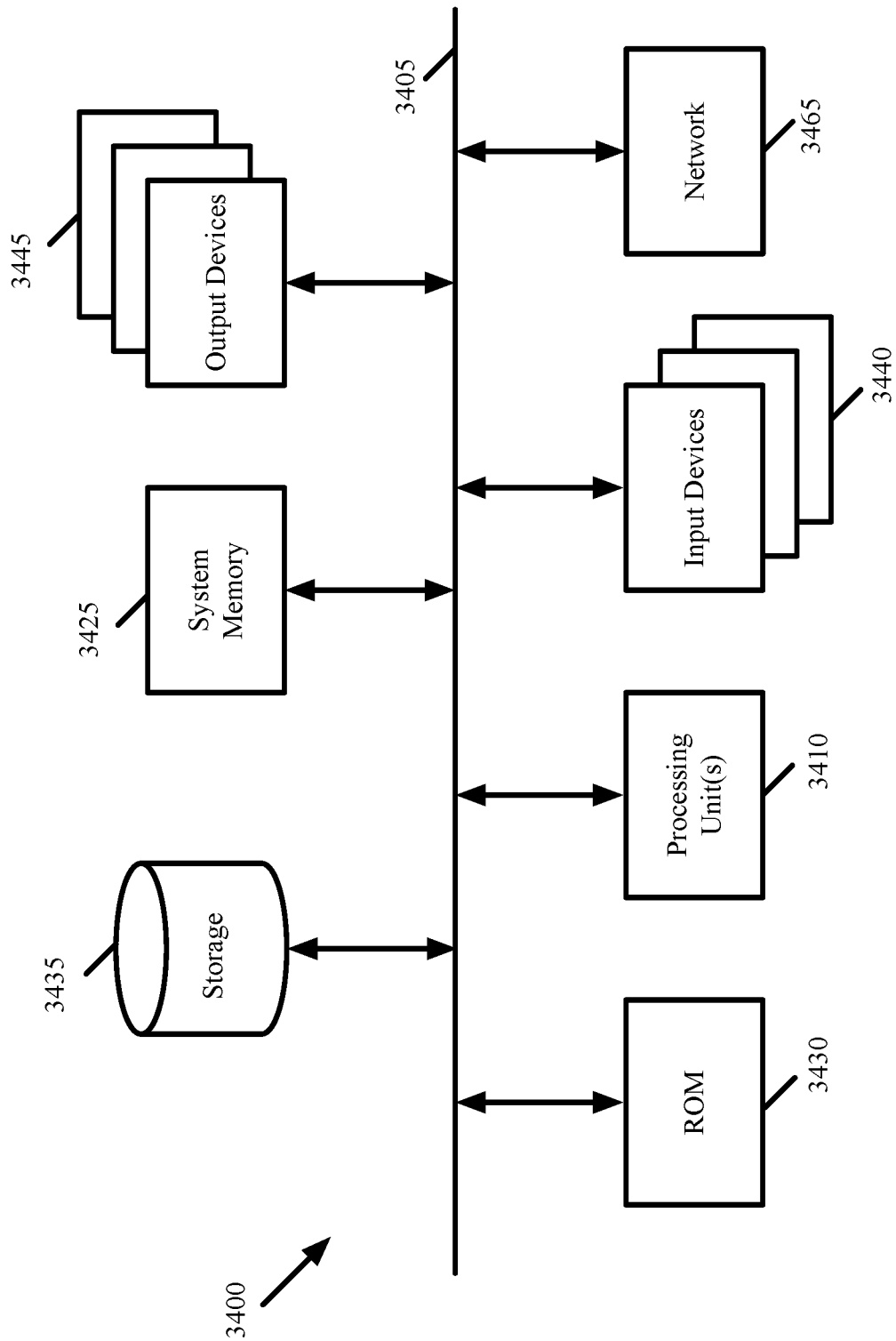
FIG. 34 conceptually illustrates a computer system with which some embodiments of the invention are implemented.

FIG. 34 conceptually illustrates a computer system 3400 with which some embodiments of the invention are implemented. The computer system 3400 can be used to implement any of the above-described hosts, controllers, gateway, and edge forwarding elements. As such, it can be used to execute any of the above described processes. This computer system 3400 includes various types of non-transitory machine-readable media and interfaces for various other types of machine-readable media. Computer system 3400 includes a bus 3405, processing unit(s) 3410, a system memory 3425, a read-only memory 3430, a permanent storage device 3435, input devices 3440, and output devices 3445.

The bus 3405 collectively represents all system, peripheral, and chipset buses that communicatively connect the numerous internal devices of the computer system 3400. For instance, the bus 3405 communicatively connects the processing unit(s) 3410 with the read-only memory 3430, the system memory 3425, and the permanent storage device 3435.

From these various memory units, the processing unit(s) 3410 retrieve instructions to execute and data to process in order to execute the processes of the invention. The processing unit(s) 3410 may be a single processor or a multi-core processor in different embodiments. The read-only-memory (ROM) 3430 stores static data and instructions that are needed by the processing unit(s) 3410 and other modules of the computer system 3400. The permanent storage device 3435, on the other hand, is a read-and-write memory device. This device 3435 is a non-volatile memory unit that stores instructions and data even when the computer system 3400 is off. Some embodiments of the invention use a mass-storage device (such as a magnetic or optical disk and its corresponding disk drive) as the permanent storage device 3435.

Other embodiments use a removable storage device (such as a floppy disk, flash drive, etc.) as the permanent storage device. Like the permanent storage device 3435, the system memory 3425 is a read-and-write memory device. However, unlike storage device 3435, the system memory 3425 is a volatile read-and-write memory, such as random access memory. The system memory 3425 stores some of the instructions and data that the processor needs at runtime. In some embodiments, the invention's processes are stored in the system memory 3425, the permanent storage device 3435, and/or the read-only memory 3430. From these various memory units, the processing unit(s) 3410 retrieve instructions to execute and data to process in order to execute the processes of some embodiments.

The bus 3405 also connects to the input and output devices 3440 and 3445. The input devices 3440 enable the user to communicate information and select commands to the computer system 3400. The input devices 3440 include alphanumeric keyboards and pointing devices (also called "cursor control devices"). The output devices 3445 display images generated by the computer system 3400. The output devices 3445 include printers and display devices, such as cathode ray tubes (CRT) or liquid crystal displays (LCD). Some embodiments include devices such as touchscreens that function as both input and output devices 3440 and 3445.

Finally, as shown in FIG. 34, bus 3405 also couples computer system 3400 to a network 3465 through a network adapter (not shown). In this manner, the computer 3400 can be a part of a network of computers (such as a local area network ("LAN"), a wide area network ("WAN"), or an Intranet), or a network of networks (such as the Internet). Any or all components of computer system 3400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A WAN (wide area network) optimization method for optimizing traffic flows through a WAN that connects a plurality of sites, each of which has at least one router, the method comprising:

in a kernel space of a first router located at a first site:
from a second router located at a second site, receiving a file in an optimized first data stream originating from a source device at the second site and destined to a destination device at the first site, the file comprising a set of one or more compressed segments that are not yet stored in a database of the first router;
copying the set of one or more compressed segments to a shared memory that is used with a decompression program operating in a user space of the first router;
for each particular compressed segment in the set of one or more compressed segments,
receiving, from the user space decompression program, a particular decompressed segment that the user space decompression program obtains by decompressing the particular compressed segment; and
storing the particular decompressed segment in a kernel space memory for use in processing the file and subsequent files received by the first router.

2. The method of claim 1, wherein the decompression program retrieves the set of compressed segments from the shared memory in order to (i) decompress the set of compressed segments, (ii) provide the set of decompressed segments to the kernel space of the first router, and (iii) store the set of decompressed segments in a database in the user space of the first router, wherein the database stores a plurality of decompressed segments for the first router.

3. The method of claim 2, wherein a database agent of the database writes each decompressed segment in the set of decompressed segments to a disk storage of the first router.

4. The method of claim 3 further comprising:
for each decompressed segment in the set of decompressed segments,
receiving a notification from the user space of the first router that the decompressed segment has been written to the disk storage of the first router; and
based on the notification, deleting the decompressed segment from the kernel space memory of the first router.

5. The method of claim 4, wherein after deleting the particular decompressed segment from the kernel space memory, the kernel space of the first router processes the file and subsequent files received by the first router by performing an operation to DMA (direct memory access) the particular decompressed segment from the disk storage to the kernel space memory.

6. The method of claim 5, wherein performing the operation comprises directing an NVMe (non-volatile memory express) device operating in the kernel space of the first router to perform the operation.

7. The method of claim 4, wherein storing each particular decompressed segment in the kernel space memory further comprises updating a cache of the first router with an entry for the particular decompressed segment, the entry comprising (i) an identifier of the particular decompressed segment, (ii) an address corresponding to a location of the particular decompressed segment in the kernel space memory, and (iii) an indicator value that indicates the particular decompressed segment is stored in the kernel space memory.

8. The method of claim 7, wherein the notification that the decompressed segment has been written to the disk storage comprises a block address corresponding to a location of the particular decompressed segment in the disk storage, wherein the method further comprises, based on the notification, updating the entry in the cache for the particular decompressed segment to replace the address corresponding to the location of the particular decompressed segment in the kernel space memory with the block address from the notification.

9. The method of claim 8, wherein deleting the decompressed segment from the kernel space memory of the first router further comprises updating the entry in the cache to replace the indicator value that indicates the particular decompressed segment is stored in the kernel space memory with an indicator value that indicates the particular decompressed segment is not stored in the kernel space memory.

10. The method of claim 1, wherein processing the file comprises using the set of decompressed segments to reconstruct the file by replacing the set of compressed segment in the file with the set of decompressed segments.

11. The method of claim 10 further comprising sending the reconstructed file to the destination device.

12. The method of claim 1, wherein receiving, from the user space decompression program, the particular decompressed segment comprises retrieving the particular decompressed segment from the shared memory after the user space decompression program copies the particular decompressed segment to the shared memory for retrieval by the kernel space of the first router.

13. The method of claim 1, wherein the first router comprises a software router executing on a host computer and the disk storage is a disk storage of the host computer.

14. The method of claim 13, wherein at least one source or one destination of WAN traffic flows execute on the host computer with the software router.

15. The method of claim 1, wherein the first router comprises a standalone appliance and the disk storage is a disk storage of the standalone appliance.

16. A non-transitory machine readable medium storing a WAN (wide area network) optimization program for execution by a set of processing units, the WAN optimization program for optimizing traffic flows through a WAN that connects a plurality of sites, each of which has at least one router, the WAN optimization program comprising sets of instructions for:
in a kernel space of a first router located at a first site:
from a second router located at a second site, receiving a file in an optimized first data stream originating from a source device at the second site and destined to a destination device at the first site, the file comprising a set of one or more compressed segments that are not yet stored in a database of the first router;
copying the set of one or more compressed segments to a shared memory that is used with a decompression program operating in a user space of the first router;
for each particular compressed segment in the set of one or more compressed segments,
receiving, from the user space decompression program, a particular decompressed segment that the user space decompression program obtains by decompressing the particular compressed segment; and
storing the particular decompressed segment in a kernel space memory for use in processing the file and subsequent files received by the first router.

17. The non-transitory machine readable medium of claim 16, wherein the decompression program retrieves the set of compressed segments from the shared memory in order to (i) decompress the set of compressed segments, (ii) provide the set of decompressed segments to the kernel space of the first router, and (iii) store the set of decompressed segments in a database in the user space of the first router, wherein the database stores a plurality of decompressed segments for the first router.

18. The non-transitory machine readable medium of claim 17, wherein a database agent of the database writes each decompressed segment in the set of decompressed segments to a disk storage of the first router.

19. The non-transitory machine readable medium of claim 18, the WAN optimization program further comprising sets of instructions for:
    for each decompressed segment in the set of decompressed segments,
        receiving a notification from the user space of the first router that the decompressed segment has been written to the disk storage of the first router; and
        based on the notification, deleting the decompressed segment from the kernel space memory of the first router.

20. The non-transitory machine readable medium of claim 19, wherein after deleting the particular decompressed segment from the kernel space memory, the WAN optimization program further comprises a set of instructions for processing, at the kernel space of the first router, the file and subsequent files received by the first router by directing an NVMe (non-volatile memory express) device operating in the kernel space of the first router to perform an operation to DMA (direct memory access) the particular decompressed segment from the disk storage to the kernel space memory.

\* \* \* \* \*